(12) United States Patent
Lin et al.

(10) Patent No.: US 8,224,076 B2
(45) Date of Patent: Jul. 17, 2012

(54) IMAGE PROCESSING METHOD AND IMAGE PROCESSING APPARATUS

(75) Inventors: Chih Jung Lin, Taipei (TW); Pei Lin Hou, Taipei (TW); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 1267 days.

(21) Appl. No.: 11/945,423

(22) Filed: Nov. 27, 2007

(65) Prior Publication Data

US 2008/0123989 A1 May 29, 2008

(30) Foreign Application Priority Data

Nov. 29, 2006 (JP) .................................. 2006-322552

(51) Int. Cl.
*G06K 9/00* (2006.01)
(52) U.S. Cl. ......... 382/165; 382/164; 382/162; 382/232
(58) Field of Classification Search .................. 382/232, 382/162, 164, 165
See application file for complete search history.

(56) References Cited

U.S. PATENT DOCUMENTS

| | | | |
|---|---|---|---|
| 6,504,873 B1 * | 1/2003 | Vehvilainen | 375/240.29 |
| 6,920,252 B2 * | 7/2005 | Rouvellou | 382/275 |
| 7,079,703 B2 * | 7/2006 | Kriss | 382/275 |
| 7,254,277 B2 * | 8/2007 | Kempf et al. | 382/260 |
| 7,339,601 B2 * | 3/2008 | Kim | 345/690 |
| 7,868,950 B1 * | 1/2011 | Samadani et al. | 348/609 |
| 2002/0118399 A1 * | 8/2002 | Estevez et al. | 358/426.07 |
| 2004/0076338 A1 * | 4/2004 | Kriss | 382/275 |
| 2004/0120597 A1 * | 6/2004 | Le Dinh | 382/261 |
| 2005/0147316 A1 * | 7/2005 | Deshpande | 382/261 |
| 2005/0147319 A1 * | 7/2005 | Deshpande et al. | 382/268 |
| 2006/0245499 A1 * | 11/2006 | Chiu et al. | 375/240.18 |
| 2007/0263897 A1 * | 11/2007 | Ong et al. | 382/100 |

* cited by examiner

*Primary Examiner* — Jayesh A Patel
(74) *Attorney, Agent, or Firm* — Wenderoth, Lind & Ponack, L.L.P.

(57) ABSTRACT

An image processing method for improving image quality by appropriately detecting ringing artifacts and reducing only the detected ringing artifacts, is an image processing method which includes: selecting, from among a plurality of pixels included in an input image, a candidate for a noise pixel included in the ringing artifacts, using luminance values of the plurality of pixels; judging whether or not the candidate selected in the selecting is the noise pixel based on whether or not a chrominance value of the candidate is included in a chrominance range corresponding to a comparison target region which is a part of the input image; and filtering the noise pixel which has been judged in the judging.

14 Claims, 39 Drawing Sheets

IMAGE PROCESSING METHOD AND IMAGE PROCESSING APPARATUS

BACKGROUND OF THE INVENTION (1) Field of the Invention

The present invention relates to an apparatus and a method for improving image quality by detecting and filtering noise pixels to reduce image artifacts. The present invention relates more particularly to an image processing method for detecting and reducing ringing artifacts and an image processing apparatus that performs image processing according to the image processing method.

(2) Description of the Related Art

Most video data are stored and broadcasted in digitally compressed formats, and most compression standards, e.g., JPEG, MPEG-2/4, use block-based discrete cosine transformation (DCT) and quantization to reduce data amount. During the compression process, coarse quantization and coefficient truncation results in coding noise. Ringing artifacts (also referred to as ringing distortions and ringing noise), one kind of the coding noise, occur nearby high contrast edges in relatively low energy sections of images.

FIG. 1 is a diagram illustrating an example of ringing artifacts.

As illustrated in FIG. 1, for example, a picture which has been coded and then decoded shows a mountain, sky and a lake. In this case, an image which should show the mountain and the lake is represented as a texture with fine patterns. Ringing artifacts are noise that appears nearby edges of images showing objects such as mountains. Such ringing artifacts occur in decoded images because image coding removes a high-frequency component. To be more specific, ringing artifacts are made up of noise pixels scattered over blocks that include edge pixels. Due to the ringing artifacts, in blocks that include the mountain edge, for example, pixels which should show flat blue of the sky show a different color such as white, and pixels which should have pixel values as textures have different pixel values from the values as textures. As described, a picture which has been coded and then decoded has noise pixels that make up ringing artifacts.

Some methods for reducing ringing artifacts are proposed. An exemplary of reducing ringing artifacts is disclosed in a Patent Reference, U.S. Pat. No. 6,920,252 B2.

FIG. 2 is a diagram illustrating an image processing method disclosed in the above mentioned Patent Reference.

This conventional method includes a calculation step (ACT) of a spatial activity values, a determination step (NND) of a non-natural uniform area, a gradient filter step (GF), a detection step (RD) of a ringing artifact and a filter step (FIL). The conventional method determines ringing artifacts by comparing the activity and gradient of each pixel with a predefined threshold.

The activity of each pixel and its gradient are used to determine ringing artifacts in the conventional method. However, in natural images, textures of objects and scenes are similar to ringing artifacts. Textures and ringing artifacts usually have the same activity and gradient. By using the activity and the gradient, the conventional method cannot identify textures and ringing artifacts correctly. Once textures are mis-determined as ringing artifacts, the filter will remove those mis-determined textures. On the contrary, ringing artifacts are kept as textures when they are mis-determined as textures. Moreover, when textures and ringing artifacts are mixed in the same spatial locations, the error of pixel judgment makes the filter either remove ringing artifacts but lose texture or reserve texture but still keep ringing artifacts.

As described above, there is a problem with the conventional image processing method that it is impossible to detect ringing artifacts appropriately and reduce only the appropriately detected ringing artifacts.

SUMMARY OF THE INVENTION

In view of the above described problem, an object of the present invention is to provide an image processing method for improving image quality by detecting ringing artifacts appropriately and reducing only the appropriately detected ringing artifacts.

In order to achieve the above object, the image processing method according to the present invention is an image processing method for reducing a ringing artifact in an input image, the image processing method including: selecting, from among a plurality of pixels included in the input image, a candidate for a noise pixel included in the ringing artifact, using luminance values of the plurality of pixels; judging whether or not the candidate selected in the selecting is the noise pixel based on whether or not a chrominance value of the candidate is included in a chrominance range corresponding to a comparison target region which is a part of the input image; and filtering the noise pixel which has been judged in the judging.

With this method, a judgment on whether or not the candidate is the noise pixel is made based on whether or not the chrominance value of the candidate is included in, for example, the chrominance range of the comparison target region showing flat blue of the sky and the chrominance range of the comparison target region showing textures with fine patterns of objects such as mountains. Therefore, it is possible to more appropriately detect noise pixels that make up ringing artifacts than the conventional technique of judging whether or not the candidate is the noise pixel based only on the activity and gradient of pixels. Further, since the filtering using, for example, a low pass filter is performed on the detected noise pixels, it is possible to reduce only ringing artifacts while preserving the above mentioned textures, and consequently, image quality can be improved.

In addition, the image processing method may further include identifying, from among the plurality of pixels, an edge pixel included in an edge, using the luminance values of the plurality of pixels included in the input image, in which the selecting may include selecting a plurality of candidates including the candidate, and the judging may be performed on a candidate located in a processing target region, the candidate being among the plurality of the candidates included in the input image, and the processing target region being a part of the input image and including the edge pixel.

Since ringing artifacts occur nearby edges of an image, noise pixels can appropriately be detected, without any unnecessary processing, by judging whether or not the candidates in the processing target region including the edges are noise pixels, as in the present invention.

Moreover, the selecting may include comparing, with a first threshold, an absolute value of each gradient of the luminance values of spatially successive pixels which are included in the input image and are among the plurality of pixels, and selecting, as the candidate, a pixel, from among the plurality of pixels, which corresponds to an absolute value which is equal to or smaller than the first threshold, and the identifying may include comparing, with the first threshold, the absolute value of each gradient of the luminance values of the spatially successive pixels, and identifying, as the edge pixel, a pixel, from among the plurality of pixels, which corresponds to an absolute value which is equal to or greater than the first threshold.

With this method, it is possible to appropriately identify edge pixels and appropriately select candidates, because, in the case where an absolute value of each gradient of pixels, that is, each gradient of the luminance values, is equal to or greater than the first threshold, a pixel corresponding to the absolute value is identified as an edge pixel, and in the case where the absolute value is equal to or smaller than the first threshold, a pixel corresponding to the absolute value is selected as a candidate.

Further, the image processing method may further include determining the comparison target region from the input image based on the luminance values of the plurality of pixels included in the input image. For example, the determining includes comparing, with a second threshold which is smaller than the first threshold, an absolute value of each gradient of the luminance values of the spatially successive pixels which are included in the input image, and determining, as the comparison target region, a flat region in which pixels, among the plurality of pixels, corresponding to an absolute value which is equal to or smaller than the second threshold, are successive for at least a predetermined number, and the judging includes judging the candidate as the noise pixel in a case where the chrominance value of the candidate is included in a chrominance range corresponding to the flat region.

With this method, it is possible to appropriately detect noise pixels, because a flat region showing flat blue of the sky, for example, is determined as a comparison target region, and a pixel having an absolute value of the gradient which is greater than the absolute value of the gradient of the pixels in the flat region is detected as a noise pixel even though the pixel has a chrominance value similar to the chrominance value of the flat region.

Furthermore, the determining may further include determining, as an other comparison target region, a texture region in which candidates among the plurality of the candidates are successive for at least a predetermined number, and the image processing method may further include re-judging, in a case where the candidate is judged, in the judging, as a pixel other than the noise pixel, the candidate as the noise pixel in a case where the chrominance value of the candidate is not included in a chrominance range corresponding to the texture region.

With this method, it is possible to more appropriately detect noise pixels, because even when a candidate is judged as a pixel other than a noise pixel based on the chrominance range of the flat region, the candidate is detected as a noise pixel in the case where the candidate has a chrominance value which is different from the chrominance value of the texture region, even when the candidate has an absolute value of a gradient of pixels similar to the absolute value of a gradient of pixels in the texture region showing fine patterns of mountains, for example.

In addition, the determining may include determining, as the comparison target region, a texture region in which candidates among the plurality of the candidates are successive for at least a predetermined number, and the judging may include judging the candidate as the noise pixel in a case where the chrominance value of the candidate is not included in a chrominance range corresponding to the texture region.

With this method, it is possible to appropriately detect noise pixels, because a texture region showing fine patterns of mountains, for example, is determined as a comparison target region, and a pixel having a chrominance value different from the chrominance value of the texture region is detected as a noise pixel even though the pixel has an absolute value of the gradient of pixels similar to the absolute value of the gradient of pixels in the texture region.

Furthermore, the determining may further include comparing, with a second threshold which is smaller than the first threshold, an absolute value of each gradient of the luminance values of the spatially successive pixels which are included in the input image, and determining, as an other comparison target region, a flat region in which pixels, among the plurality of pixels, corresponding to an absolute value which is smaller than the second threshold, are successive for at least a predetermined number, and the image processing method may further include re-judging, in a case where the candidate is judged, in the judging, as the noise pixel, the candidate as the noise pixel in a case where the chrominance value of the candidate is included in a chrominance range corresponding to the flat region.

With this method, it is possible to more appropriately detect noise pixels, because even when the candidate is judged as a noise pixel based on the chrominance range of the texture region, the candidate is detected as a noise pixel in the case where the candidate has an absolute value of the gradient of pixels greater than the absolute value of the gradient of the pixels in the flat region, even when the candidate has a chrominance value similar to the chrominance value of the flat region showing flat blue of the sky, for example.

Moreover, the image processing method may further include setting, in the input image, a window which represents the processing target region including the edge pixel, and the determining may include determining the comparison target region from the processing target region represented by the window.

With this method, it is possible to appropriately detect noise pixels from the processing target region even when the location of a boundary of blocks which are included in the input image and each of which is used as a unit of image decoding cannot be recognized, because a window representing the processing target region including edge pixels is set, and a comparison target region is determined from the processing target region.

In addition, the judging may include using a block, which includes the edge pixel, as the processing target region, the block being among a plurality of blocks which are included in the input image and each of which is a unit of image decoding processing, and the determining may include determining a block nearby the processing target region as the comparison target region.

With this method, it is possible to appropriately and easily detect, without setting such a window as described above, noise pixels which are present in a block in the processing target region and not present in a block in the comparison target region, because in the case where the location of the boundary of blocks which are included in the input image and each of which is used as a unit of image decoding can be recognized, a block which includes the edge pixel is used as the processing target region, and a block which is nearby the processing target region and does not include the edge pixel is determined as the comparison target region.

Note that the present invention can be embodied not only as an image processing method as described above, but also as: an image processing apparatus which performs image processing by the image processing method; an integrated circuit; a program which allows an image processing apparatus to perform image processing by the image processing method; and a recording medium on which the program is recorded.

FURTHER INFORMATION ABOUT TECHNICAL BACKGROUND TO THIS APPLICATION

The disclosure of Japanese Patent Application No. 2006-322552 filed on Nov. 29, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings.

DESCRIPTION OF THE PREFERRED EMBODIMENTS

Hereinafter, with reference to the drawings, a description is provided on an image processing method and an image processing apparatus according to embodiments of the present invention.

Human's perceptual experience and texture of objects and scenes both affect the judgment of ringing artifacts. Human eyes integrate neighboring information within a window to identify abnormal artifacts. Texture of objects and scenes is similar to ringing artifacts and it is hard to recognize the texture when examining only a local region of an image.

Chrominance, along with luminance, is one of the two components of a television signal. It further includes two components, which are named U and V in PAL video signals or Cb and Cr in some digital signals.

In the present invention, candidates for noise pixels that make up ringing artifacts are selected and, then, the chrominance components of the candidates are used to judge whether or not the candidates are noise pixels.

High differences of gray levels between pixels and their adjacent pixels form edges that human eyes also identify. So, gray levels are used to determine contours of objects and scenes in an image, thus candidates for noise pixels forming ringing artifacts along the decided contours are determined.

The luminance components are used to determine the spatial ranges of textures of objects and scenes. Pixels with high chrominance similarity to a neighboring region are identified as a part of the region by human eyes. Also, pixels have high correlation with an adjacent object or scene with high chrominance similarity. The chrominance components offer good information to tell important textures from ringing artifacts. By use of the chrominance components to determine noise pixels, the present invention removes ringing artifacts and preserves textures. So, the image quality is improved.

First Embodiment

An image processing apparatus for reducing image ringing artifacts is described below referring to the block diagram shown in FIG. 3 and the flowchart shown in FIG. 4.

Figure 1:
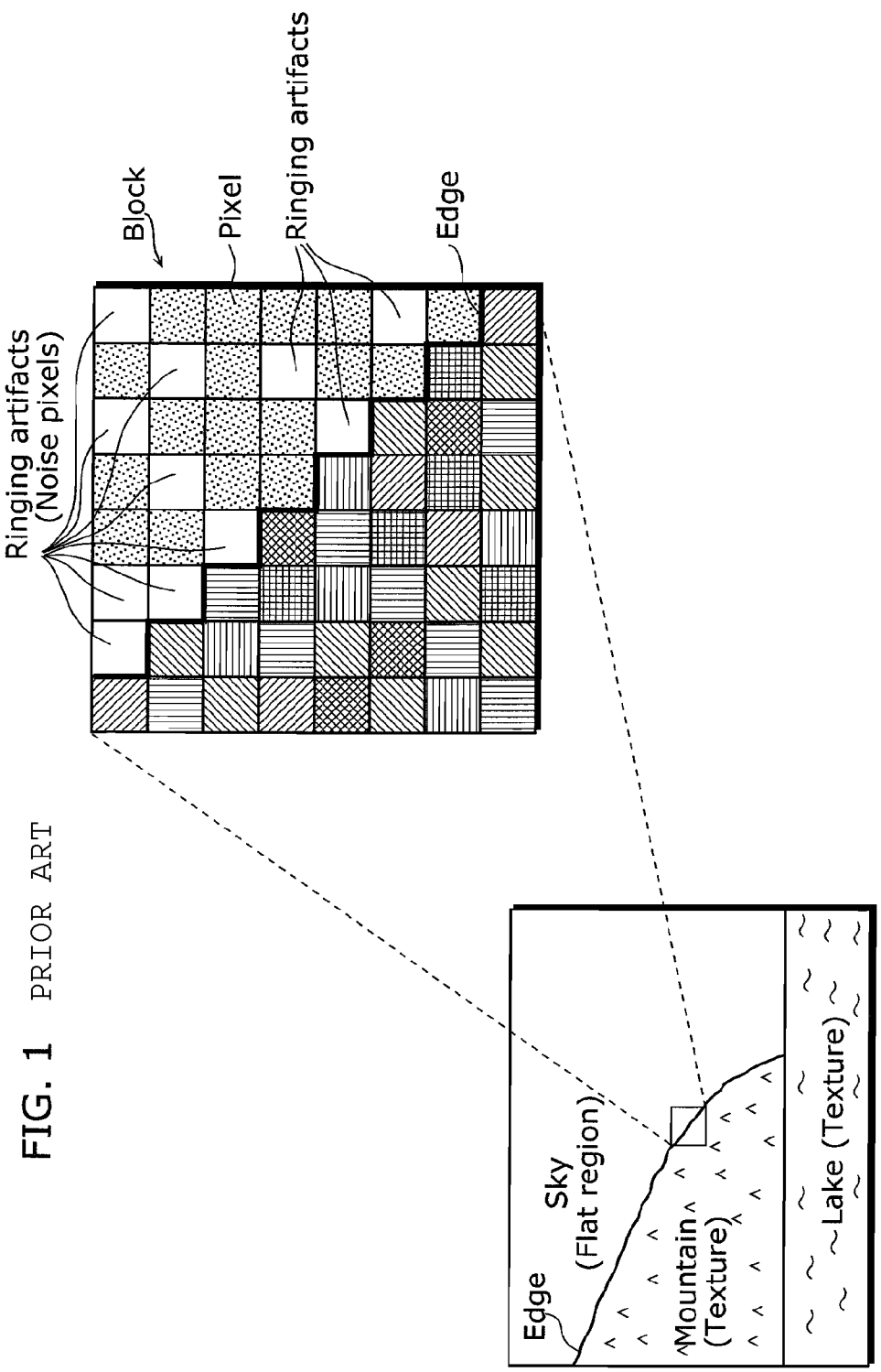
FIG. 1 is a diagram illustrating an example of ringing artifacts.
Figure 2:
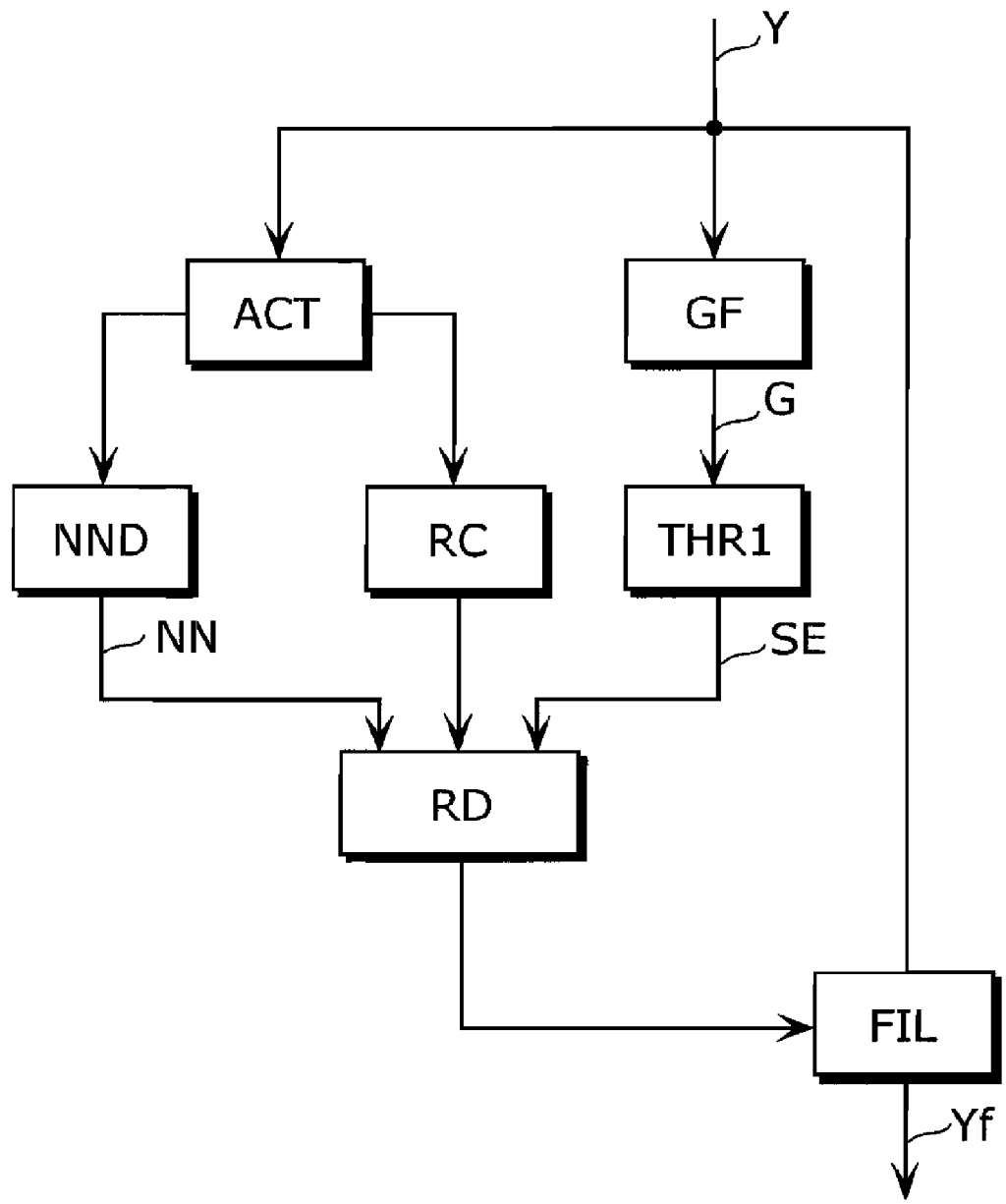
FIG. 2 is a diagram illustrating a conventional image processing method.
Figure 3:
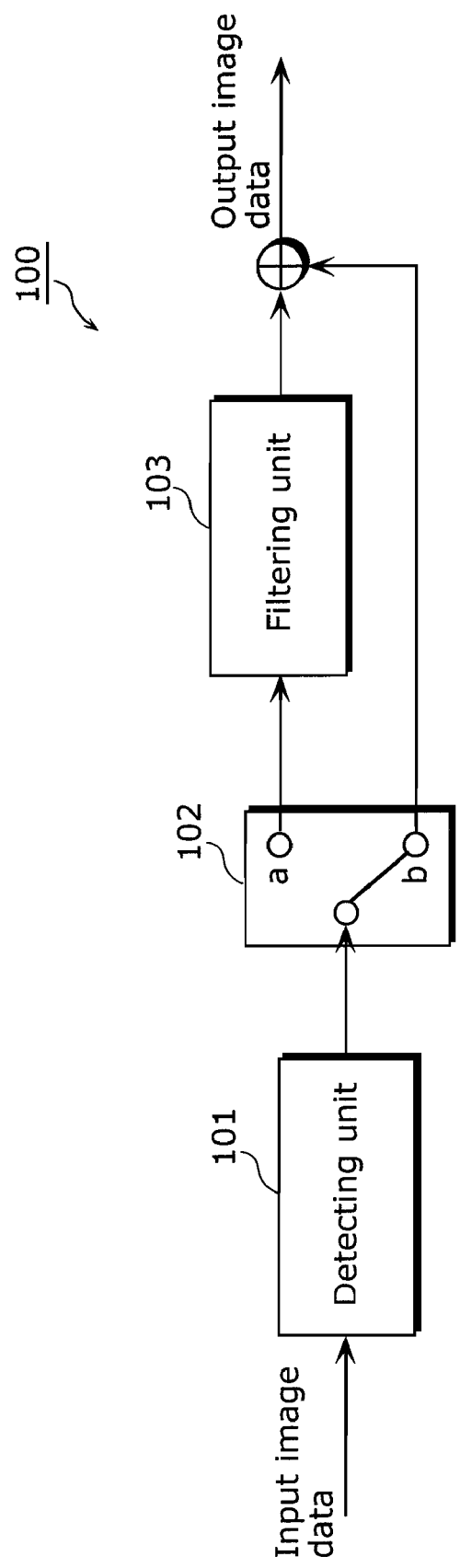
FIG. 3 is a block diagram illustrating an image processing apparatus for reducing ringing artifacts according to a first embodiment of the present invention.

FIG. 3 is a diagram illustrating the configuration of an image processing apparatus for reducing ringing artifacts according to the present embodiment.

An image processing apparatus 100 obtains input image data which is generated when an image is coded and decoded, reduces ringing artifacts included in the input image data, and outputs, as output image data, the input image data with reduced ringing artifacts. Note that in the present embodiment, the image processing apparatus 100 obtains the above mentioned input image data as an analog signal, for example, and reduces ringing artifacts without recognizing the location, in an image shown by the input image data, of blocks each of which is used as a unit of coding and decoding the image.

Such an image processing apparatus 100 includes a detecting unit 101, a switch 102 and a filtering unit 103. The detecting unit 101 receives the input image data and detects noise pixels which make up ringing artifacts by examining chrominance values. The switch 102 connects to the detecting unit 101. In the case where a noise pixel is detected, a terminal a of the switch 102 is connected and the filtering unit 103 is operated. On the other hand, in the case where a noise pixel is not detected, a terminal b of the switch 102 is connected and the filtering unit 103 is not operated. The filtering unit 103 filters the detected noise pixels by applying a low pass filter and outputs the filtered pixels. The image processing apparatus 100 combines the filtered pixels and the pixels without being filtered to generate output image data, and outputs the generated output image data.

Figure 4:
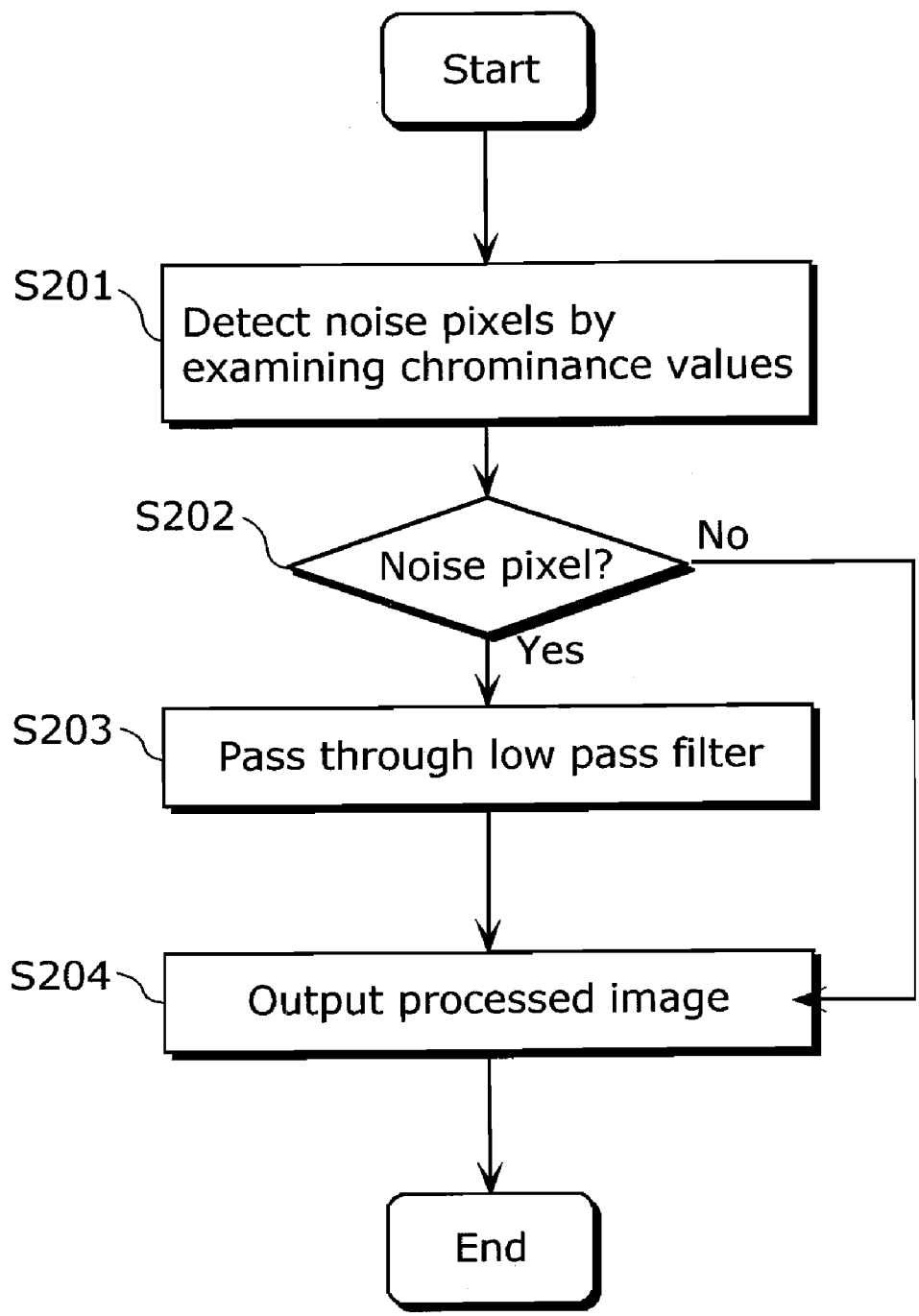
FIG. 4 is a flowchart illustrating operations of the above mentioned image processing apparatus.

FIG. 4 is a flowchart illustrating operations of the image processing apparatus 100 according to the present embodiment. Noise pixels are detected by examining chrominance values at Step S201. Two steps are separated at Step S202 by checking noise pixels. When noise pixels are determined, go to Step S203. On the other hand, when noise pixels are not determined, go to Step S204. At Step S203, a low pass filter is applied to the noise pixels. At Step S204, the filtered pixels and the other pixels without being filtered are combined and outputted as output image data.

The detecting unit 101 is described below referring to the block diagram shown in FIG. 5 and the flowchart shown in FIG. 6.

Figure 5:
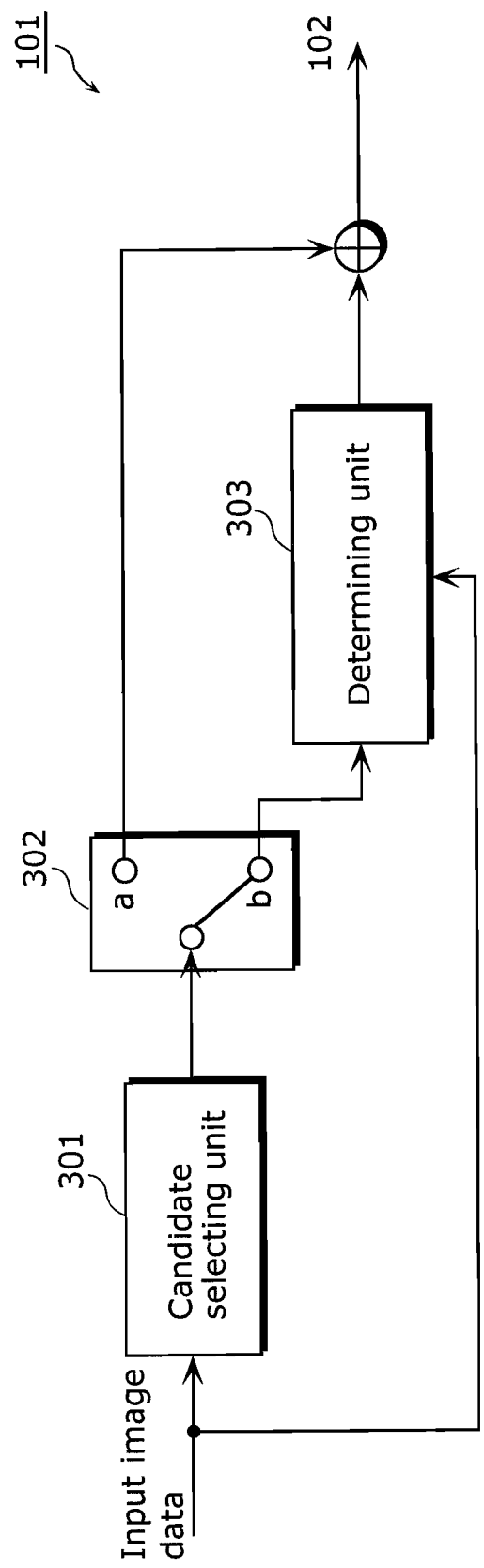
FIG. 5 is a block diagram illustrating a configuration of a detecting unit for detecting the above mentioned ringing artifacts.

FIG. 5 is a configuration diagram of the detecting unit 101 for detecting ringing artifacts.

The detecting unit 101 includes a candidate selecting unit 301, a switch 302 and a determining unit 303. The candidate selecting unit 301 receives input image data and selects candidates for noise pixels. The switch 302 connects to the candidate selecting unit 301. When a candidate is selected, a terminal b of the switch 302 is connected and the determining unit 303 is operated. On the other hand, when a candidate is not selected, a terminal a of the switch 302 is connected and the determining unit 303 is not operated. The determining unit 303 determines noise pixels from among plural candidates by judging whether or not any of the candidates is a noise pixel using chrominance values. The outputs of the terminal a and the determining unit 303 are further combined. As described, the detecting unit 101 detects ringing artifacts by selecting candidates for noise pixels from input image data and determining noise pixels that make up the ringing artifacts from among the candidates.

Figure 6:
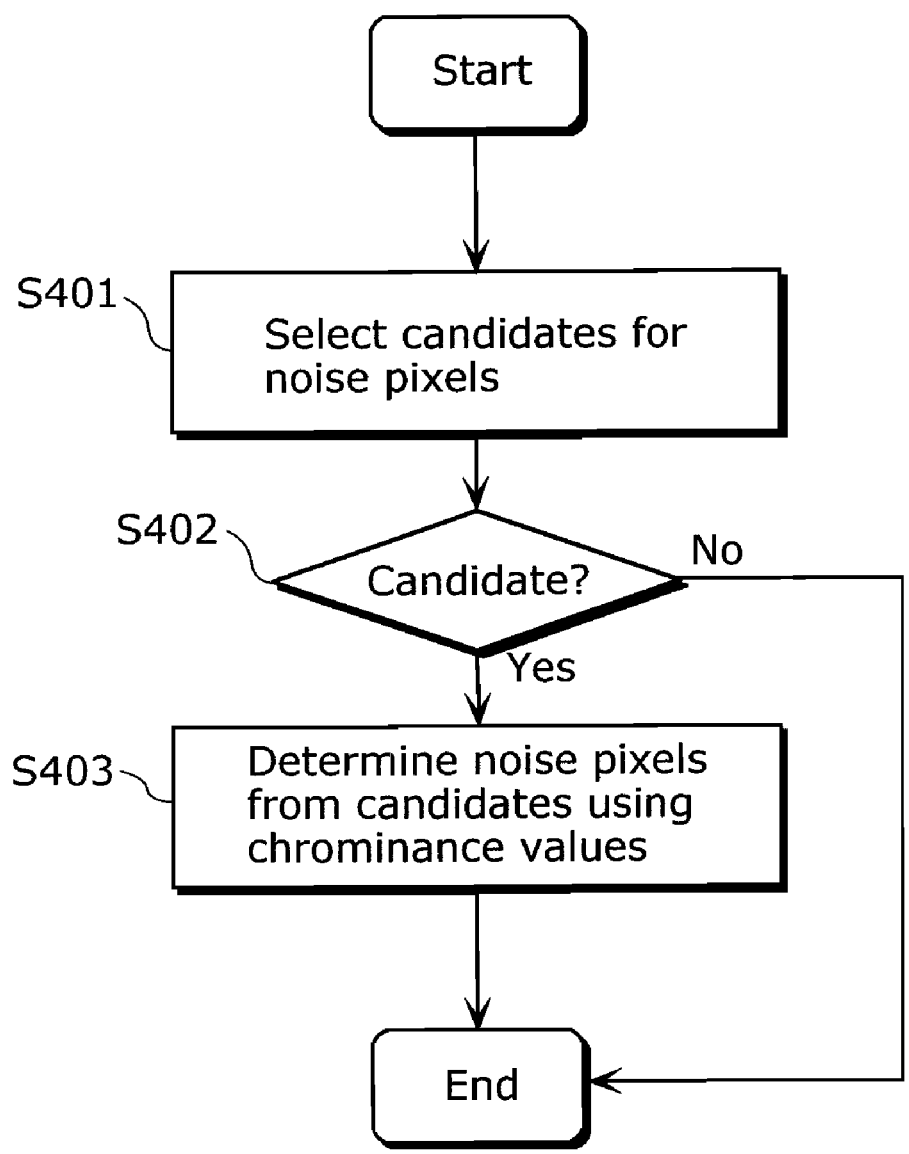
FIG. 6 is a flowchart illustrating operations of the above mentioned detecting unit.

FIG. 6 is a flowchart illustrating operations of the detecting unit 101. At Step S401, the candidate selecting unit 301 of the detecting unit 101 selects candidates for noise pixels. Two steps are separated at Step S402 by checking the candidates. At Step S402, in the case where candidates for noise pixels are selected by the candidate selecting unit 301, go to Step S403 to further determine noise pixels. On the other hand, in the case where candidates for noise pixels are not selected, jump over Step S403 and no further determination is operated. At Step S403, the determining unit 303 determines noise pixels from among the candidates by using the chrominance values extracted from the input image data.

A first embodiment of the present invention is described with reference to FIG. 7 to FIG. 12.

Figure 7:
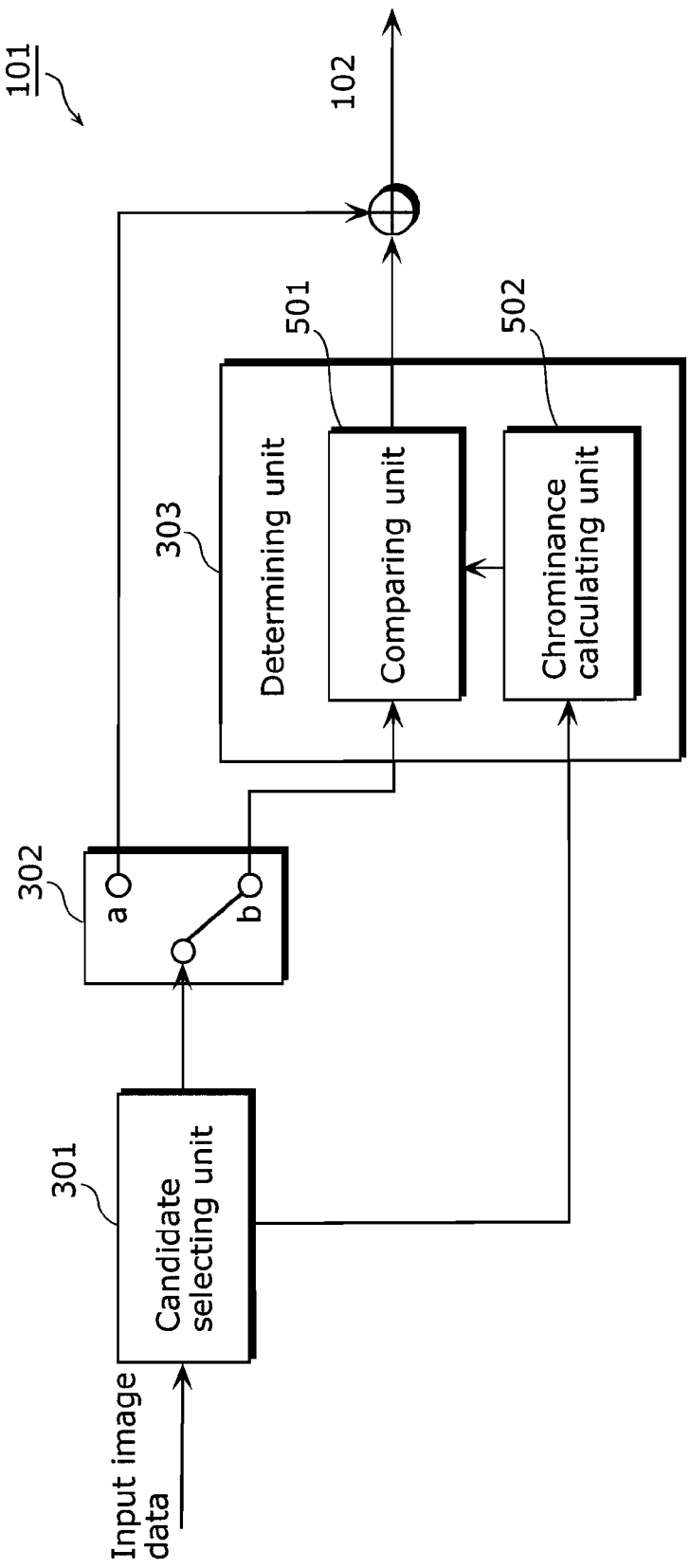
FIG. 7 is a block diagram illustrating a detailed configuration of a determining unit included in the above mentioned detecting unit of the first embodiment.

FIG. 7 is a block diagram illustrating a detailed configuration of a determining unit 303.

As mentioned above, the detecting unit 101 for detecting ringing artifacts includes a candidate selecting unit 301, a switch 302 and a determining unit 303. The determining unit 303 includes a comparing unit 501 and a chrominance calculating unit 502. The chrominance calculating unit 502 receives input image data including a result of processing performed by the candidate selecting unit 301, and calculates chrominance ranges of a predetermined region in an image shown by the input image data. The comparing unit 501 connects to the terminal b of the switch 302 and receives the chrominance ranges from the chrominance calculating unit 502 as well as obtaining the chrominance values of candidates from the candidate selecting unit 301. The comparing unit 501 compares the chrominance values of the candidates with the chrominance ranges to determine noise pixels.

Figure 8:
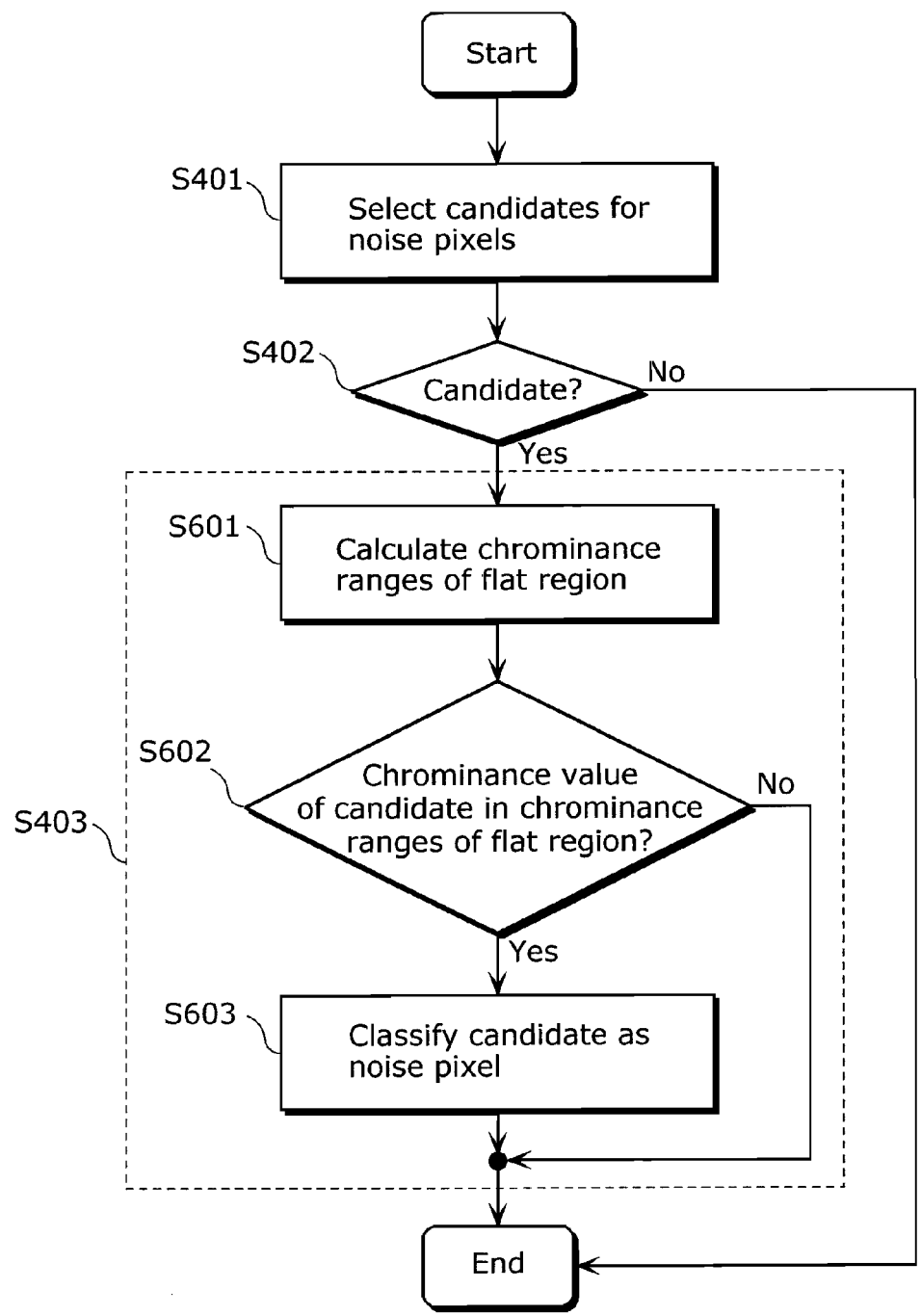
FIG. 8 is a flowchart illustrating detailed operations of the detecting unit of the first embodiment.

FIG. 8 is a flowchart illustrating detailed operations of the detecting unit 101. Step S401 and Step S402 are the same as the Steps described in FIG. 6. Step S403 includes Step S601, Step S602 and Step S603. At Step S601, the detecting unit 101 calculates the chrominance ranges of an after-mentioned flat region. At Step S602, the detecting unit 101 compares the chrominance values of the candidates and the chrominance ranges of the flat region. In the case where the chrominance values of the candidates are in the chrominance ranges of the flat region, the detecting unit 101 judges that the candidates are noise pixels at Step S603. In other words, the detecting unit 101 classifies the candidates as noise pixels. In the case where the chrominance values of the candidates are not in the chrominance ranges of the flat region, the detecting unit 101 judges that the candidates are not noise pixels. In other words, the detecting unit 101 jumps over the processing in Step S603 on the candidates, and finishes the operation of Step S403. The details of each operation in the above mentioned flow are described below.

Figure 9:
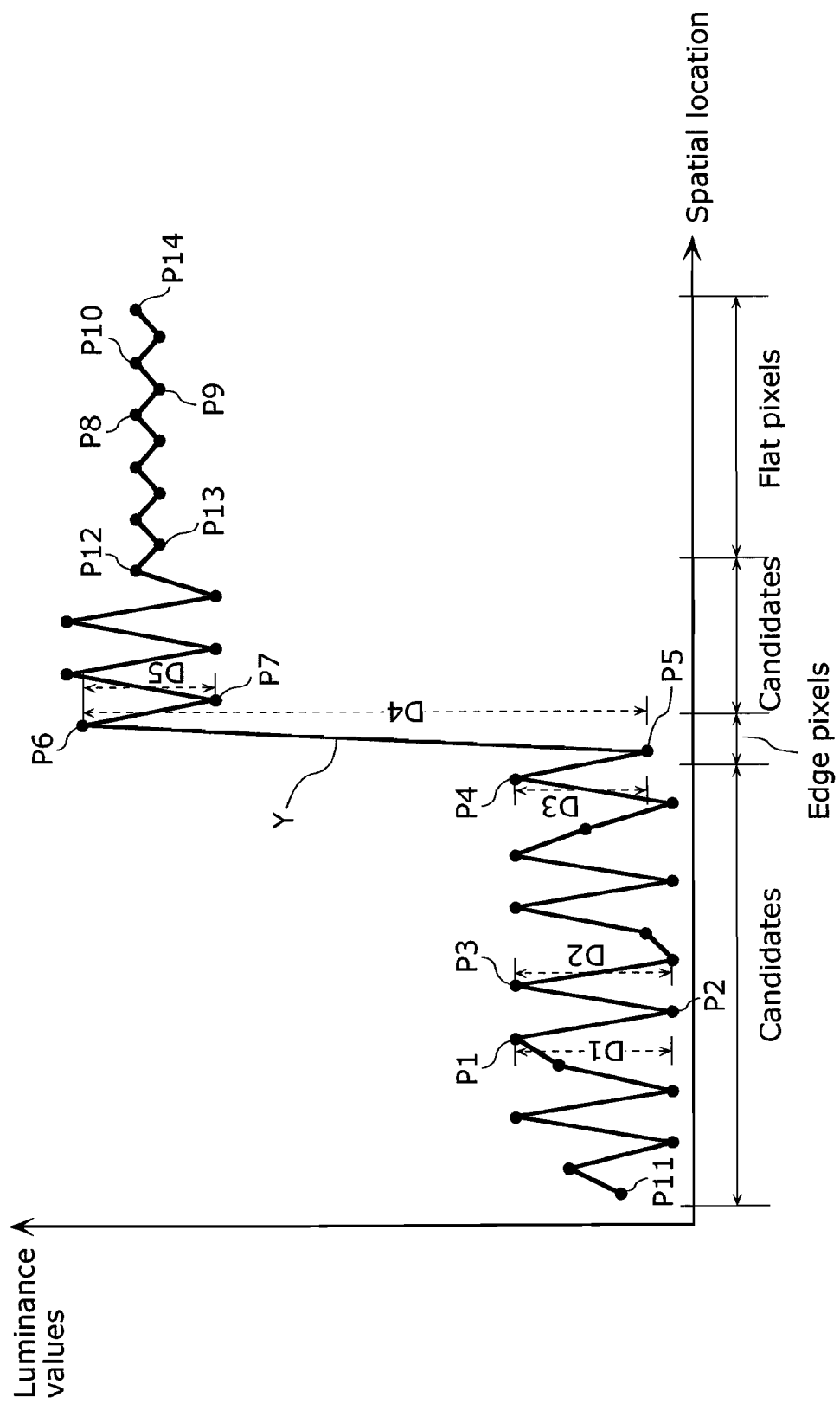
FIG. 9 is a diagram illustrating luminance values of successive pixels of the first embodiment.

FIG. 9 is a diagram illustrating the luminance values of successive pixels.

At Step S401, the candidate selecting unit 301 uses the luminance values of the pixels to select candidates for noise pixels from among the pixels. In FIG. 9, the luminance values of the successive pixels are drawn from the left to the right corresponding to the horizontal direction of images. Herein, although the exemplar is described in one spatial direction, it can be applied to both the horizontal direction and the vertical direction. Ringing artifacts are prone to occur nearby the edges of objects. By examining the pixels forming edges, the locations of candidates for the noise pixels forming ringing artifacts can be selected. Referring to FIG. 9, a luminance value of a pixel P5, forming a part of an edge, has a high difference D4 with a luminance value of a pixel P6, and the luminance value of the pixel P5 has a low difference D3 with a luminance value of a pixel P4. The luminance value of the pixel P6, forming another part of the edge, has the high difference D4 with the luminance value of the pixel P5, and the luminance value of the pixel P6 has a low difference D5 with a luminance value of a pixel P7. A luminance value of a pixel P2, as one of candidates for noise pixels, has a low difference D1 with a luminance value of a pixel P1, and the luminance value of the pixel P2 has a low difference D2 with a luminance value of a pixel P3. In a similar way, a flat region, neither edges nor ringing artifacts, can also be determined by examining luminance values. A luminance value of a pixel P9, forming a part of the flat region, has a very low difference with a luminance value of a pixel P8 and a very low difference with a luminance value of a pixel 10. By examining the differences of luminance values between pixels, the candidate selecting unit 301 selects, as candidates for noise pixels, the pixels located between the locations of a pixel P11 and the pixel P4, and between the locations of the pixel P7 and a pixel P12. Furthermore, the candidate selecting unit 301 determines, as flat pixels, the pixels located between the locations of a pixel P13 and a pixel P14.

Figure 10:
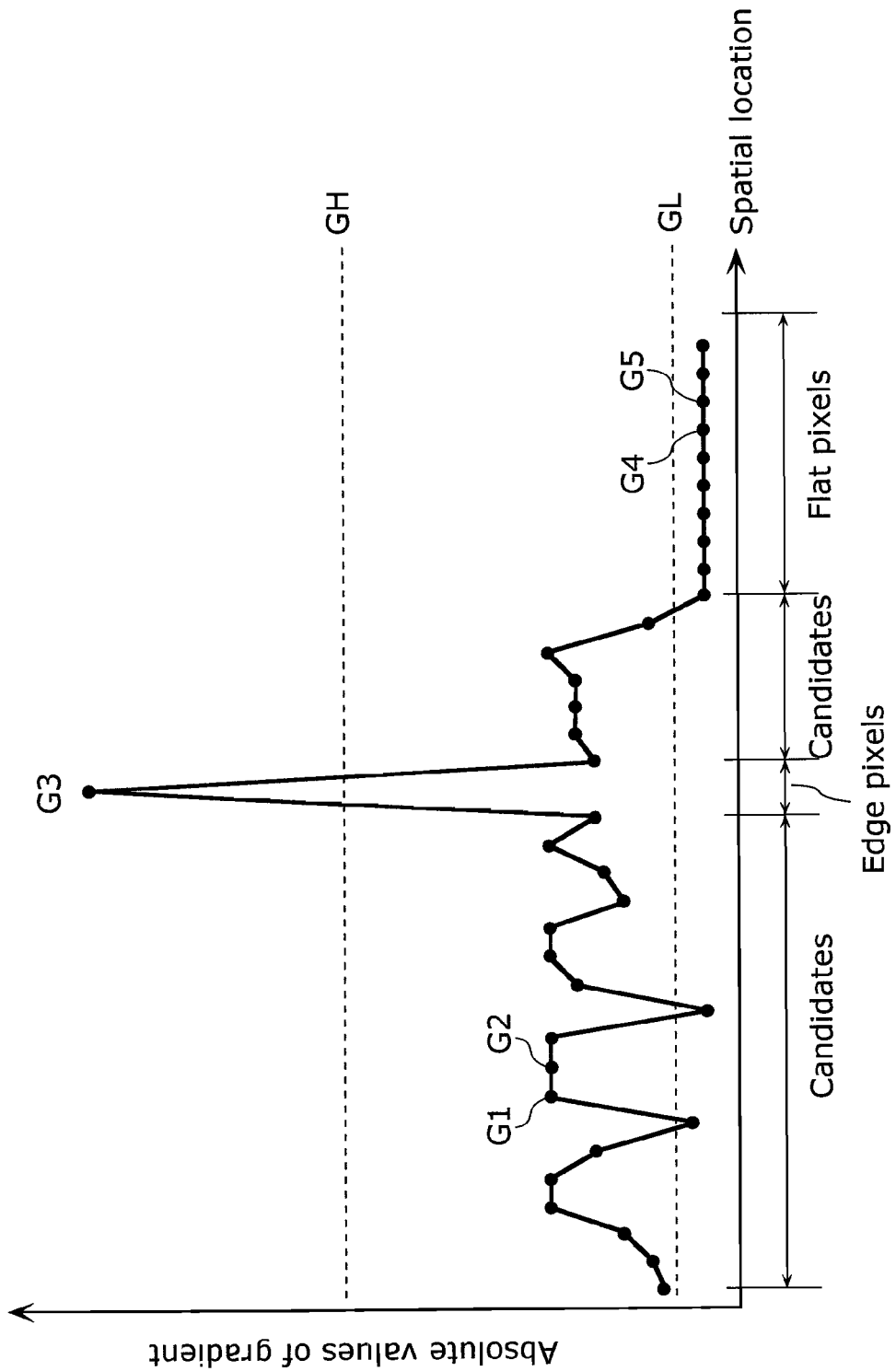
FIG. 10 is a diagram illustrating absolute values of gradients of the successive pixels of the first embodiment.

FIG. 10 is a diagram illustrating the absolute values of the gradients of successive pixels.

As a practical way for the selection of candidates for noise pixels at Step S401, the candidate selecting unit 301 selects candidates using the absolute values of the gradients of the successive pixels. In other words, the candidate selecting unit 301 calculates the absolute values of the gradients of the pixels, that is, the absolute values of the gradients of the luminance values of the successive pixel values. Note that in FIG. 9, the absolute values of the gradients are drawn from left to right corresponding to the horizontal direction of images. Herein, although only one spatial direction is described, it can be applied to both the horizontal direction and the vertical direction.

The candidate selecting unit 301 compares the absolute values of the gradients of respective pixels with a gradient threshold GH and a gradient threshold GL so as to classify each of the pixels as a candidate, an edge pixel or a flat pixel, in order to select candidates for noise pixels. The gradient threshold GH is higher than the gradient threshold GL. In the case where the absolute values of the gradients of pixels are higher than or equal to the gradient threshold GH, the candidate selecting unit 301 classifies pixels corresponding to the absolute values as edge pixels. In the case where the absolute values of the gradients of pixels are less than the gradient threshold GH and higher than or equal to the gradient threshold GL, the candidate selecting unit 301 classifies pixels corresponding to the absolute values as candidates for noise pixels. In the case where the absolute values of the gradients of pixels are less than the gradient threshold GL, the candidate selecting unit 301 classifies pixels corresponding to the absolute values as flat pixels.

For example, the gradient between the pixel P5 and the pixel P6 contributes to an absolute value G3, which is higher than the gradient threshold GH, so the pixel P5 and the pixel P6 are classified as edge pixels. The gradients between the pixel P2 and adjacent pixels contribute to absolute values G1 and G2, which are less than the gradient threshold GH and higher than the gradient threshold GL, so the pixel P2 is classified as a candidate for a noise pixel. Furthermore, the gradient between the pixel P9 and adjacent pixels contribute to absolute values G4 and G5, which are less than the gradient threshold GL, so the pixel P9 is classified as a flat pixel. By examining the absolute values of the gradients of pixels, the pixels located between the locations of the pixel P11 and the pixel P4, and between the location of the pixel P7 and the pixel P12 are selected as candidates for noise pixels. Furthermore, the pixels located between the locations of the pixel P13 and the pixel P14 are determined as flat pixels.

Note that only in the case where absolute values less than the gradient threshold GL are successive for a predetermined number, the candidate selecting unit 301 may classify pixels in the successive range as flat pixels. For example, in the case where an absolute value is less than the gradient threshold GL and absolute values at both adjacent sides of the absolute value are higher than the gradient threshold GL, the candidate selecting unit 301 classifies the pixel corresponding to the absolute value less than the gradient threshold GL as, for example, a candidate for a noise pixel instead of classifying the pixel as a flat pixel.

Figure 11:
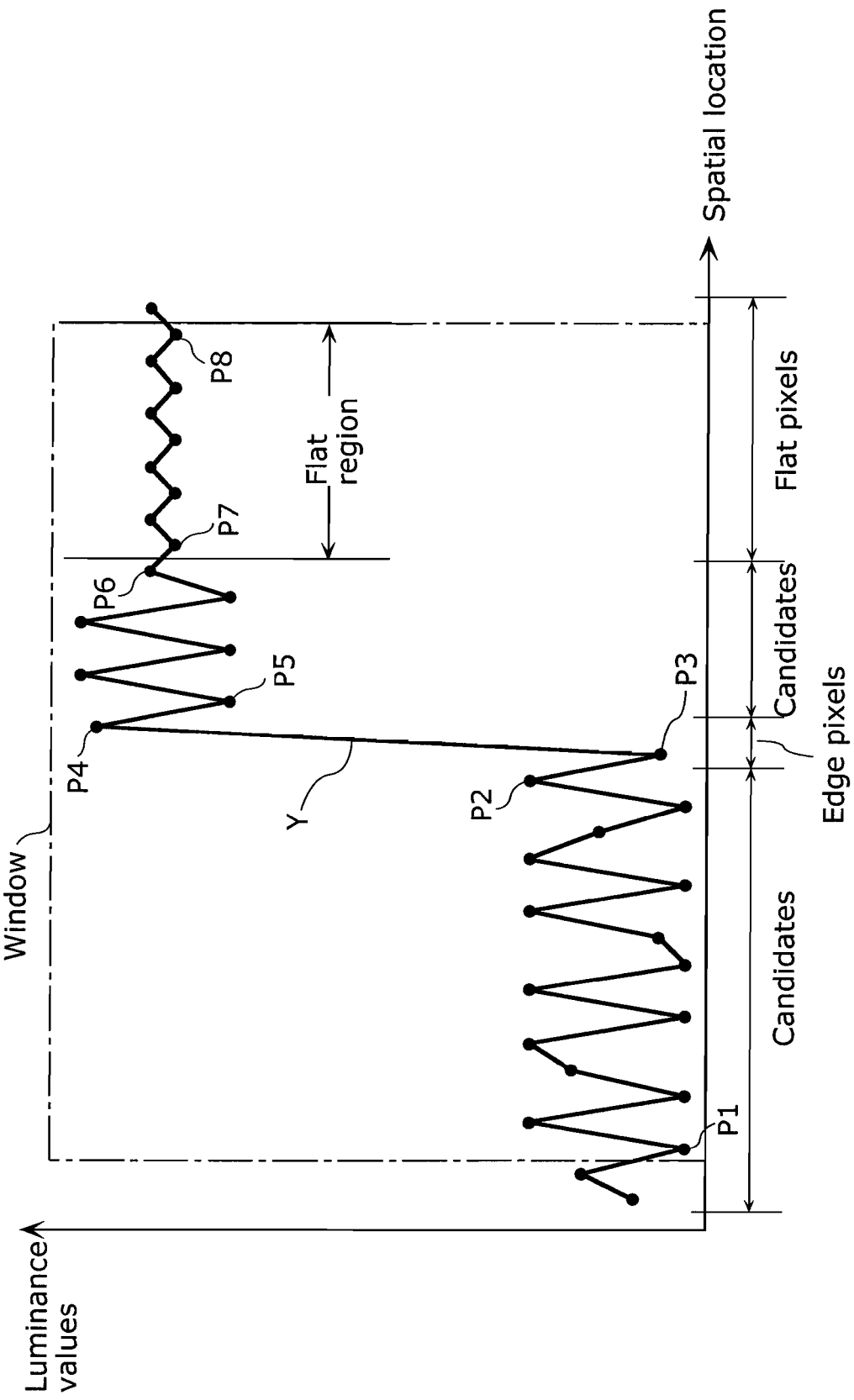
FIG. 11 is a diagram illustrating a relationship between the luminance values of the successive pixels and a window of the first embodiment.
Figure 12:
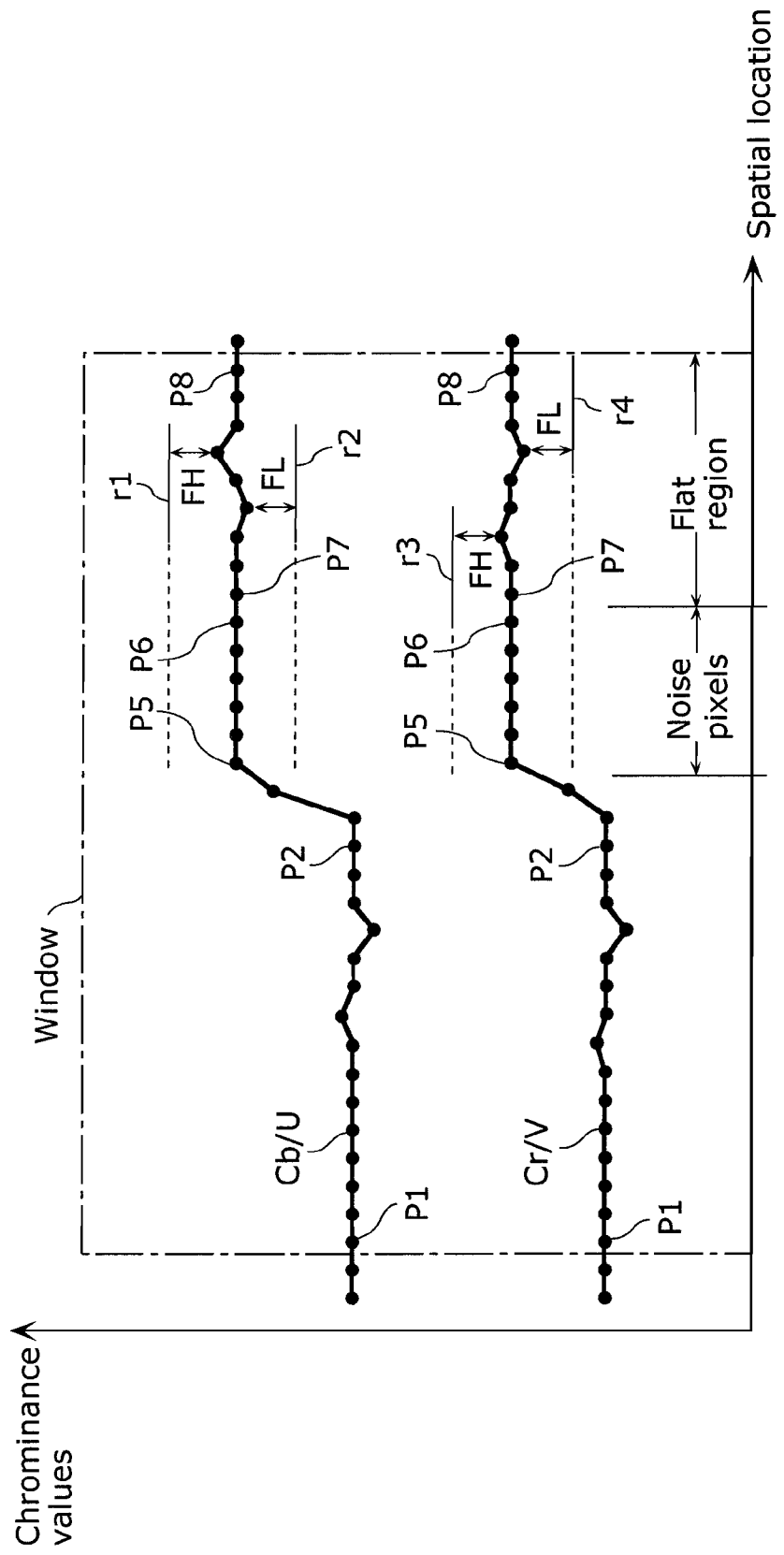
FIG. 12 is a diagram illustrating the distributions of Cb/U and Cr/V of the first embodiment.

With reference to FIG. 11 and FIG. 12, a first exemplar of processing, in Step S601 to Step S603 illustrated in FIG. 8, for determining noise pixels is described.

FIG. 11 is a diagram illustrating a relationship between the luminance values of successive pixels and a window.

A K-pixel window is extended away from edge pixels P3 and P4, where K equals 15 in the case of FIG. 11. In other words, the K-pixel window includes 15 pixels on the right side of the edge pixel P4, and 15 pixels on the left side of the edge pixel P3.

When input image data is received, the chrominance calculating unit 502 of the determining unit 303 sets the above mentioned K-pixel window in such a way that the edge pixels included in the image shown by the input image data comes in the middle of the K-pixel window. Then, the chrominance calculating unit 502 determines a region including successive flat pixels as a flat region. Within the K-pixel window, the chrominance calculating unit 502 determines a region including successive flat pixels as a flat region, when the number of the successive flat pixels is not less than a threshold FB.

In the exemplar illustrated in FIG. 11, as shown at the right of FIG. 11, the chrominance calculating unit 502 determines a region having the pixels between the spatial locations of a pixel P7 and a pixel P8 as a flat region.

FIG. 12 illustrates the distributions of the chrominance components, Cb/U and Cr/V, corresponding to the pixels located between the spatial locations of a pixel P1 and the pixel P8 as shown in FIG. 11. The chrominance calculating unit 502 receives the input image data and calculates the chrominance ranges of the flat region at Step S601. For each of the chrominance components, the maximum of the chrominance range of a flat region equals the maximum of the chrominance values in the flat region plus an offset FH. The minimum of the chrominance range of a flat region equals the minimum of the chrominance values in the flat region minus an offset FL. As illustrated in FIG. 12, the maximum and the minimum of the chrominance range of Cb/U are labeled as r1 and r2 as well as the maximum and the minimum of the chrominance range of Cr/V are labeled as r3 and r4.

In other words, the chrominance calculating unit 502 calculates the chrominance values r2 to r1 as the chrominance range of Cb/U of the flat region and the chrominance values r4 to r3 as the chrominance range of Cr/V of the flat region.

The comparing unit 501 receives the chrominance ranges of the flat region and compares the chrominance values of the candidates with the chrominance ranges of the flat region at Step S602. In the case where the chrominance values of the candidates are in the chrominance ranges of the flat region, the comparing unit 501 determines the candidates as noise pixels at Step S603. As illustrated in FIG. 12, the chrominance values of the candidates located between the spatial locations of a pixel P1 and a pixel P2 are not in the chrominance ranges of the flat region. The chrominance values of the candidates located between the spatial locations of a pixel P5 and a pixel P6 are in the chrominance ranges of the flat region. Therefore, the comparing unit 501 classifies only the candidates located between the spatial locations of the pixel P5 and the pixel P6 as noise pixels as labeled in FIG. 12.

As described, in the present embodiment, in the case where the chrominance values of candidates are in the chrominance ranges of a flat region showing flat blue of sky, for example, the candidates are determined as noise pixels, and thus, it is possible to more appropriately detect noise pixels that make up ringing artifacts than by the conventional technique of judging whether or not the candidates are noise pixels based only on the activity and gradient of pixels. Further, since the filtering with, for example, a low pass filter is performed on the detected noise pixels, it is possible to reduce only ringing artifacts while preserving the above mentioned textures, and consequently, image quality can be improved.

(Variation)

The image processing apparatus 100 according to the present variation obtains the above mentioned input image data as a digital signal, for example, recognizes the location, in an image shown by the input image data, of blocks each of which is used as a unit of coding and decoding the image, and reduces ringing artifacts using the blocks. Note that ringing artifacts occur only within a block that includes edges.

Figure 13:
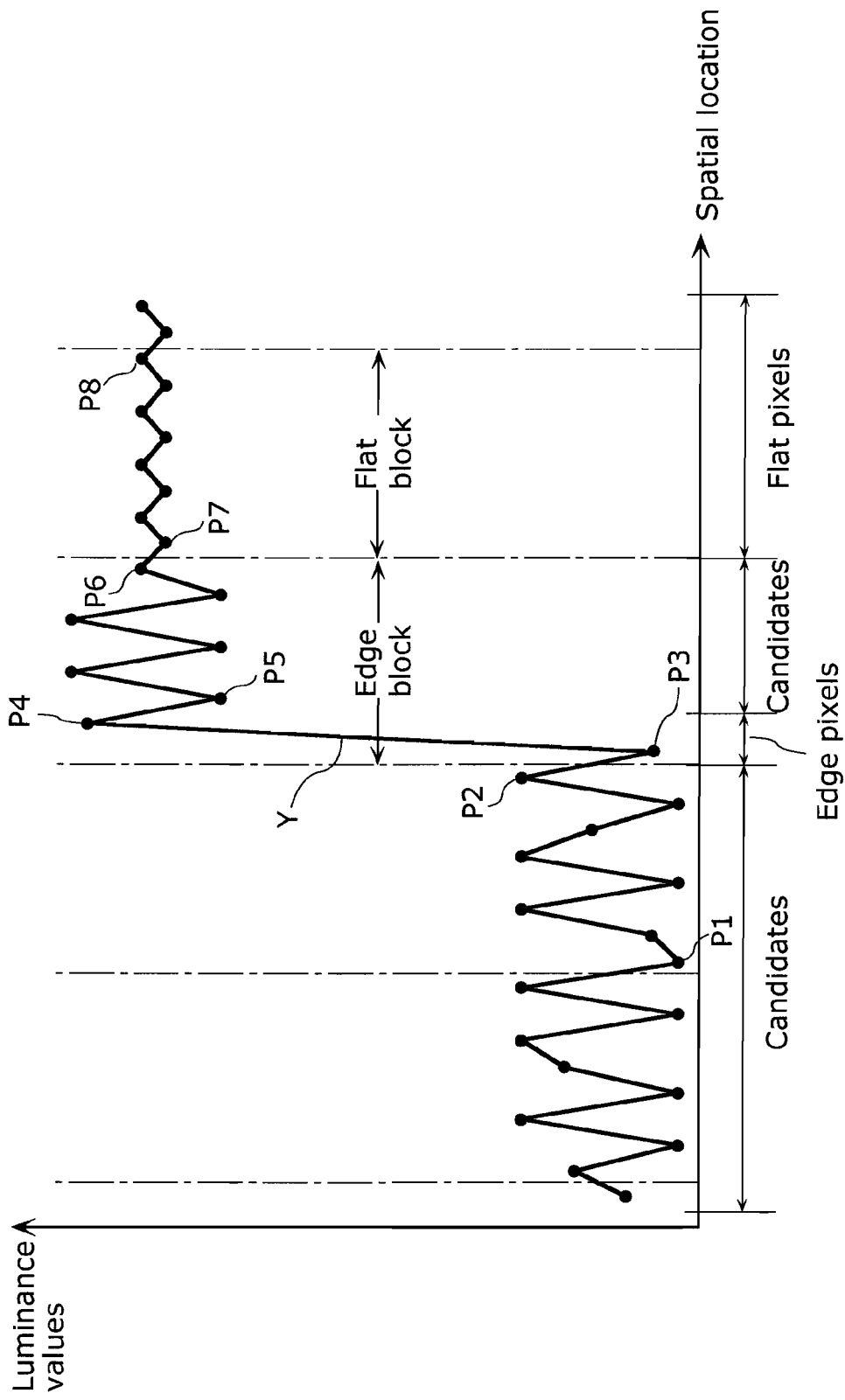
FIG. 13 is a diagram illustrating a relationship between the luminance values of successive pixels and blocks according to a variation of the first embodiment.
Figure 14:
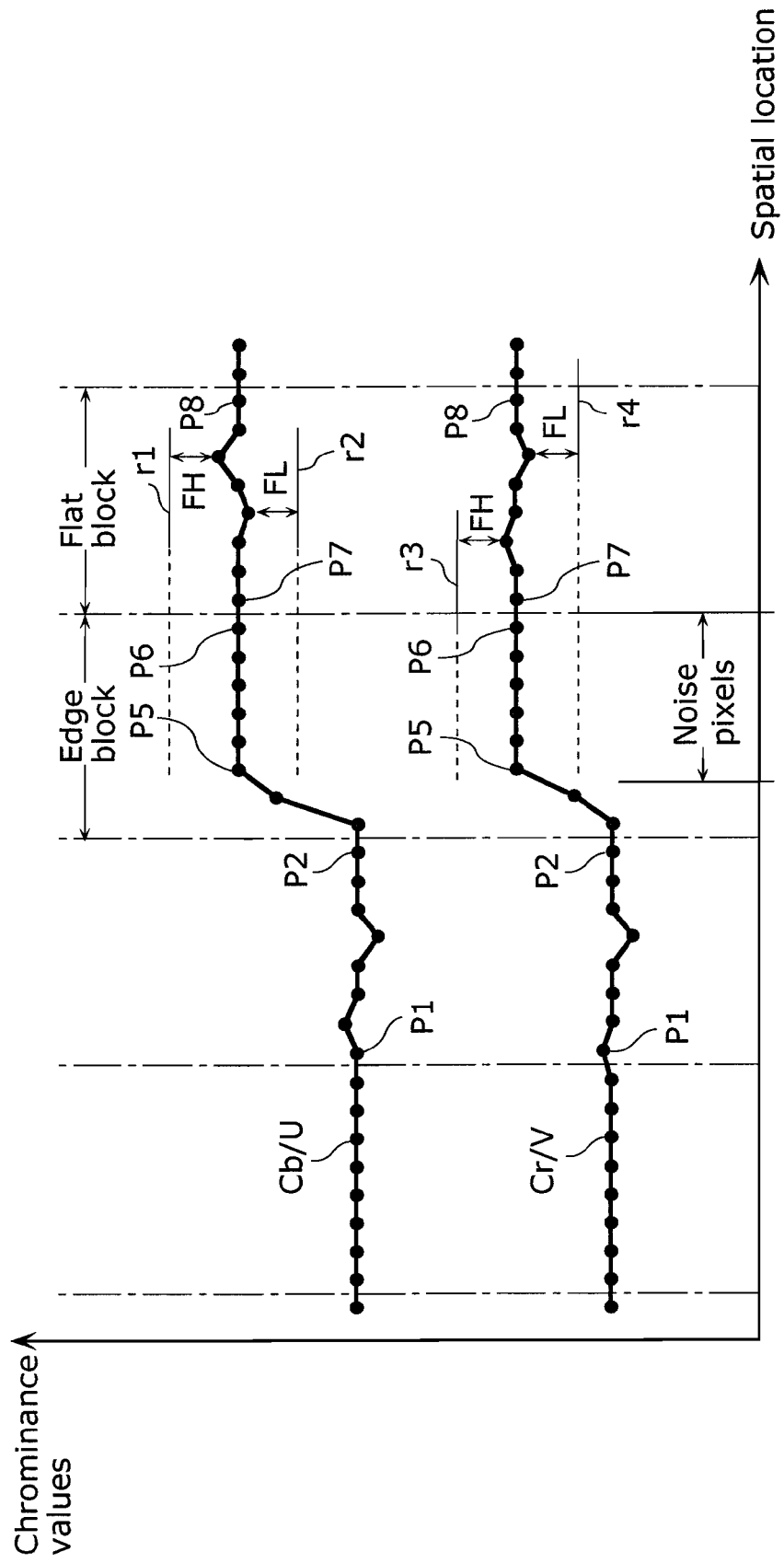
FIG. 14 is a diagram illustrating the distributions of Cb/U and Cr/V according to the above mentioned variation.

With reference to FIG. 13 and FIG. 14, a second exemplar of processing, in Step S601 to Step S603 illustrated in FIG. 8, for determining noise pixels is described.

According to some international standards of image compression such as Moving Picture Experts Group (MPEG) and Joint Photographic Experts Group (JPEG), an image is divided into several 2-D blocks with predefined sizes. For example, there are N lines and M samples/line in a block, where N and M can be 4, 8 or 16.

FIG. 13 is a diagram illustrating a relationship between the luminance values of successive pixels and blocks.

As illustrated in FIG. 13, the successive pixels are separated into several blocks by broken lines based on a compressing standard, where each block includes 8 pixels in one spatial direction.

The chrominance calculating unit 502 of the determining unit 303 determines blocks as flat blocks in the case where only flat pixels are involved in the blocks. For example, as shown at the right of FIG. 13, the chrominance calculating unit 502 determines a block including the pixels located between the spatial locations of a pixel P7 and a pixel P8 as a flat block. On the other hand, the chrominance calculating unit 502 determines blocks as edge blocks in the case where edge pixels are involved in the blocks. For example, as shown in FIG. 13, the chrominance calculating unit 502 determines a block including edge pixels P3 and P4 and candidates located between the spatial locations of a pixel P5 and a pixel P6 as an edge block.

FIG. 14 shows the distributions of the chrominance components, Cb/U and Cr/V, corresponding to the pixels located between the spatial locations of a pixel P1 and the pixel P8 as shown in FIG. 13. The chrominance calculating unit 502 receives the input image data and calculates the chrominance ranges of the flat block at Step S601. The calculation of the chrominance ranges of the flat block is the same as the aforementioned and is not described here. As illustrated in FIG. 14, the maximum and the minimum of the chrominance range of Cb/U are labeled as r1 and r2 as well as the maximum and the minimum of the chrominance range of Cr/V are labeled as r3 and r4.

In other words, the chrominance calculating unit 502 calculates the chrominance values r2 to r1 as the chrominance range of Cb/U of the flat block and the chrominance values r4 to r3 as the chrominance range of Cr/V of the flat block.

The comparing unit 501 receives the chrominance ranges of the flat block and compares the chrominance values of the candidates with the chrominance ranges of the flat block at Step S602. In the case where the chrominance values of the candidates are in the chrominance ranges of the flat block, the comparing unit 501 determines the candidates as noise pixels at Step S603. As shown in FIG. 14, the chrominance values of the candidates located between the spatial locations of the pixel P5 and the pixel P6 are in the chrominance ranges of the flat block. Therefore, the comparing unit 501 classifies the candidates located between the spatial locations of the pixel P5 and the pixel P6 as noise pixels as labeled in FIG. 12.

Figure 15:
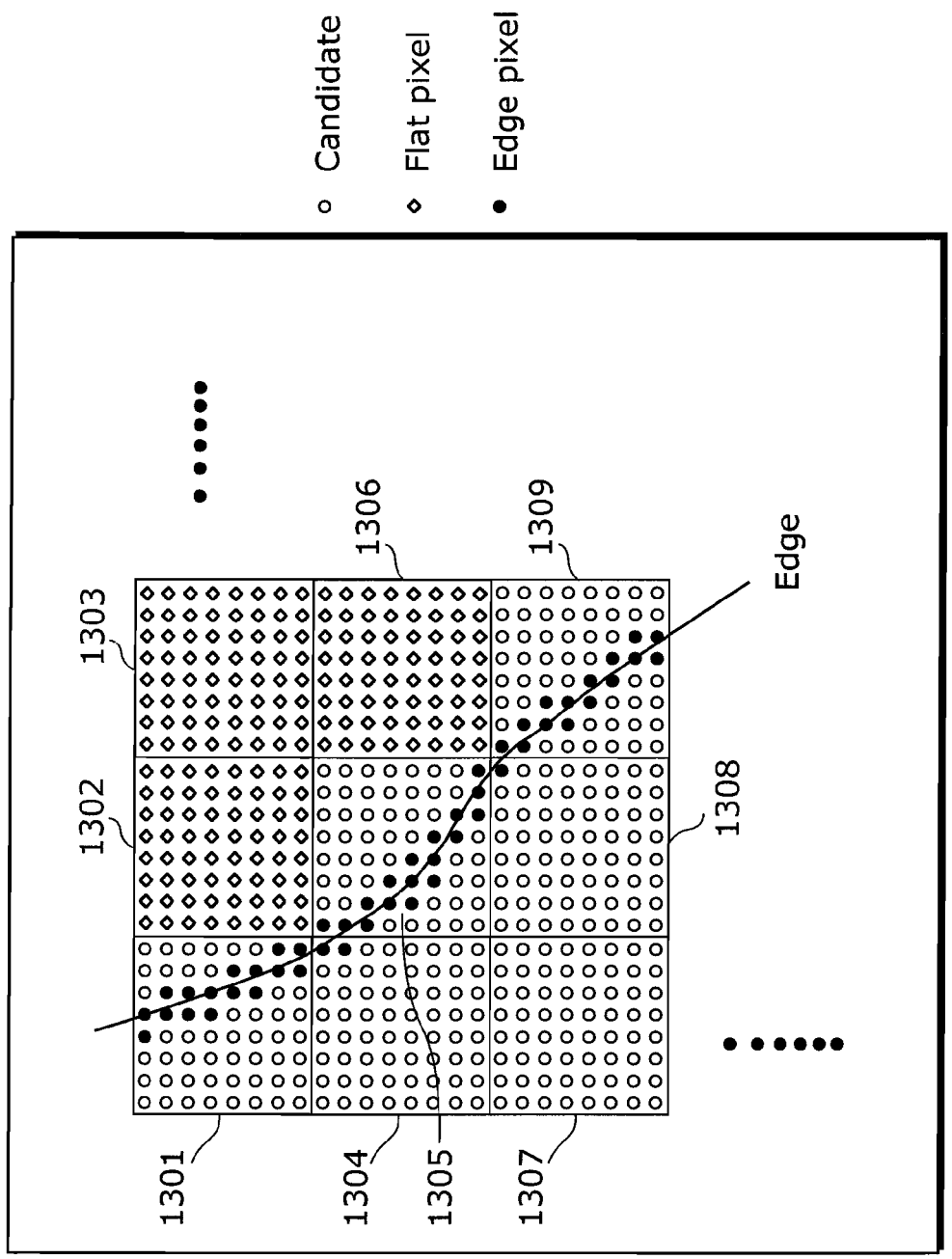
FIG. 15 is a diagram illustrating an image, and blocks and pixels included in the image according to the above mentioned variation.
Figure 16:
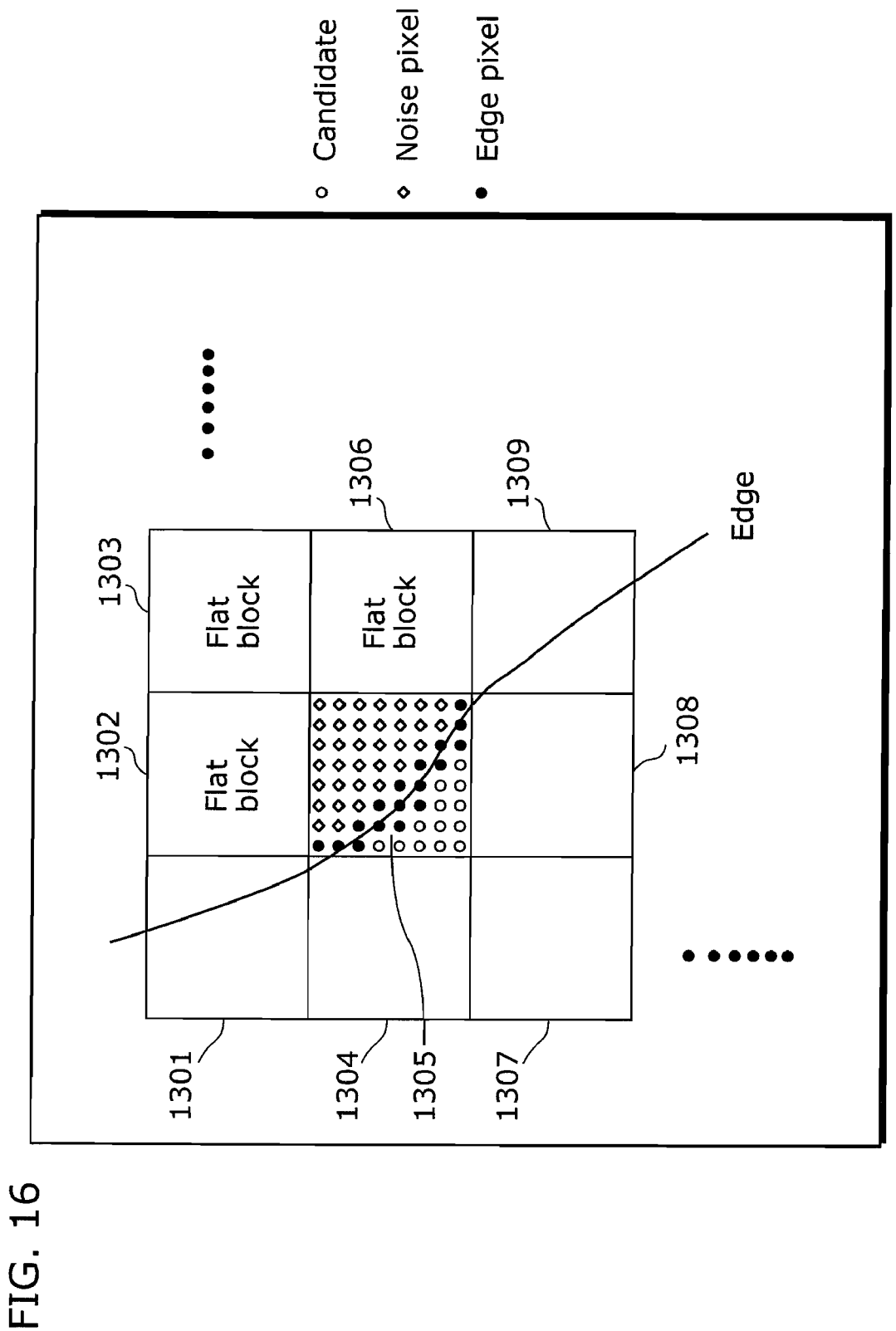
FIG. 16 is a diagram illustrating a result of determination performed by a chrominance calculating unit according to the above mentioned variation.

With a 2-D exemplar illustrated in FIG. 15 and FIG. 16, a description is provided on processing for determining noise pixels from candidates, performed by the determining unit 303 according to the present variation, in Step 601 through Step S603 illustrated in FIG. 8.

FIG. 15 is a diagram illustrating an image, and blocks and pixels included in the image.

Images are divided into several blocks according to some international standards of image compression such as MPEG and JPEG. Here, 9 blocks 1301 to 1309 are drawn. Each block includes 8×8 pixels, which are drawn as various kinds of symbols. An edge line crosses over the blocks 1301, 1305 and 1309. As illustrated in FIG. 15, edge pixels are marked with the filled circle "●" along the edge. Candidates are marked with the hollow circle "○". Flat pixels are marked with the rhombus "◇". The chrominance calculating unit 502 determines blocks as flat blocks in the case where only flat pixels are involved in the blocks, and determines blocks as edge blocks in the case where edge pixels are involved in the blocks.

FIG. 16 is a diagram illustrating a result of the determination performed by the chrominance calculating unit 502.

As illustrated in FIG. 16, the blocks 1302, 1303 and 1306 include only flat pixels, so they are determined as flat blocks. The blocks 1301, 1305 and 1309 include edge pixels, so they are determined as edge blocks.

Considering the block 1305, which is determined as an edge block, the comparing unit 501 compares the chrominance values of the candidates inside the block 1305 with the chrominance ranges of the adjacent flat blocks 1302, 1303, and 1306. In the case where the chrominance values of the candidates inside the block 1305 are in the chrominance ranges of the flat blocks 1302, 1303 and 1306, the comparing unit 501 determines the candidates as noise pixels. In other words, as illustrated in FIG. 16, the candidates at the top right of the block 1305 are determined as noise pixels and marked with the rhombus "◇".

As described, according to the present variation, since ringing artifacts occur only in edge blocks, only candidates inside the edge blocks are judged whether or not they are noise pixels. As a result, it is possible to reduce the burden of judging whether or not the candidates are noise pixels, and easily determine noise pixels without the need to set a window, as required in the above embodiment.

Second Embodiment

A second embodiment of the present invention is described with reference to FIG. 17 to FIG. 20. Note that the configuration of the image processing apparatus according to the second embodiment is the same as the configuration illustrated in FIGS. 3, 5, and 7 of the first embodiment and is not described again. Note that also in the present embodiment as in the first embodiment, the image processing apparatus 100 obtains the above mentioned input image data as an analog signal, for example, and reduces ringing artifacts without recognizing the location, in an image shown by the input image data, of blocks each of which is used as a unit of coding and decoding the image.

Figure 17:
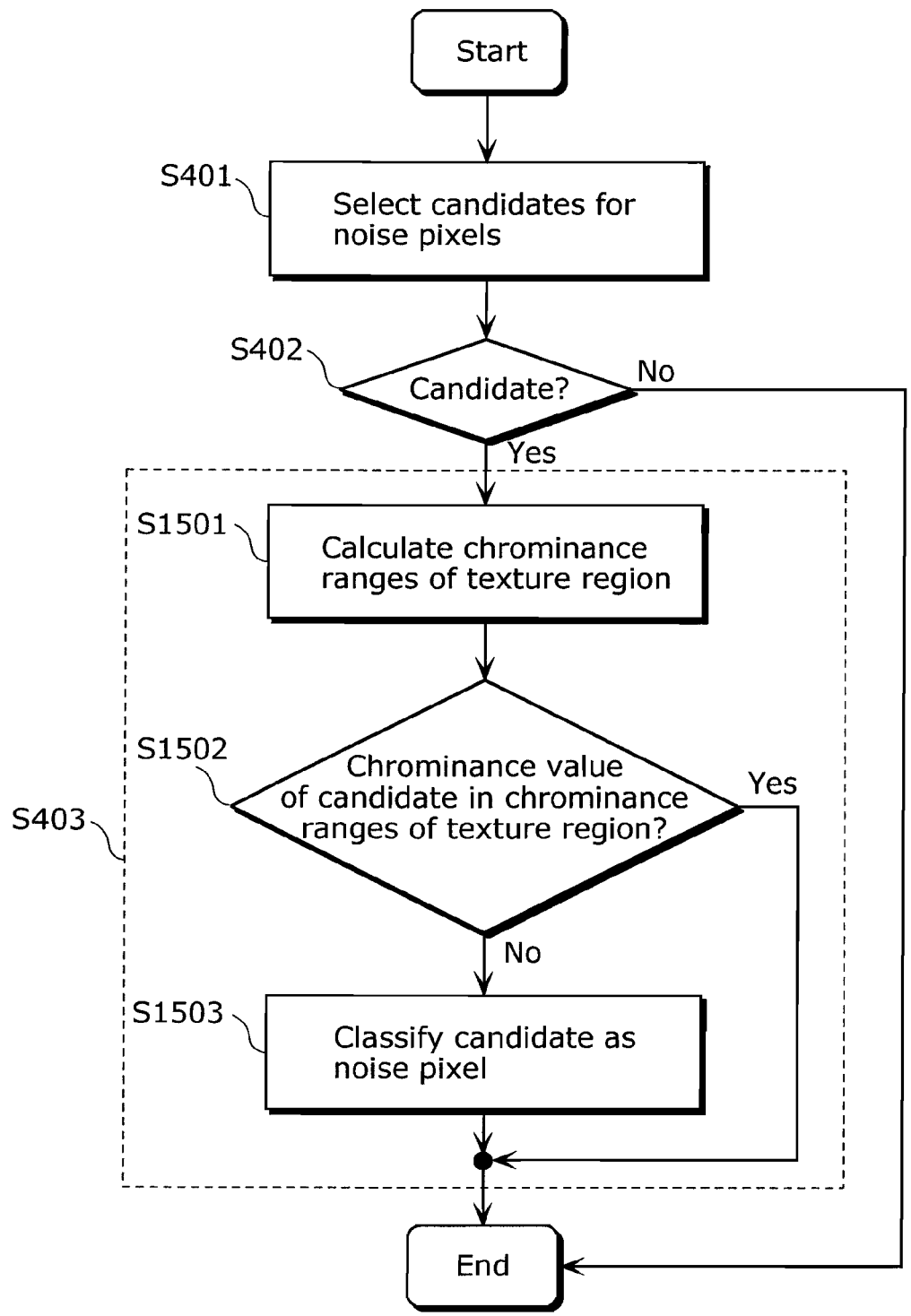
FIG. 17 is a flowchart illustrating detailed operations of a detecting unit according to a second embodiment of the present invention.

FIG. 17 is a flowchart illustrating detailed operations of a detecting unit 101 according to the present embodiment. Step S401 and Step S402 are the same as the Steps described in FIG. 6. The selection of candidates for noise pixels at Step S401 is the same as the aforementioned in the first embodiment. No redundant description is repeated here. Step S403 includes Step S1501, Step S1502 and Step S1503. At Step S1501, the detecting unit 101 calculates the chrominance ranges of an after-mentioned texture region. At Step S1502, the detecting unit 101 compares the chrominance values of candidates and the chrominance ranges of the texture region. In the case where the chrominance values of the candidates are not in the chrominance ranges of the texture region, the detecting unit 101 judges that the candidates are noise pixels at Step S1503. In other words, the detecting unit 101 classifies the candidates as noise pixels. In the case where the chrominance values are in the chrominance ranges, the detecting unit 101 judges that the candidates are not noise pixels. In other words, the detecting unit 101 jumps over the processing in Step S1503 on the candidates and finishes the operation of Step S403. The details of each operation in the above described flow are described below.

At Step S401, as illustrated in FIG. 10, the candidate selecting unit 301 of the detecting unit 101 selects candidates for noise pixels by classifying pixels included in the input image data as candidates for noise pixels, edge pixels, or flat pixels using the absolute values of the gradients of pixels, as in the first embodiment.

Figure 18:
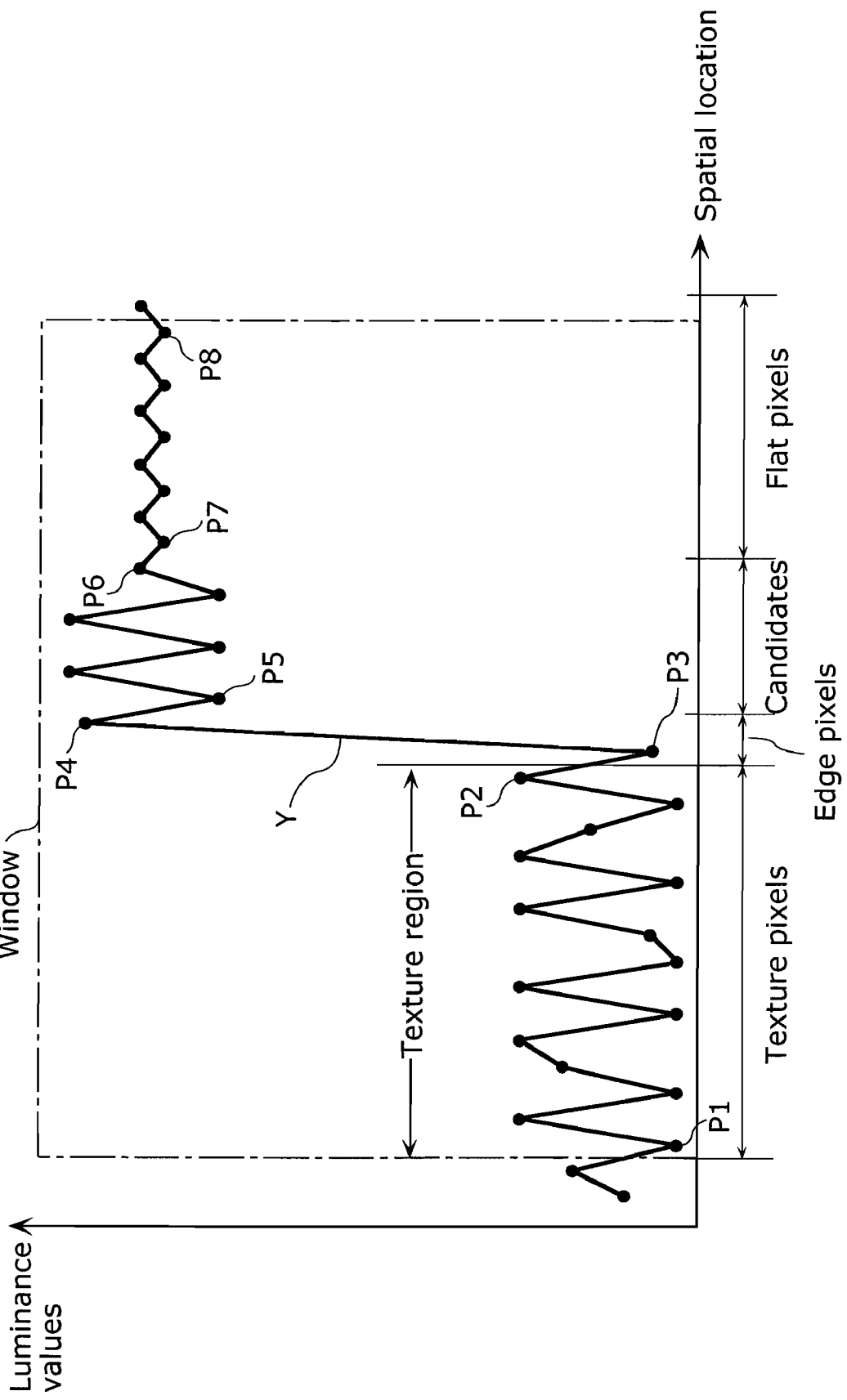
FIG. 18 is a diagram illustrating a relationship between the luminance values of successive pixels and a window of the second embodiment.
Figure 19:
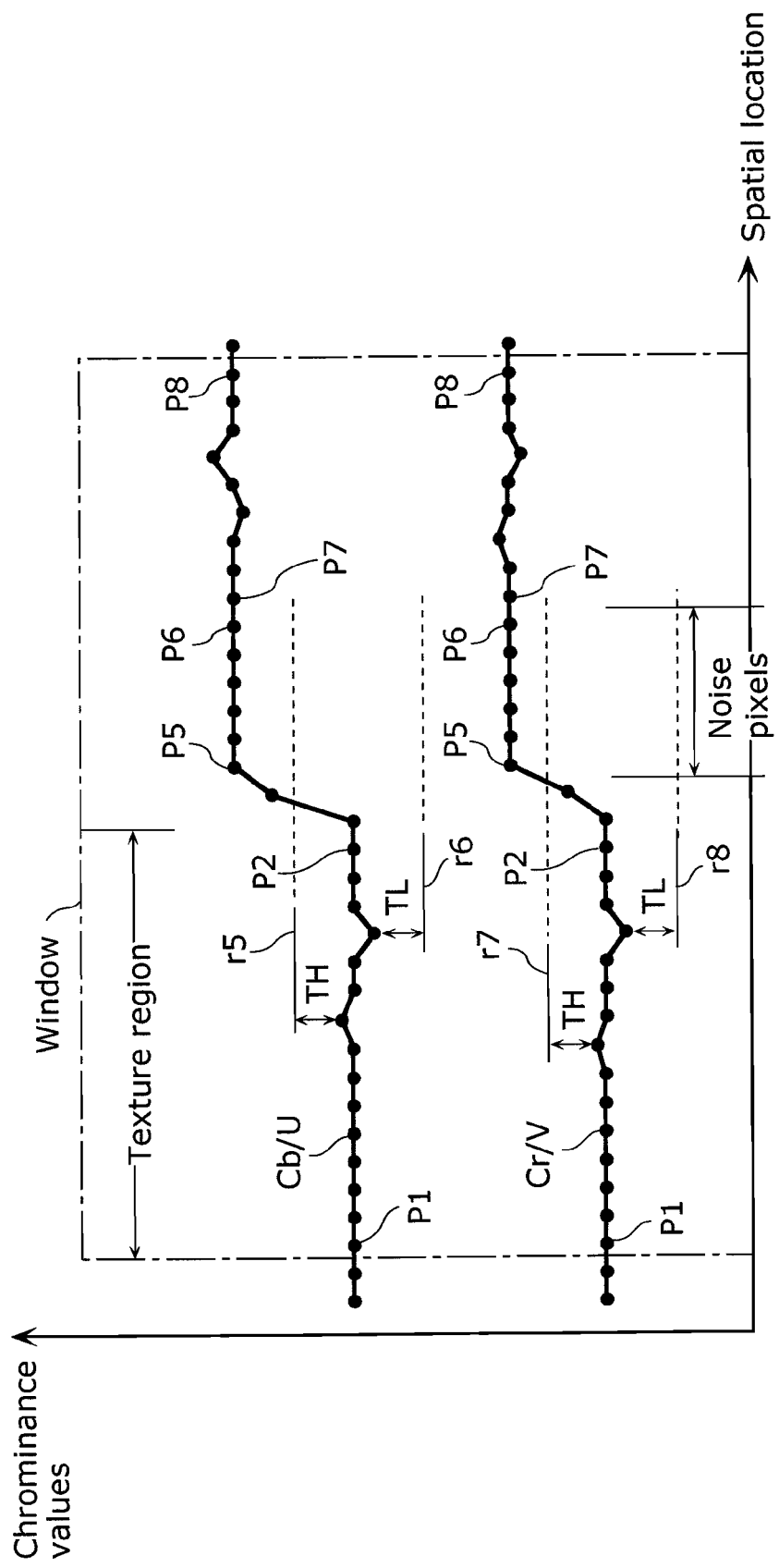
FIG. 19 is a diagram illustrating the distributions of Cb/U and Cr/V of the second embodiment.

With reference to FIG. 18 and FIG. 19, a description is provided on a first exemplar of processing for determining noise pixels in Step S1501 to Step S1503 illustrated in FIG. 17.

FIG. 18 is a diagram illustrating a relationship between the luminance values of successive pixels and a window.

A K-pixel window is extended away from edge pixels P3 and P4, where K equals 15 in the case of FIG. 18. In other words, the K-pixel window includes 15 pixels on the right side of the edge pixel P4, and 15 pixels on the left side of the edge pixel P3.

When input image data is received, the chrominance calculating unit 502 of the determining unit 303 sets the above mentioned K-pixel window in such a way that an edge pixel included in an image shown by the input image data comes in the middle of the K-pixel window. Then, the chrominance calculating unit 502 determines a region including successive candidates as a texture region. In other words, within the K-pixel window, the chrominance calculating unit 502 determines a region including successive candidates as a texture region, when the number of the successive candidates is not less than a threshold TB.

In the exemplar illustrated in FIG. 18, as shown at the left of FIG. 18, the chrominance calculating unit 502 determines a region having the pixels between the spatial locations of a pixel P1 and a pixel P2 as a texture region. Also, the pixels inside the texture region are classified as texture pixels.

FIG. 19 is a diagram illustrating the distributions of the chrominance components, Cb/U and Cr/V, corresponding to the pixels located between the spatial locations of the pixel P1 and a pixel P8 as shown in FIG. 18. The chrominance calculating unit 502 receives the input image data and calculates the chrominance ranges of the texture region at Step S1501. For each of the chrominance components, the maximum of the chrominance range of the texture region equals the maximum of the chrominance values in the texture region plus an offset TH. The minimum of the chrominance range of the texture region equals the minimum of the chrominance values in the texture region minus an offset TL. As shown in FIG. 19, the maximum and the minimum of the chrominance range of Cb/U are labeled as r5 and r6 as well as the maximum and the minimum of the chrominance range of Cr/V are labeled as r7 and r8.

In other words, the chrominance calculating unit 502 calculates the chrominance values r6 to r5 as the chrominance range of Cb/U of the texture region and the chrominance values r8 to r7 as the chrominance range of Cr/V of the texture region.

The comparing unit 501 receives the chrominance ranges of texture region and compares the chrominance values of the candidates with the chrominance ranges of the texture region at Step 1502. In the case where the chrominance values of the candidates are not in the chrominance ranges of the texture region, the comparing unit 501 determines the candidates are noise pixels at Step 1503. As shown in FIG. 19, the chrominance values of the candidates located between the spatial locations of a pixel P1 and a pixel P2 are in the chrominance ranges of the texture region. The chrominance values of the candidates located between the spatial locations of a pixel P5 and a pixel P6 are not in the chrominance ranges of the texture region. Therefore, the comparing unit 501 classifies only the candidates located between the spatial locations of the pixel P5 and the pixel P6 as noise pixels as labeled in FIG. 19.

As described, in the present embodiment, in the case where the chrominance values of candidates are not in the chrominance ranges of a texture region showing fine patterns of objects such as mountains, the candidates are determined as noise pixels, and thus, it is possible to more appropriately detect noise pixels that make up ringing artifacts than by the conventional technique of judging whether or not the candidates are noise pixels based only on the activity and gradient of the pixels. Further, since the filtering with, for example, a low pass filter is performed on the detected noise pixels, it is possible to reduce only ringing artifacts while preserving the above mentioned textures, and consequently, image quality can be improved.

(Variation)

The image processing apparatus 100 according to the present variation obtains the above mentioned input image data as a digital signal, for example, recognizes the location, in an image shown by the input image data, of blocks each which is used as a unit of coding and decoding the image, and reduces ringing artifacts using the blocks. Note that ringing artifacts occur only within a block that includes edges.

Figure 20:
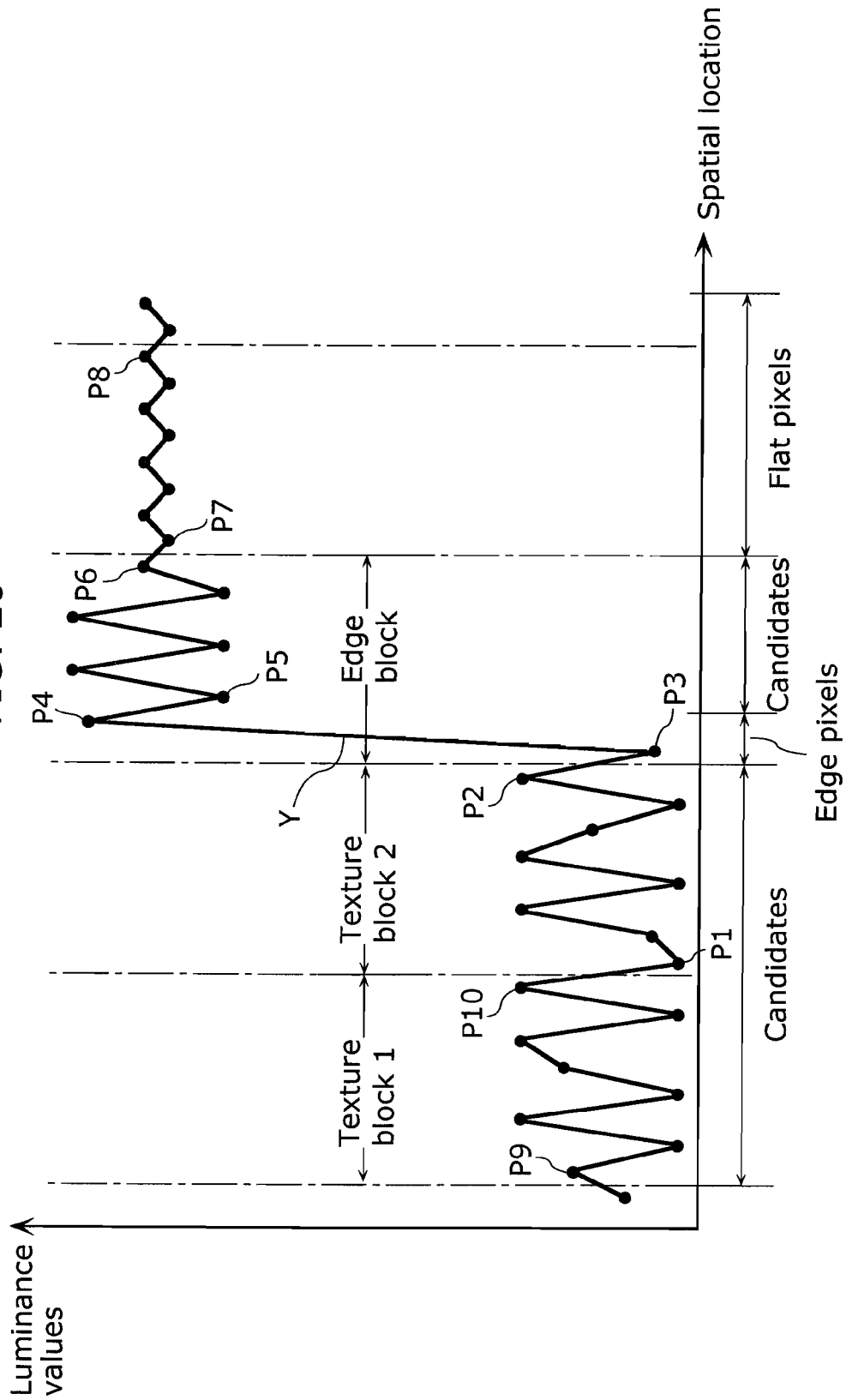
FIG. 20 is a diagram illustrating a relationship between the luminance values of successive pixels and blocks according to a variation of the second embodiment.
Figure 21:
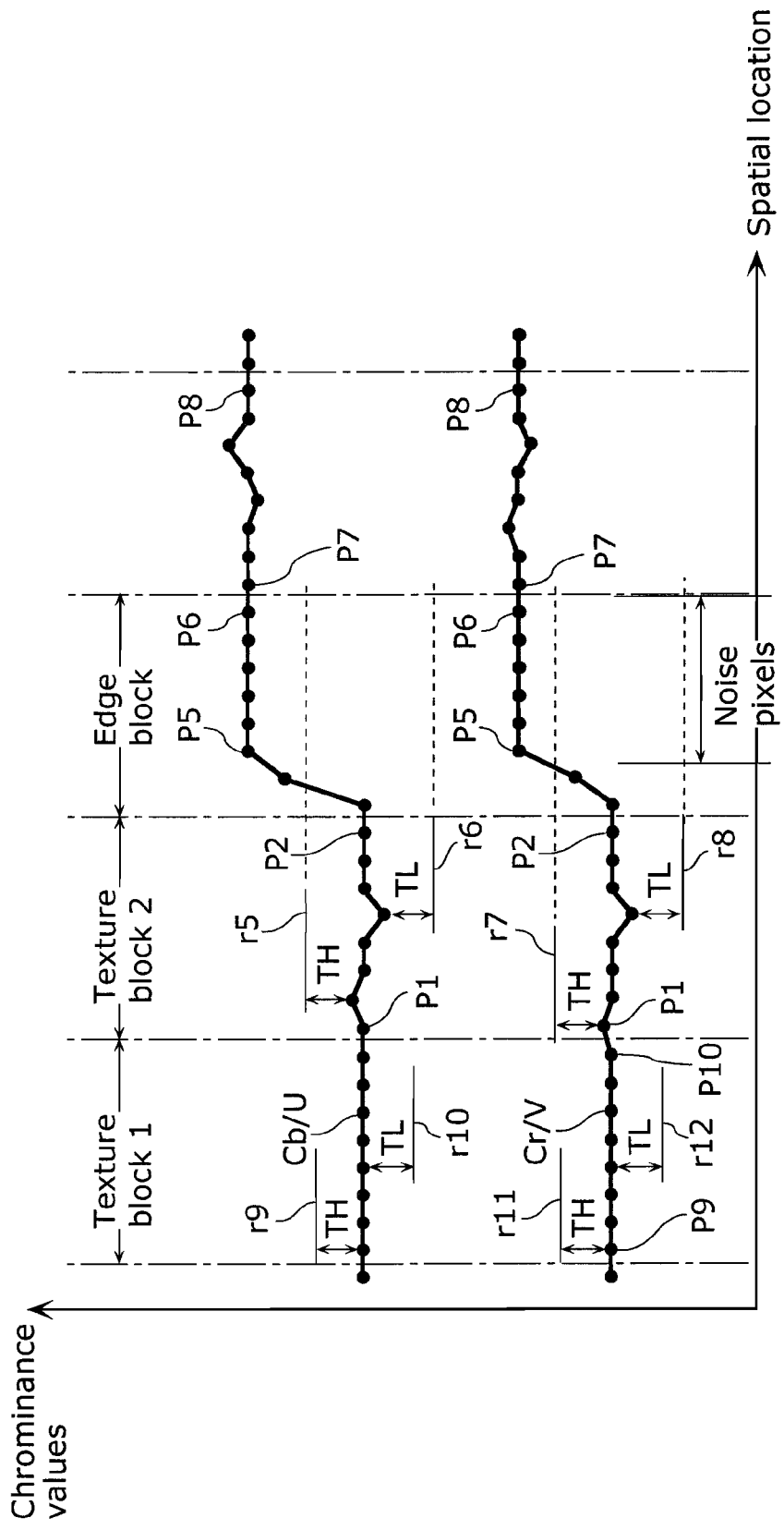
FIG. 21 is a diagram illustrating the distributions of Cb/U and Cr/V according to the above mentioned variation.

With reference to FIG. 20 and FIG. 21, a description is provided on a second exemplar of processing for determining noise pixels in Step S1501 to Step S1503 illustrated in FIG. 17.

According to some international standards of image compression such as MPEG and JPEG, an image is divided into several 2-D blocks with predefined sizes. For example, there are N lines and M samples/line in a block, where N and M can be 4, 8 or 16.

FIG. 20 is a diagram illustrating a relationship between the luminance values of successive pixels and blocks.

As illustrated in FIG. 20, the successive pixels are separated into several blocks by broken lines based on a compressing standard, where each block includes 8 pixels in one spatial direction.

The chrominance calculating unit 502 of the determining unit 303 determines blocks as texture blocks in the case where only candidates are involved in the blocks. For example, as shown at the left of FIG. 20, the chrominance calculating unit 502 determines a block including the pixels located between the spatial locations of a pixel P9 and a pixel P10 and a block including the pixels located between the spatial locations of a pixel P1 and a pixel P2 as a texture block 1 and a texture block 2, respectively. On the other hand, the chrominance calculating unit 502 determines blocks as edge blocks in the case where edge pixels are involved in the blocks. For example, as shown in FIG. 20, a block including edge pixels P3 and P4 and candidates located between the spatial locations of a pixel P5 and a pixel P6 is determined as an edge block.

FIG. 21 is a diagram illustrating the distributions of the chrominance components, Cb/U and Cr/V, corresponding to the pixels located between the spatial locations of the pixel P9 and a pixel P8 as shown in FIG. 20. The chrominance calculating unit 502 receives the input image data and calculates the chrominance ranges of the texture blocks at Step S1501. The calculation of the chrominance ranges of the texture blocks is the same as the aforementioned and is not described here. As shown in FIG. 20, for the texture block 1, the maximum and the minimum of the chrominance range of Cb/U are labeled as r9 and r10 as well as the maximum and the minimum of the chrominance range of Cr/V are labeled as r11 and r12. For the texture block 2, the maximum and the minimum of the chrominance range of Cb/U are labeled as r5 and r6 as well as the maximum and the minimum of the chrominance range of Cr/V are labeled as r7 and r8.

In other words, the chrominance calculating unit 502 calculates the chrominance values r10 to r9 as the chrominance range of Cb/U of the texture block 1 and the chrominance values r12 to r11 as the chrominance range of Cr/V of the texture block 1. Further, the chrominance calculating unit 502 calculates the chrominance values r6 to r5 as the chrominance range of Cb/U of the texture block 2 and the chrominance values r8 to r7 as the chrominance range of Cr/V of the texture block 2.

The comparing unit 501 receives the chrominance ranges of the texture blocks and compares the chrominance values of the candidates with the chrominance ranges of the texture blocks at Step 1502. In the case where the chrominance values of the candidates are not in the chrominance ranges of the texture blocks, the comparing unit 501 determines the candidates as noise pixels at Step 1503. As shown in FIG. 21, the chrominance values of the candidates located between the spatial locations of the pixel P5 and the pixel P6 are not in the chrominance ranges of the texture blocks 1 and 2. Therefore, the comparing unit 501 classifies the candidates located between the spatial locations of the pixel P5 and the pixel P6 as noise pixels as labeled in FIG. 21.

Figure 22:
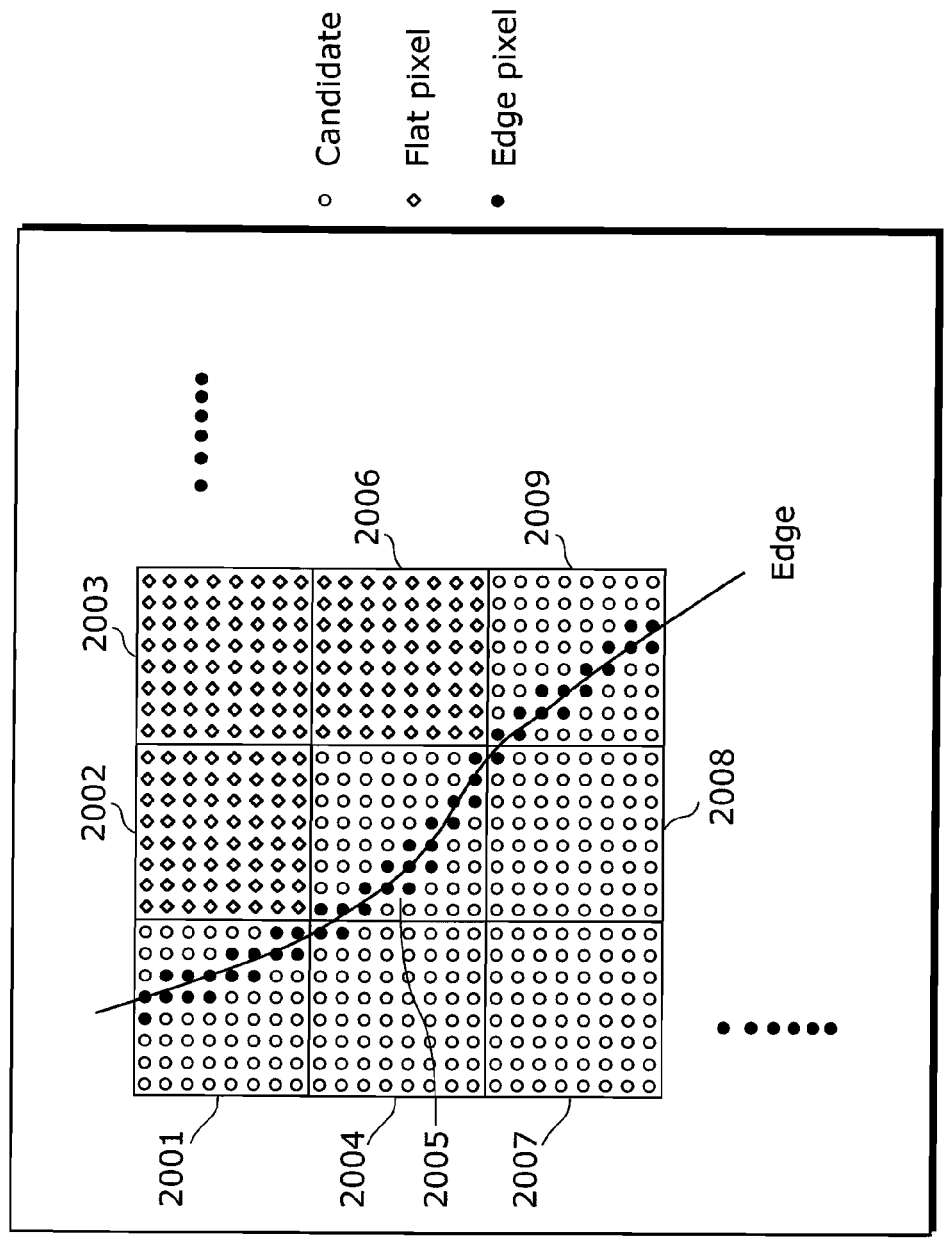
FIG. 22 is a diagram illustrating an image, and blocks and pixels included in the image according to the above mentioned variation.
Figure 23:
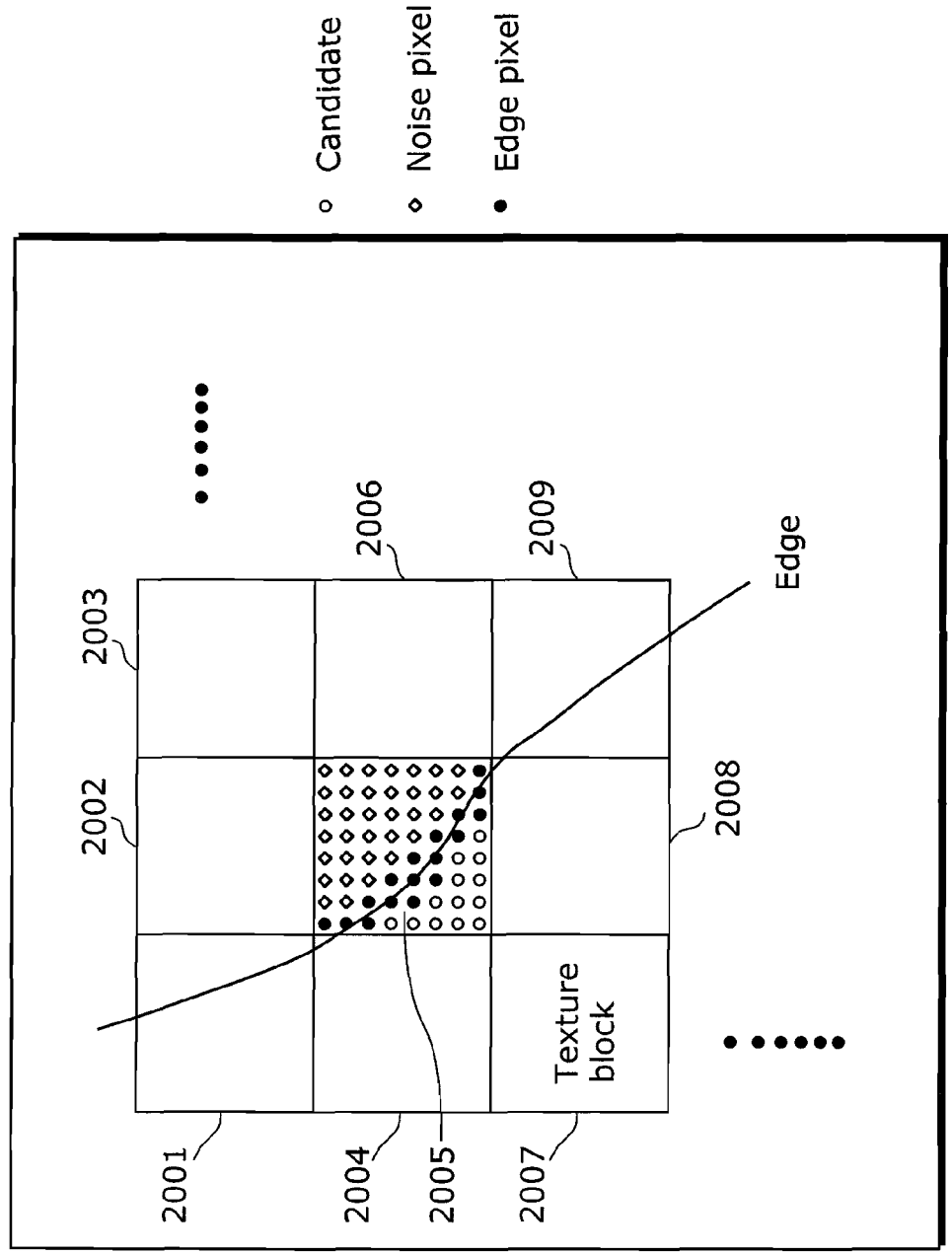
FIG. 23 is a diagram illustrating a result of determination performed by a chrominance calculating unit according to the above mentioned variation.

With a 2-D exemplar illustrated in FIG. 22 and FIG. 23, a description is provided on processing for determining noise pixels from candidates, performed by the determining unit 303 according to the present variation in Step 1501 through Step S1503 illustrated in FIG. 17.

FIG. 22 is a diagram illustrating an image, and blocks and pixels included in the image.

Images are divided into several blocks according to some international standards of image compression such as MPEG and JPEG. Here, 9 blocks 2001 to 2009 are drawn. Each block includes 8×8 pixels, which are drawn as various kinds of symbols. An edge line crosses over the blocks 2001, 2005 and 2009. As illustrated in FIG. 22, edge pixels are marked with the filled circle "●" along the edge. Candidates are marked with the hollow circle "○". Flat pixels are marked with the rhombus "◊". The chrominance calculating unit 502 determines blocks as texture blocks in the case where only candidates are involved in the blocks, and determines blocks as edge blocks in the case where edge pixels are involved in the blocks.

FIG. 23 is a diagram illustrating a result of the determination performed by the chrominance calculating unit 502.

Referring to FIG. 23, the block 2007 includes only candidates, so it is determined as a texture block. The blocks 2001, 2005 and 2009 include edge pixels, so they are determined as edge blocks.

Considering the block 2005, which is determined as an edge block, the comparing unit 501 compares the chrominance values of the candidates inside the block 2005 with the chrominance ranges of the adjacent texture block 2007. In the case where the chrominance values of the candidates inside the block 2005 are not in the chrominance ranges of the texture block 2007, the comparing unit 501 determines the candidates as noise pixels. In other words, as illustrated in FIG. 23, the candidates at the top right of the block 2005 are determined as noise pixels and marked with the rhombus "◊".

As described, according to the present variation, since ringing artifacts occur only in edge blocks, only candidates inside the edge blocks are judged whether or not they are noise pixels. As a result, it is possible to reduce the burden of judging whether or not the candidates are noise pixels, and easily determine noise pixels without the need to set a window, as required in the above embodiment.

Third Embodiment

A third embodiment of the present invention is described with reference to FIG. 24 to FIG. 31. The image processing apparatus 100 according to the present embodiment determines noise pixels by performing processing combining the processing of the first embodiment and the processing of the second embodiment. Note that also in the present embodiment as in the first and second embodiments, the image processing apparatus 100 obtains the above mentioned input image data as an analog signal, for example, and reduces ringing artifacts without recognizing the location, in an image shown by the input image data, of blocks each of which is used as a unit of coding and decoding the image.

Figure 24:
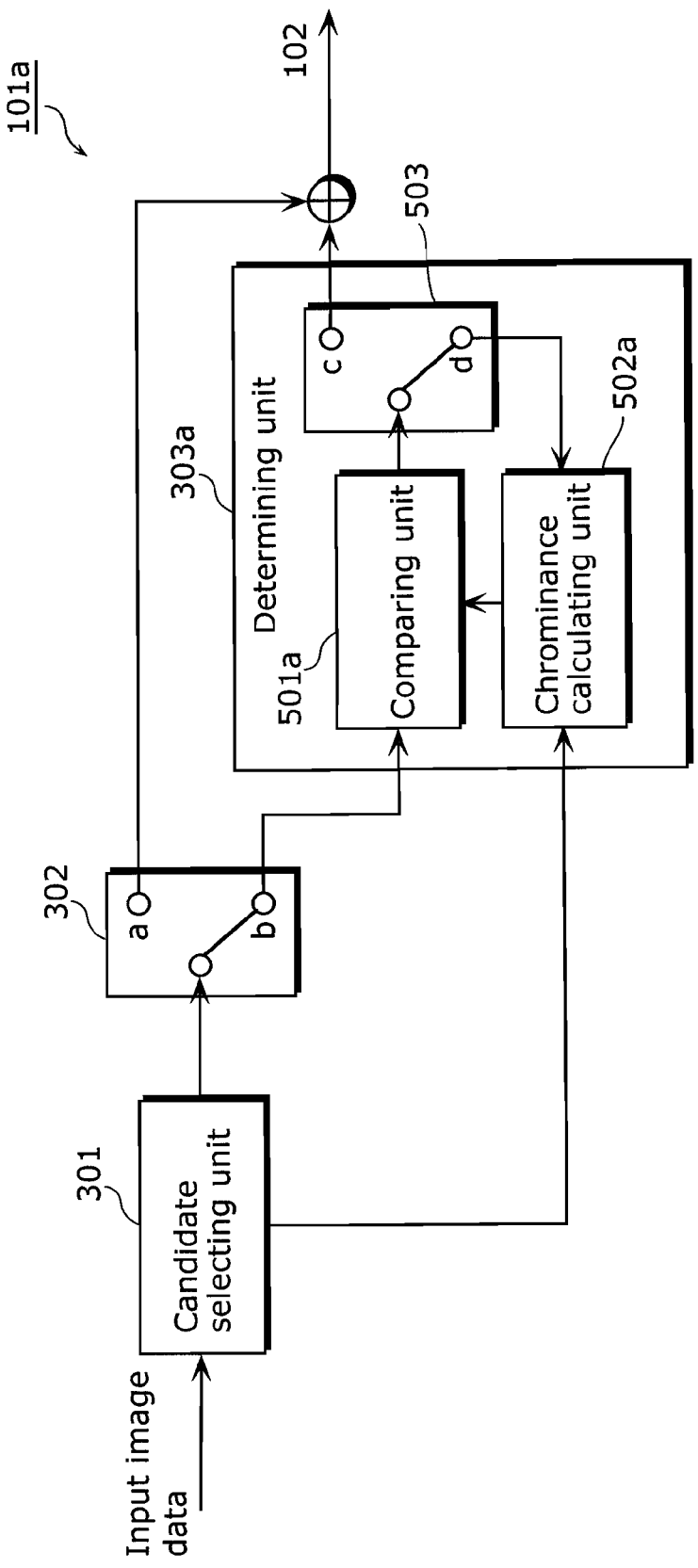
FIG. 24 is a block diagram illustrating a configuration of a detecting unit according to a third embodiment of the present invention.

FIG. 24 is a block diagram illustrating a configuration of a detecting unit according to a third embodiment.

The image processing apparatus 100 according to the present embodiment includes a detecting unit 101a instead of the detecting unit 101 of the first and second embodiments. The detecting unit 101a includes a candidate selecting unit 301, a switch 302 and a determining unit 303a. The candidate selecting unit 301 and the switch 302 are the same as those in FIG. 5 and labeled as the same reference numerals, so no redundant description is repeated here.

The determining unit 303a according to the present embodiment includes a comparing unit 501a, a chrominance calculating unit 502a and a switch 503. The chrominance calculating unit 502a receives input image data including a result of processing performed by the candidate selecting unit 301, and calculates chrominance ranges of a predetermined region in an image shown by the input image data. The comparing unit 501a connects to the terminal b of the switch 302 and receives the chrominance ranges from the chrominance calculating unit 502a as well as obtaining the chrominance values of candidates from the candidate selecting unit 301. The comparing unit 501a compares the chrominance values of the candidates with the chrominance ranges to determine noise pixels. In the case where a noise pixel is determined, the comparing unit 501a is connected to a terminal c of the switch 503, and the operation of the determining unit 303a is finished. On the other hand, in the case where a noise pixel is not determined, the comparing unit 501a is connected to a terminal d of the switch 503, and the chrominance calculating unit 502a is operated again. The comparing unit 501a compares the chrominance values of the candidates with the chrominance ranges to determine noise pixels and connects to the terminal c to finish the operation.

In other words, in the present embodiment, the comparing unit 501a determines whether or not candidates are noise pixels by comparing the chrominance values of the candidates with the chrominance ranges. In the case where the candidates are determined as noise pixels, the comparing unit 501a outputs the determination result to the outside of the determining unit 303a via the switch 503. On the other hand, in the case where the candidates are determined as pixels which are not noise pixels, the comparing unit 501a causes the chrominance calculating unit 502a via the switch 503 to perform calculation of chrominance ranges again. Then, the comparing unit 501a again determines whether or not the candidates are noise pixels by comparing the chrominance values of the candidates with the calculated chrominance ranges, and outputs the determination result to the outside of the determining unit 303a via the switch 503. Further, in the case where calculation of the chrominance ranges is repeated for the same candidates, the chrominance calculating unit 502a changes the way of calculating the chrominance ranges for every calculation.

Figure 25:
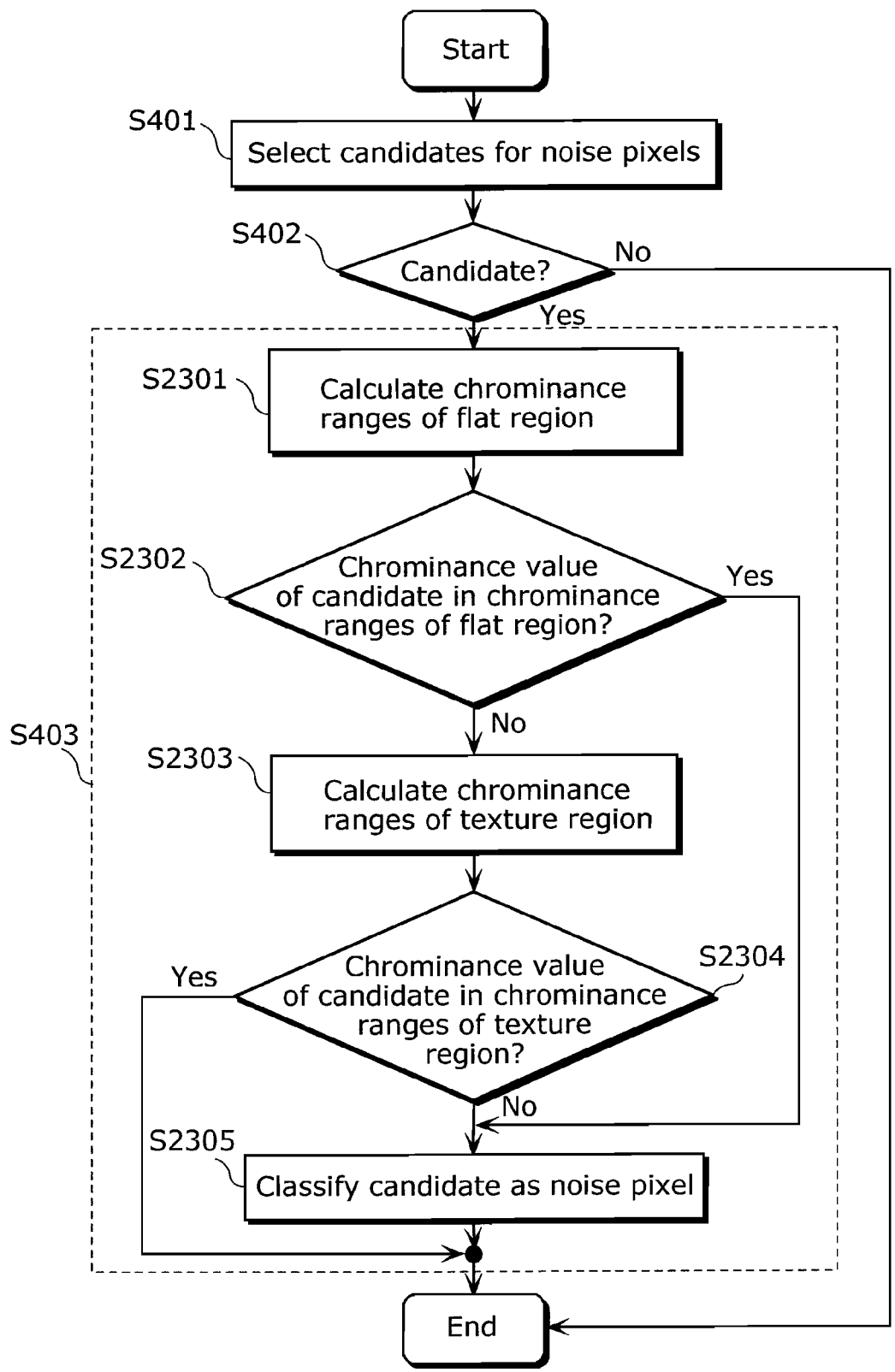
FIG. 25 is a flowchart illustrating detailed operations of the detecting unit of the third embodiment.

FIG. 25 is a flowchart illustrating detailed operations of the detecting unit 101a according to the present embodiment. Step S401 and Step S402 are the same as the Steps described in FIG. 6. The selection of candidates for noise pixels at Step S401 is the same as the aforementioned in the first embodiment. No redundant description is repeated here. Step S403 includes Step S2301, Step S2302, Step S2303, Step S2304 and Step S2305. At Step S2301, the detecting unit 101a calculates the chrominance ranges of a flat region. At Step S2302, the detecting unit 101a compares the chrominance values of candidates and the chrominance ranges of the flat region. In the case where the chrominance values of the candidates are in the chrominance ranges of the flat region, the detecting unit 101a, at Step S2305, judges that the candidates are noise pixels. In other words, the detecting unit 101a classifies the candidates as noise pixels. In the case where the chrominance values of the candidates are not in the chrominance ranges of the flat region, the detecting unit 101a performs processing of Step S2303. At Step S2303, the detecting unit 101a calculates the chrominance ranges of a texture region. At Step S2304, the detecting unit 101a compares the chrominance values of the candidates and the chrominance ranges of the texture region. In the case where the chrominance values of the candidates are not in the chrominance ranges of the texture region, the detecting unit 101a, at Step S2305, judges that the candidates are noise pixels. In other words, the detecting unit 101a classifies the candidates as noise pixels. In the case where the chrominance values of the candidates are in the chrominance ranges of the texture region, the detecting unit 101a judges that the candidates are not noise pixels. In other words, the detecting unit 101a jumps over the processing in Step S2305 on the candidates, and finishes the operation of Step S403.

As described, the detecting unit 101a of the present embodiment performs comparison using the chrominance ranges of a flat region, and then further performs comparison using the chrominance ranges of a texture region when it is necessary to do so, so as to determine noise pixels.

The details of each operation in the above described flow are described below.

At Step S401, as illustrated in FIG. 10, the candidate selecting unit 301 of the detecting unit 101a selects candidates for noise pixels by classifying pixels included in the input image data as candidates for noise pixels, edge pixels, or flat pixels using the absolute values of the gradients of the pixels, as in the first embodiment.

Figure 26:
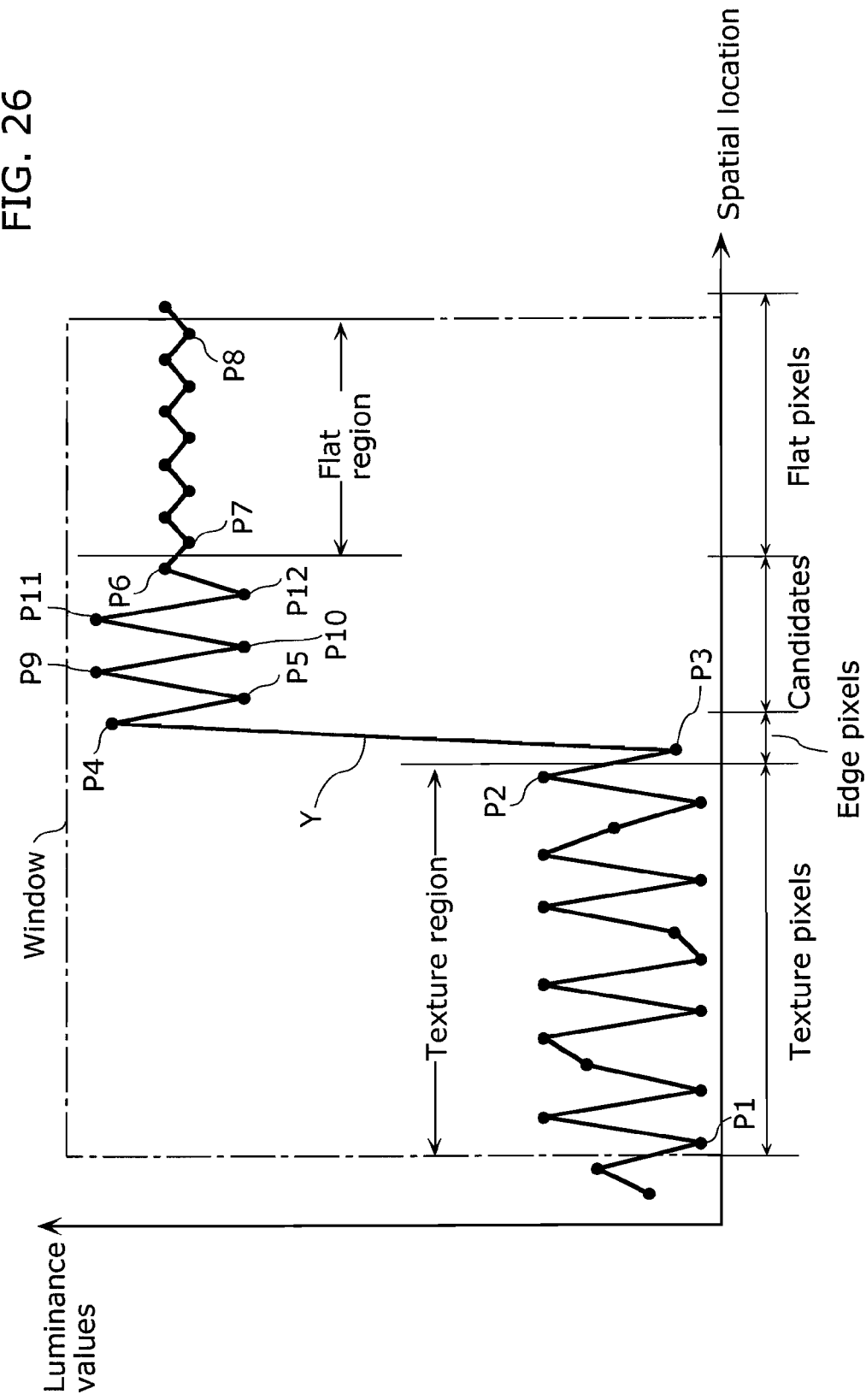
FIG. 26 is a diagram illustrating a relationship between the luminance values of successive pixels and a window of the third embodiment.
Figure 27:
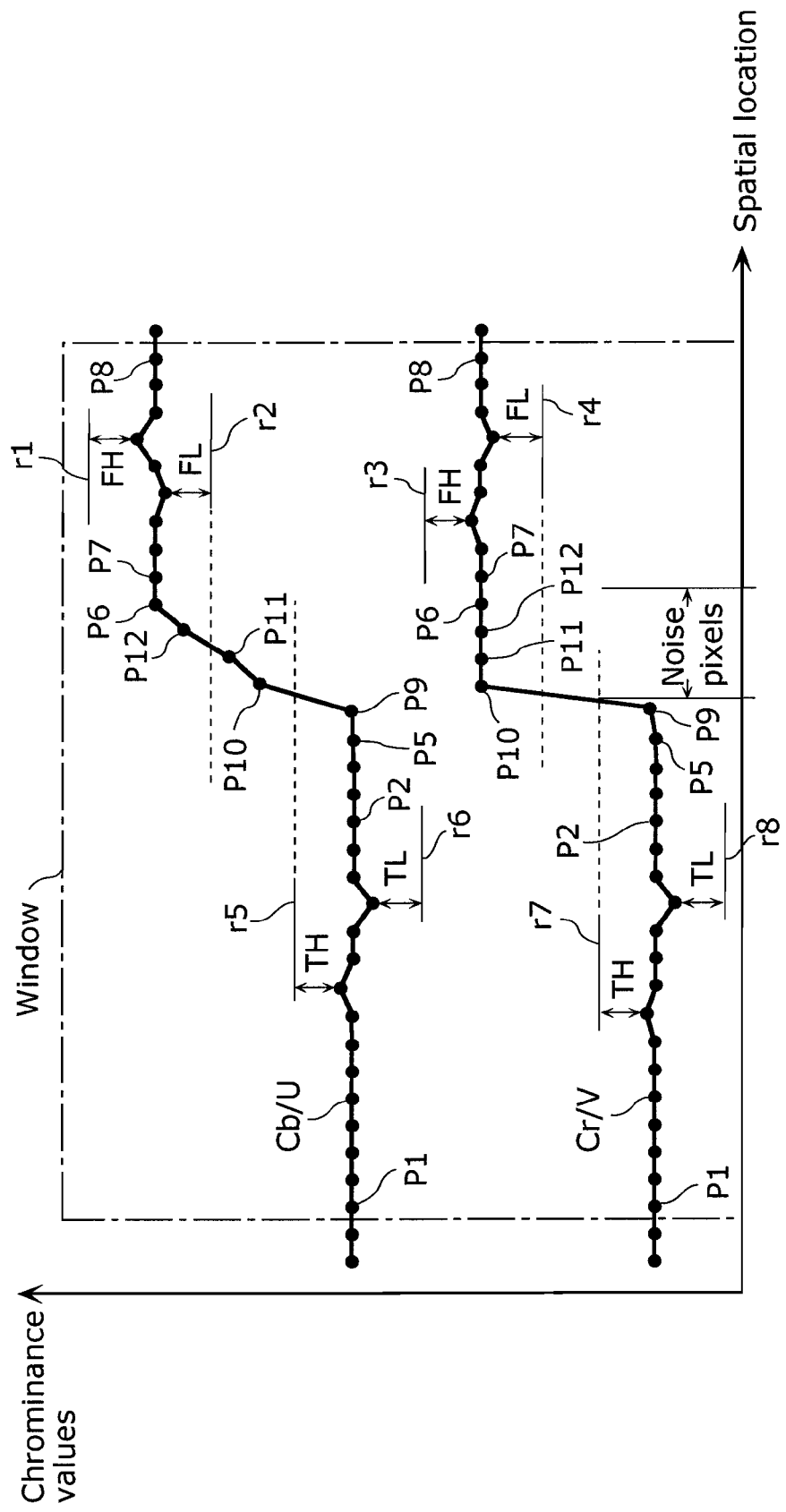
FIG. 27 is a diagram illustrating the distributions of Cb/U and Cr/V of the third embodiment.

With reference to FIG. 26 and FIG. 27, a description is provided on a first exemplar of processing for determining noise pixels in Step S2301 through Step S2305 illustrated in FIG. 25.

FIG. 26 is a diagram illustrating a relationship between the luminance values of successive pixels and a window.

A K-pixel window is extended away from edge pixels P3 and P4, where K equals 15 in the case of FIG. 26.

When input image data is received, the chrominance calculating unit 502a of the determining unit 303a sets the K-pixel window in such a way that an edge pixel included in an image shown by the input image data comes in the middle of the K-pixel window. Then, the chrominance calculating unit 502a determines a region including successive flat pixels as a flat region, and determines a region including successive candidates as a texture region. More specifically, within the K-pixel window, the chrominance calculating unit 502a determines a region including successive flat pixels as a flat region, when the number of successive flat pixels is not less than a threshold FB. Also, within the K-pixel window, the chrominance calculating unit 502a determines a region including successive candidates as a texture region, in the case where the number of the successive candidates is not less than a threshold TB.

In the exemplar illustrated in FIG. 26, as shown at the right of FIG. 26, the chrominance calculating unit 502a determines a region having the pixels between the spatial locations of a pixel P7 and a pixel P8 as a flat region. Further, as shown at the left of FIG. 26, the chrominance calculating unit 502a determines a region having the pixels between the spatial locations of a pixel P1 and a pixel P2 as a texture region. The pixels inside the texture region are classified as texture pixels.

FIG. 27 is a diagram illustrating the distributions of the chrominance components, Cb/U and Cr/V, corresponding to the pixels located between the spatial locations of the pixel P1 and the pixel P8 as shown in FIG. 26. The chrominance calculating unit 502a receives the input image data and calculates the chrominance ranges of the flat region at Step S2301. The calculation of the chrominance ranges of the flat region is the same as the calculation in the first embodiment, and is not described here. As illustrated in FIG. 27, the maximum and the minimum of the chrominance range of Cb/U are labeled as r1 and r2 as well as the maximum and the minimum of the chrominance range of Cr/V are labeled as r3 and r4.

In other words, the chrominance calculating unit 502a calculates the chrominance values r2 to r1 as the chrominance range of Cb/U of the flat region and the chrominance values r4 to r3 as the chrominance range of Cr/V of the flat region.

The comparing unit 501a receives the chrominance ranges of the flat region and compares the chrominance values of the candidates with the chrominance ranges of the flat region at Step S2302. In the case where the chrominance values of the candidates are not in the chrominance ranges of the flat region, the comparing unit 501a connects to a terminal d of the switch 503 and the chrominance calculating unit 502a is operated again. To be more specific, the comparing unit 501a causes the chrominance calculating unit 502a to calculate the chrominance ranges of the texture region. On the other hand, in the case where the chrominance values of the candidates are in the chrominance ranges of the flat region, the comparing unit 501a determines the candidates as noise pixels at Step S2305.

The chrominance calculating unit 502a receives the input image data and calculates the chrominance ranges of the texture region at Step S2303. The calculation of the chrominance ranges of the texture region is the same as the calculation in the second embodiment, and is not described here. As illustrated in FIG. 27, the maximum and the minimum of the chrominance range of Cb/U are labeled as r5 and r6 as well as the maximum and the minimum of the chrominance range of Cr/V are labeled as r7 and r8.

In other words, the chrominance calculating unit 502a calculates the chrominance values r6 to r5 as the chrominance range of Cb/U of the texture region and the chrominance values r8 to r7 as the chrominance range of Cr/V of the texture region.

The comparing unit 501a receives the chrominance ranges of the texture region and compares the chrominance values of the candidates with the chrominance ranges of the texture region at Step S2304. In the case where the chrominance values of the candidates are not in the chrominance ranges of the texture region, the comparing unit 501a determines the candidates as noise pixels at Step S2305.

As illustrated in FIG. 27, the chrominance values of the candidate P12 and the candidate P6 are in the chrominance ranges of the flat region. Therefore, the comparing unit 501a classifies the candidate P12 and the candidate P6 as noise pixels. On the other hand, since the chrominance values (Cb/U) of the candidate P10 and the candidate P11 are not in the chrominance ranges of the flat region, the comparing unit 501a compares the chrominance values (Cb/U) of these candidates with the chrominance ranges of the texture region. The Cb/U values of the candidate P10 and the candidate P11 are not in the Cb/U ranges of the texture region, so the comparing unit 501a classifies the candidate P10 and the candidate P11 as noise pixels.

As described, in the present embodiment, the chrominance values of candidates are compared with the chrominance ranges of a flat region, and in the case where the candidates are not judged as noise pixels, judgment is made again on whether or not the candidates are noise pixels by comparing the chrominance values of the candidates with the chrominance ranges of a texture region. As a result, it is possible to more appropriately detect noise pixels.

(Variation)

The image processing apparatus 100 according to the present variation obtains the above mentioned input image data as a digital signal, for example, recognizes the location, in an image shown by the input image data, of blocks each of which is used as a unit of coding and decoding the image, and reduces ringing artifacts using the blocks. Note that ringing artifacts occur only within a block that includes edges.

Figure 28:
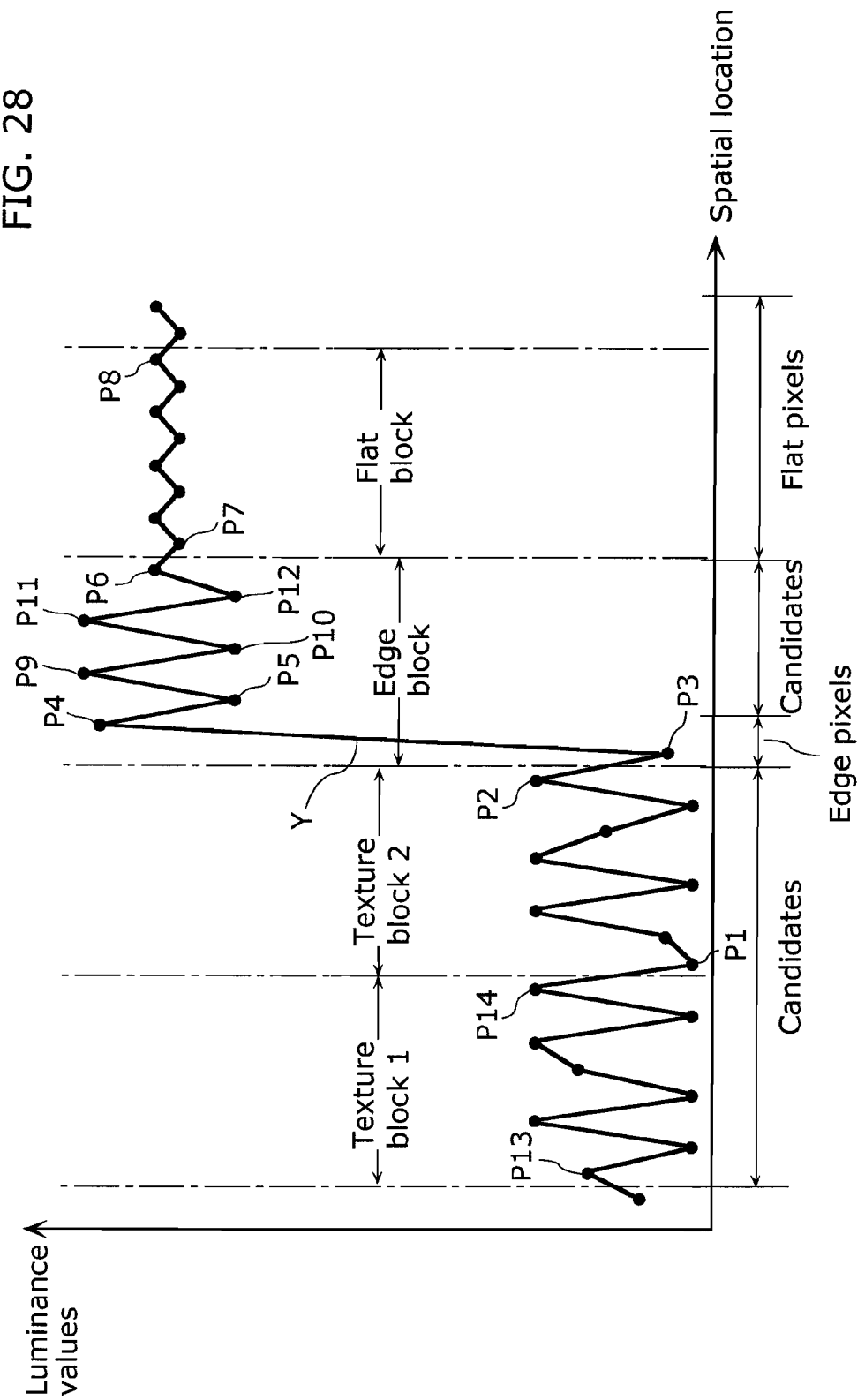
FIG. 28 is a diagram illustrating a relationship between the luminance values of successive pixels and blocks according to a variation of the third embodiment.
Figure 29:
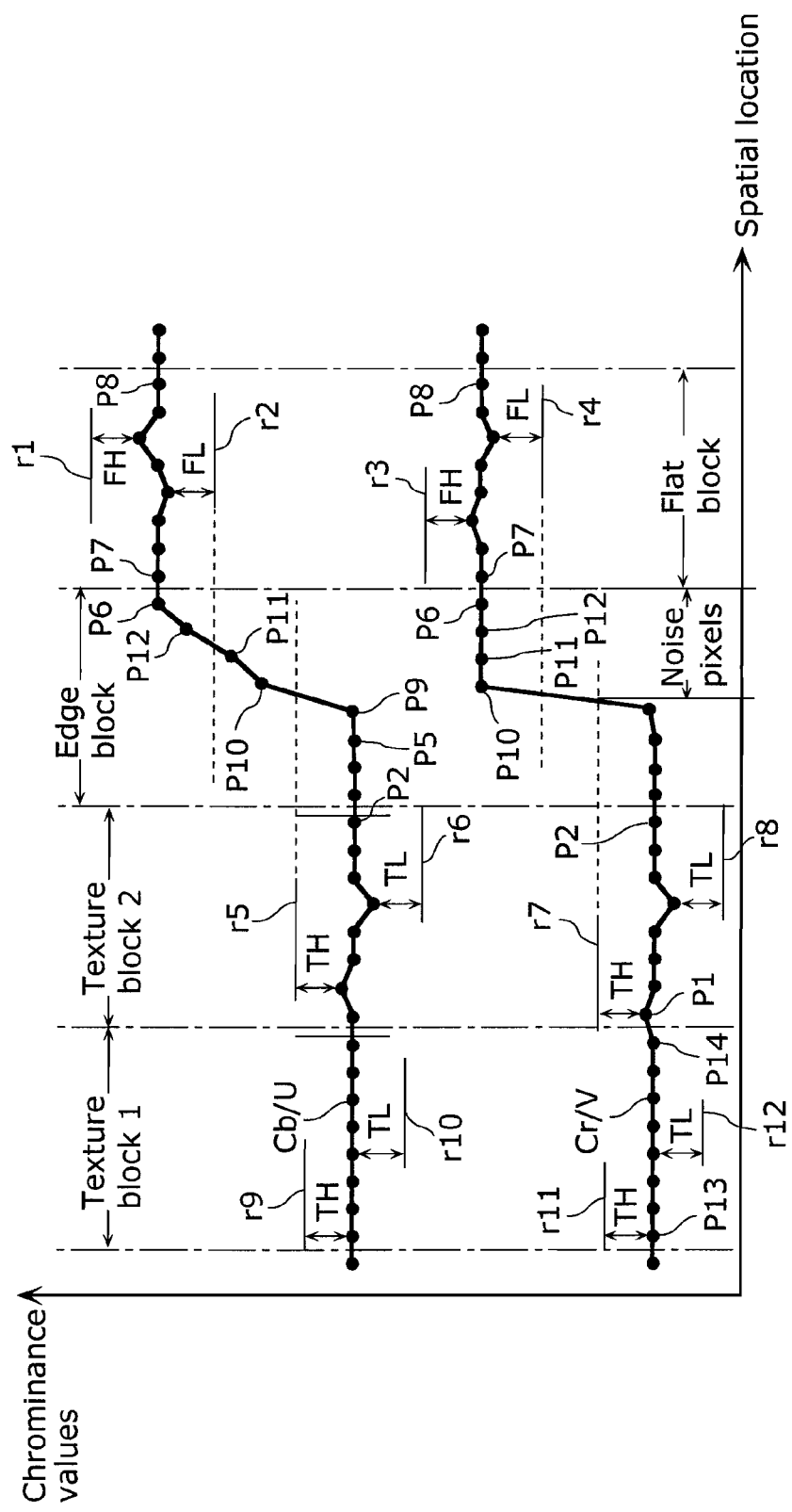
FIG. 29 is a diagram illustrating the distributions of Cb/U and Cr/V according to the above mentioned variation.

With reference to FIG. 28 and FIG. 29, a description is provided on a second exemplar of processing for determining noise pixels in Step S2301 through Step S2305 illustrated in FIG. 25.

According to some international standards of image compression such as MPEG and JPEG, an image is divided into several 2-D blocks with predefined sizes. For example, there are N lines and M samples/line in a block, where N and M can be 4, 8 or 16.

FIG. 28 is a diagram illustrating a relationship between the luminance values of successive pixels and blocks.

As illustrated in FIG. 28, the successive pixels are separated into several blocks by broken lines based on a compressing standard, where each block includes 8 pixels in one spatial direction.

The chrominance calculating unit 502a of the determining unit 303a determines blocks as flat blocks in the case where only flat pixels are involved in the blocks. The chrominance calculating unit 502a further determines blocks as texture blocks in the case where only candidates are involved in the blocks. For example, as illustrated in FIG. 28, a block including pixels located between the spatial locations of a pixel P7 and a pixel P8 is determined as a flat block. Furthermore, the chrominance calculating unit 502a determines a block including pixels located between the spatial locations of a pixel P13 and a pixel P14 and a block including the pixels located between the spatial locations of a pixel P1 and a pixel P2 as a texture block 1 and a texture block 2, respectively.

In addition, the chrominance calculating unit 502a determines blocks as edge blocks in the case where edge pixels are involved in the blocks. For example, as illustrated in FIG. 28, the chrominance calculating unit 502a determines, as an edge block, a block including edge pixels P3 and P4 and candidates located between the spatial locations of a pixel P5 and a pixel P6.

FIG. 29 is a diagram illustrating the distributions of the chrominance components, Cb/U and Cr/V, corresponding to the pixels located between the spatial locations of a pixel P13 and the pixel P8 as shown in FIG. 28. As the aforementioned, for the flat block, the maximum and the minimum of the chrominance range of Cb/U are labeled as r1 and r2 as well as the maximum and the minimum of the chrominance range of Cr/V are labeled as r3 and r4 as shown in FIG. 29. For the texture block 1, the maximum and the minimum of the chrominance range of Cb/U are labeled as r9 and r10 as well as the maximum and the minimum of the chrominance range of Cr/V are labeled as r11 and r12. For the texture block 2, the maximum and the minimum of the chrominance range of Cb/U are labeled as r5 and r6 as well as the maximum and the minimum of the chrominance range of Cr/V are labeled as r7 and r8.

In other words, the chrominance calculating unit 502a calculates the chrominance values r2 to r1 as the chrominance range of Cb/U of the flat block and the chrominance values r4 to r3 as the chrominance range of Cr/V of the flat block. Further, the chrominance calculating unit 502*a* calculates the chrominance values r10 to r9 as the chrominance range of Cb/U of the texture block 1 and the chrominance values r12 to r11 as the chrominance range of Cr/V of the texture block 1, when it is necessary to do so. Furthermore, the chrominance calculating unit 502*a* calculates the chrominance values r6 to r5 as the chrominance range of Cb/U of the texture block 2 and the chrominance values r8 to r7 as the chrominance range of Cr/V of the texture block 2.

At Step S2301 to Step S2305, the comparing unit 501*a* compares the chrominance values of candidates located in the edge block with the chrominance ranges of the flat block, and further compares the chrominance values of the candidates with the chrominance ranges of the texture blocks 1 and 2 when it is necessary to do so, so as to determine whether or not the candidates are noise pixels.

As shown in FIG. 29, the chrominance values of the candidate P12 and the candidate P6 are in the chrominance ranges of the flat block. Therefore, the comparing unit 501*a* classifies the candidate P12 and the candidate P6 as noise pixels. Since the chrominance values (Cb/U) of the candidate P10 and the candidate P11 are not in the chrominance ranges of the flat block, the comparing unit 501*a* compares the chrominance values of these candidates with the chrominance ranges of the texture blocks 1 and 2. The Cb/U values of the candidate P10 and the candidate P11 are not in the Cb/U ranges of the texture blocks 1 and 2, so the comparing unit 501*a* classifies the candidate P10 and the candidate P11 as noise pixels.

Figure 30:
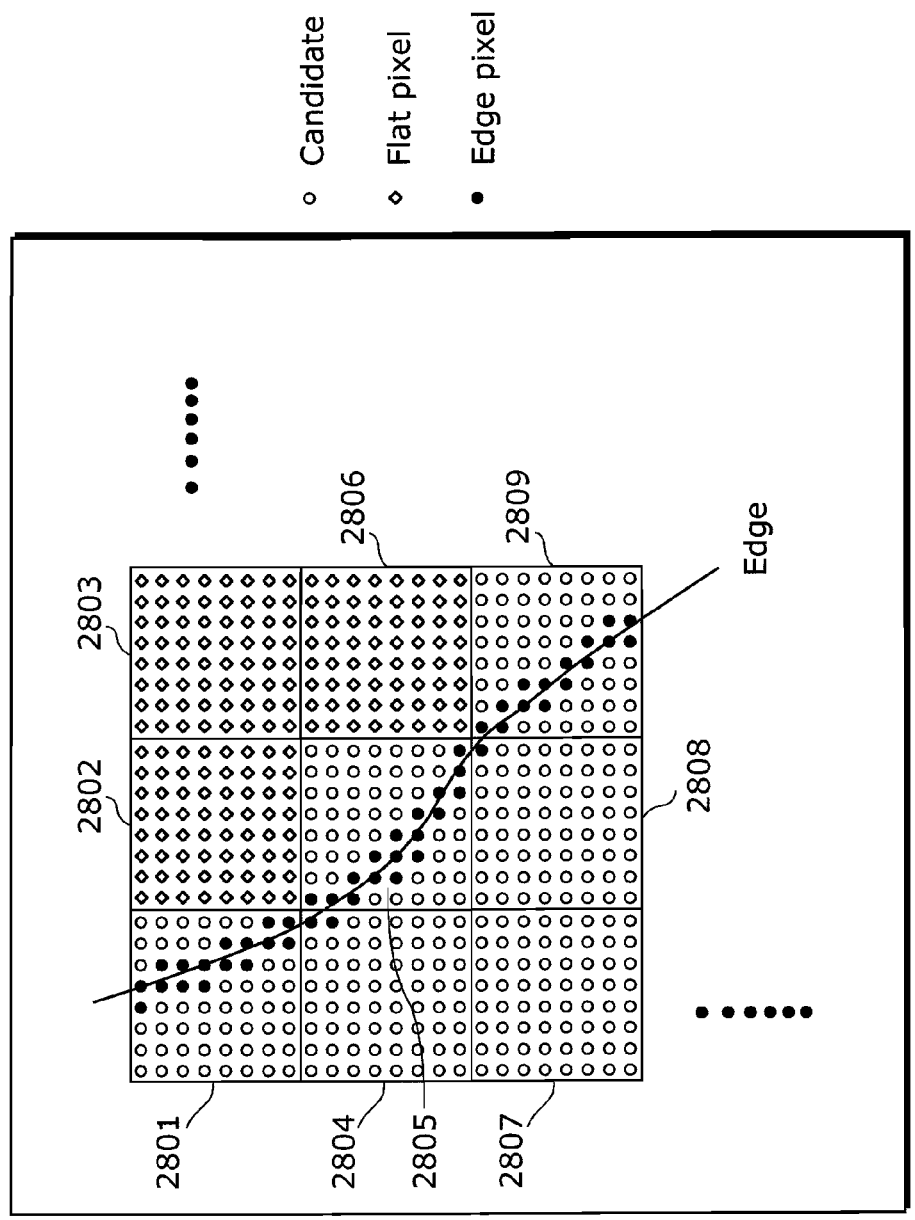
FIG. 30 is a diagram illustrating an image, and blocks and pixels included in the image according to the above mentioned variation.
Figure 31:
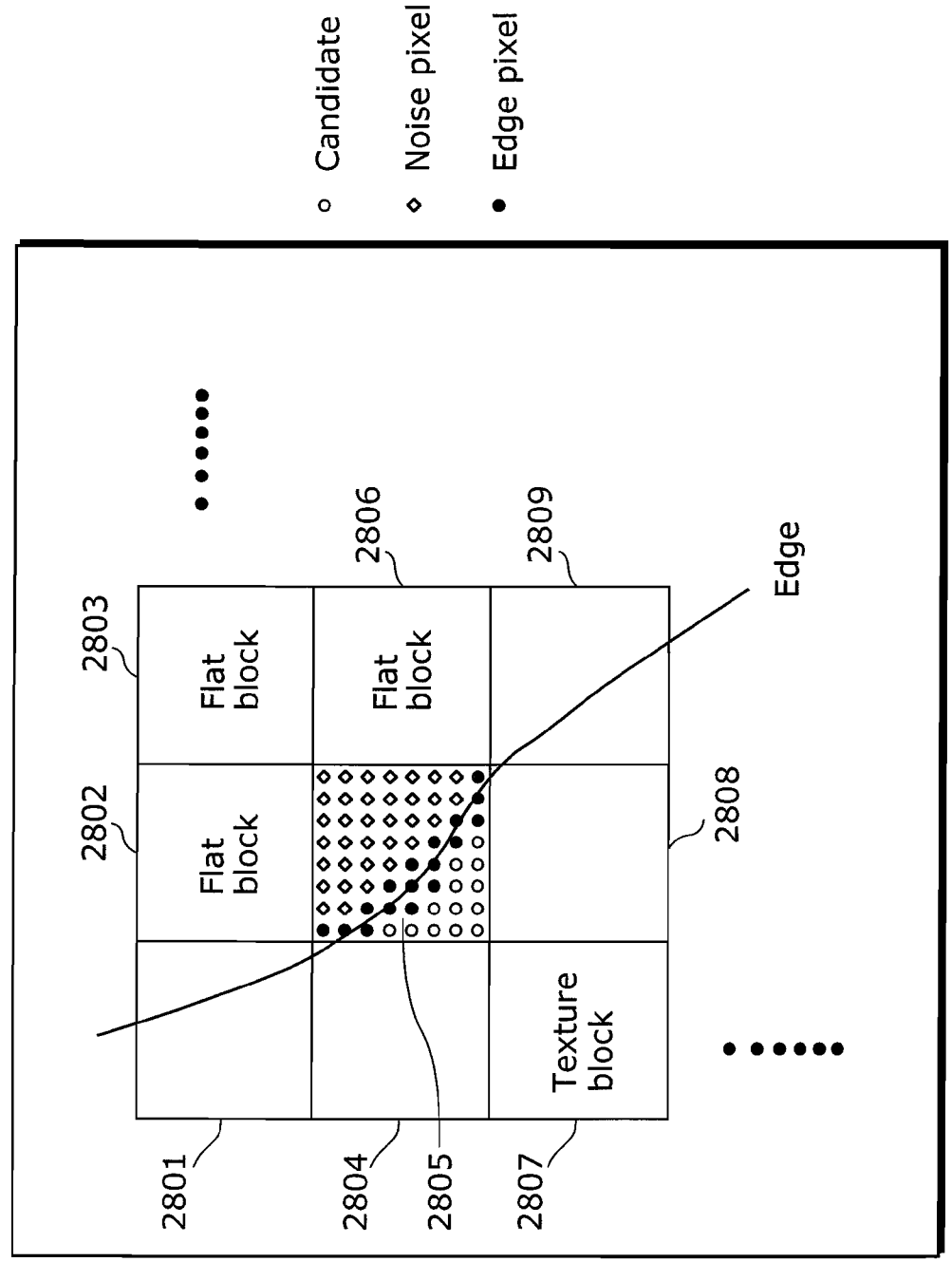
FIG. 31 is a diagram illustrating a result of determination performed by a chrominance calculating unit according to the above mentioned variation.

With a 2-D exemplar illustrated in FIG. 30 and FIG. 31, a description is provided on processing for determining noise pixels from candidates, performed by the determining unit 303*a* according to the present variation in Step S2301 through Step S2305 illustrated in FIG. 25.

FIG. 30 is a diagram illustrating an image, and blocks and pixels included in the image.

Images are divided into several blocks according to some international standards of image compression such as MPEG and JPEG. Here, 9 blocks 2801 to 2809 are drawn. Each block includes 8×8 pixels, which are drawn as various kinds of symbols. An edge line crosses over the blocks 2801, 2805 and 2809. As illustrated in FIG. 30, edge pixels are marked with the filled circle "●" along the edge. Candidates are marked with the hollow circle "○". Flat pixels are marked with the rhombus "◇". The chrominance calculating unit 502*a* determines blocks as flat blocks in the case where only flat pixels are involved in the blocks, determines blocks as texture blocks in the case where only candidates are involved in the blocks, and determines blocks as edge blocks in the case where edge pixels are involved in the blocks.

FIG. 31 is a diagram illustrating a result of the determination performed by the chrominance calculating unit 502*a*.

As illustrated in FIG. 31, the blocks 2802, 2803 and 2806 include only flat pixels, so they are determined as flat blocks. The block 2807 includes only candidates, so it is determined as a texture block. The block 2801, 2805 and 2809 include edge pixels, so they are determined as edge blocks.

Considering the block 2805, which is determined as an edge block, the comparing unit 501*a* compares the chrominance values of the candidates inside the block 2805 with the chrominance ranges of the adjacent flat blocks 2802, 2803 and 2806. In the case where the chrominance values of the candidates inside the block 2805 are in the chrominance ranges of the flat blocks 2802, 2803 and 2806, the comparing unit 501*a* determines the candidates as noise pixels. On the other hand, in the case where the chrominance values are not in the chrominance ranges, the comparing unit 501*a* compares the chrominance values of the candidates inside the block 2805 with the chrominance ranges of the adjacent texture block 2807. In the case where the chrominance values of the candidates inside the block 2805 are not in the chrominance ranges of the texture block 2807, the comparing unit 501*a* determines the candidates as noise pixels. In other words, as illustrated in FIG. 31, the candidates at the top right of the block 2805 are determined as noise pixels and marked with the rhombus "◇".

Note that in the case where the chrominance values of the candidates are not in the chrominance ranges of the flat blocks 2802, 2803 and 2806 but are in the chrominance ranges of the texture block 2807, the comparing unit 501*a* may compare the distances between the chrominance values of the candidates and the chrominance ranges of each of the above mentioned blocks. For example, in the case where the distances between the chrominance values of the candidates and the chrominance ranges of the flat blocks are less than those between the chrominance values of the candidates and the chrominance ranges of the texture block, the comparing unit 501*a* classifies the candidates as noise pixels. On the other hand, in the case where the distances between the chrominance values of the candidates and the chrominance ranges of the flat blocks are longer than those between the chrominance values of the candidates and the chrominance ranges of the texture block, the comparing unit 501*a* determines that the candidates are not noise pixels.

As described, also in the present variation, since ringing artifacts occur only in edge blocks, only candidates inside the edge blocks are judged whether or not they are noise pixels. As a result, it is possible to reduce the burden of judging whether or not the candidates are noise pixels, and easily determine noise pixels without the need to set a window, as required in the above embodiment.

Fourth Embodiment

A fourth embodiment of the present invention is described with reference to FIG. 32 to FIG. 38.

The configuration of an image processing apparatus according to the fourth embodiment is the same as the configuration of the third embodiment, and includes the detecting unit 101*a* illustrated in FIG. 24.

The detecting unit 101*a* according to the present embodiment is different from that of the third embodiment, and firstly compares chrominance values of candidates with the chrominance ranges of a texture region, and then compares the chrominance values of the candidates with the chrominance ranges of a flat region when it is necessary to do so, so as to determines noise pixels. Note that also in the present embodiment as in the first and second embodiments, the image processing apparatus 100 obtains the above mentioned input image data as an analog signal, for example, and reduces ringing artifacts without recognizing the location, in an image shown by the input image data, of blocks each which is used as a unit of coding and decoding the image.

Figure 32:
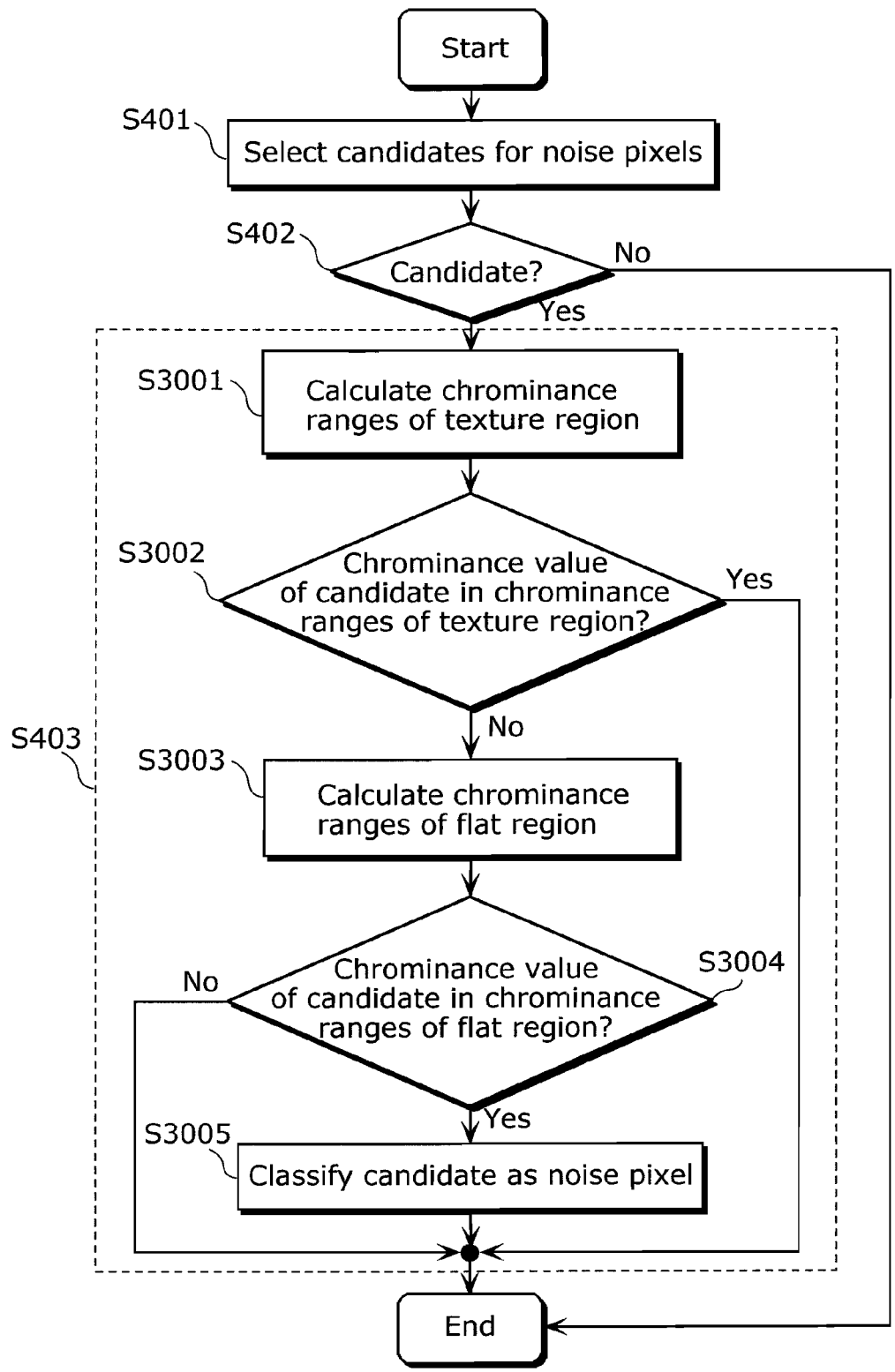
FIG. 32 is a flowchart illustrating detailed operations of a detecting unit according to a fourth embodiment of the present invention.

FIG. 32 is a flowchart illustrating detailed operations of the detecting unit 101*a* according to the present embodiment. Step S401 and Step S402 are the same as the Steps described in FIG. 6. The selection of candidates for noise pixels at Step S401 is the same as the aforementioned in the first embodiment. No redundant description is repeated here. Step S403 includes Step S3001, Step S3002, Step S3003, Step S3004 and Step S3005. At Step S3001, the detecting unit 101*a* calculates the chrominance ranges of a texture region. At Step S3002, the detecting unit 101*a* compares the chrominance values of the candidates and the chrominance ranges of the texture region. In the case where the chrominance values of the candidates are in the chrominance ranges of the texture region, the detecting unit 101a judges that the candidates are not noise pixels, and finishes the operation of Step S403. On the other hand, in the case where the chrominance values are not in the chrominance ranges, the detecting unit 101a performs processing of Step S3003. At Step S3003, the detecting unit 101a calculates the chrominance ranges of a flat region. At Step S3004, the detecting unit 101a compares the chrominance values of candidates and the chrominance ranges of the flat region. In the case where the chrominance values of the candidates are in the chrominance ranges of the flat region, the detecting unit 101a, at Step S3005, judges that the candidates are noise pixels. In other words, the detecting unit 101a classifies the candidates as noise pixels. In the case where the chrominance values of the candidates are not in the chrominance ranges of the flat region, the detecting unit 101a judges that the candidates are not noise pixels. In other words, the detecting unit 101a jumps over the processing in Step S3005 on the candidates, and finishes the operation of Step S403.

As described, the detecting unit 101a of the present embodiment performs comparison using the chrominance ranges of texture region, and then performs comparison using the chrominance ranges of a flat region when it is necessary to do so, so as to determine noise pixels.

The details of each operation in the above described flow are described below.

At Step S401, as illustrated in FIG. 10, the candidate selecting unit 301 of the detecting unit 101a selects candidates for noise pixels by classifying the pixels included in the input image data as candidates for noise pixels, edge pixels, or flat pixels using the absolute values of the gradients of the pixels, as in the first embodiment.

Figure 33:
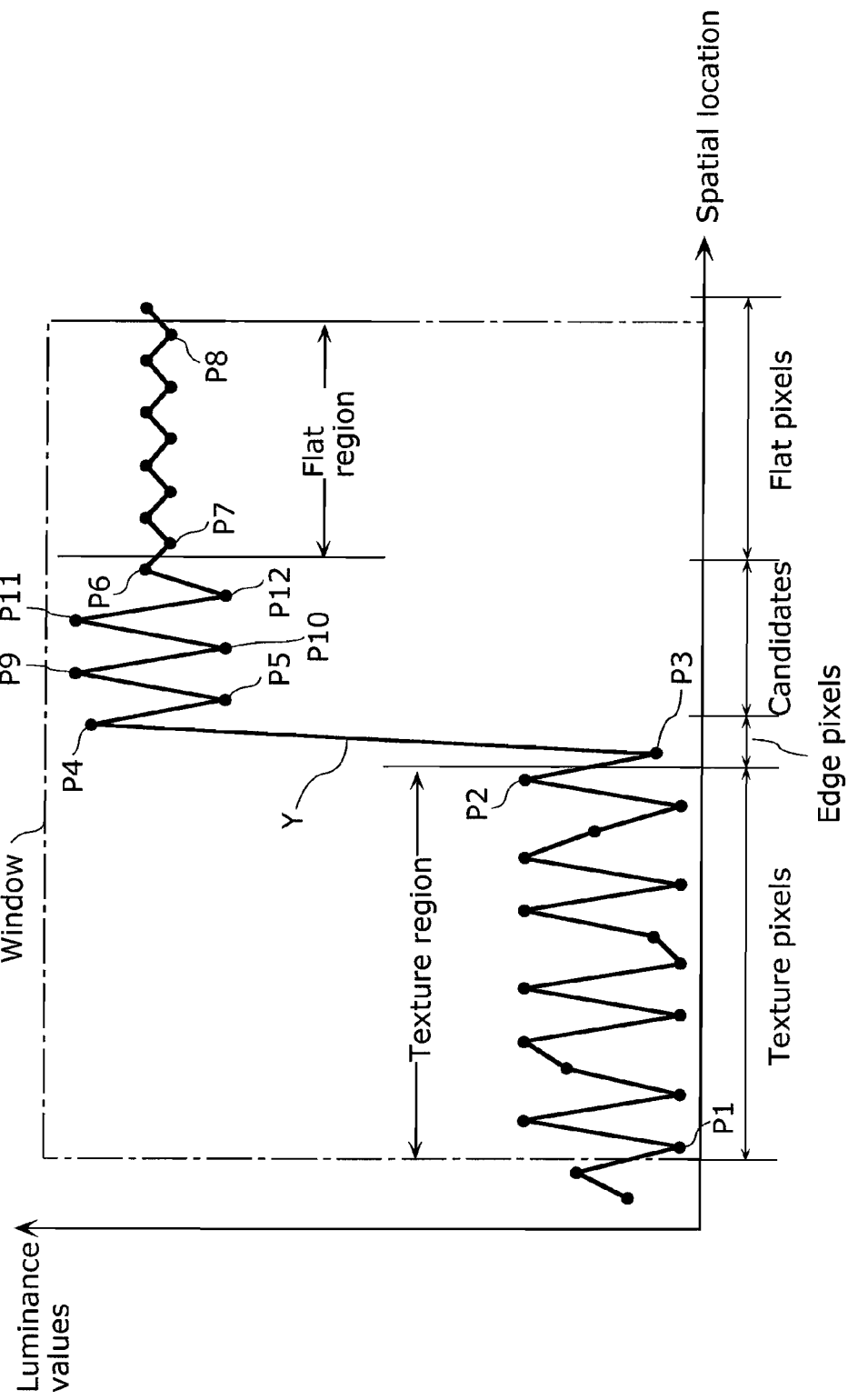
FIG. 33 is a diagram illustrating a relationship between the luminance values of successive pixels and a window of the fourth embodiment.
Figure 34:
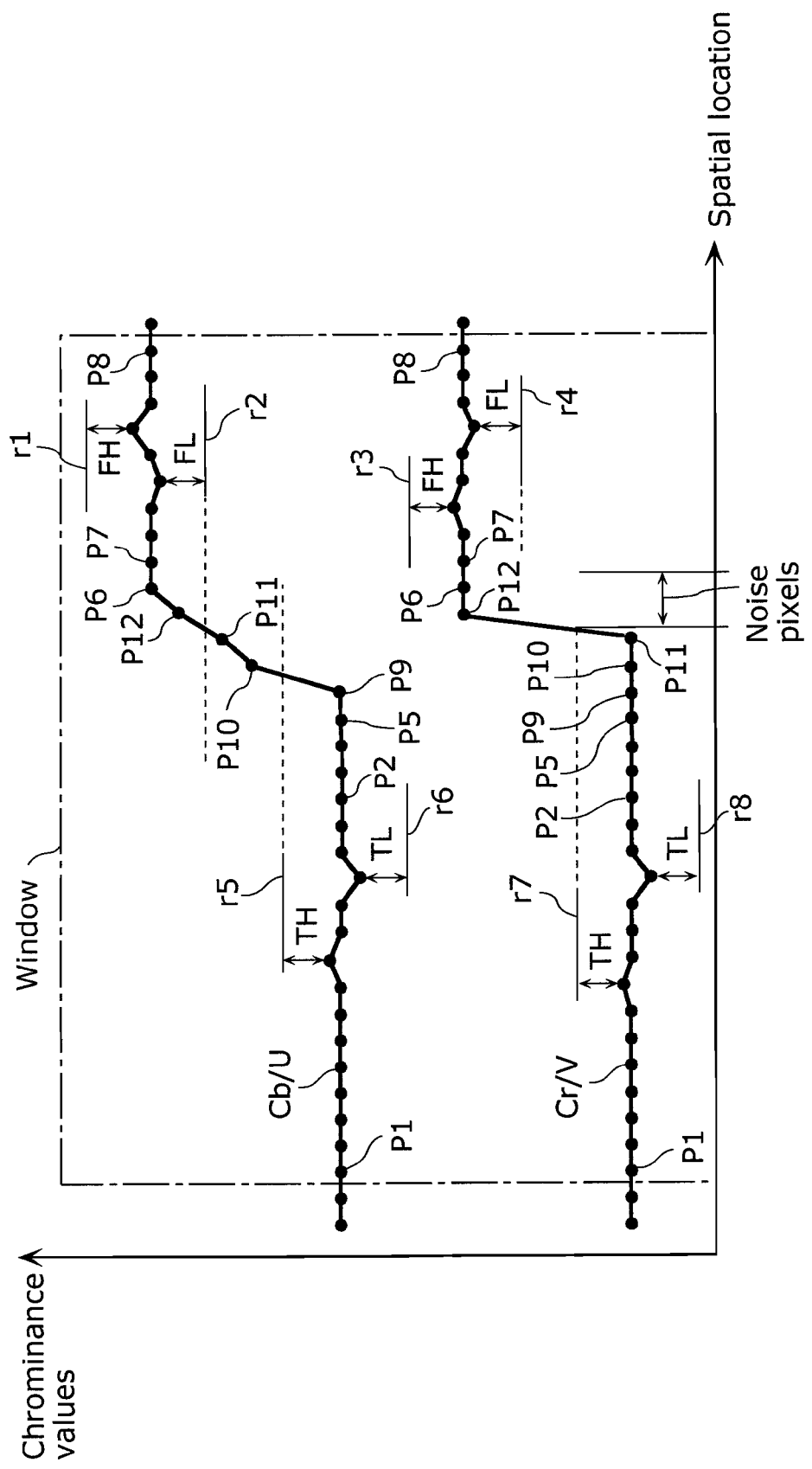
FIG. 34 is a diagram illustrating the distributions of Cb/U and Cr/V of the fourth embodiment.

With reference to FIG. 33 and FIG. 34, a description is provided on a first exemplar of processing for determining noise pixels in Step S3001 through Step S3005 illustrated in FIG. 32.

FIG. 33 is a diagram illustrating a relationship between the luminance values of successive pixels and a window.

A K-pixel window is extended away from edge pixels P3 and P4, where K equals 15 in the case of FIG. 33. The determination of a texture region and a flat region is the same as the aforementioned and is not described again. As shown in FIG. 33, a region having pixels between the spatial locations of a pixel P1 and a pixel P2 is determined as a texture region. Further, a region having pixels between the spatial locations of a pixel P7 and a pixel P8 is determined as a flat region. Also, pixels inside the texture region are classified as texture pixels.

FIG. 34 is a diagram illustrating the distributions of the chrominance components, Cb/U and Cr/V, corresponding to the pixels located between the spatial locations of the pixel P1 and the pixel P8 as shown in FIG. 33. The chrominance calculating unit 502a receives the input image data and calculates the chrominance ranges of the texture region at Step S3001. The calculation of the chrominance ranges of the texture region is the same as the calculation in the second embodiment, and is not described here. As shown in FIG. 34, the maximum and the minimum of the chrominance range of Cb/U are labeled as r5 and r6 as well as the maximum and the minimum of the chrominance range of Cr/V are labeled as r7 and r8.

In other words, the chrominance calculating unit 502a calculates the chrominance values r6 to r5 as the chrominance range of Cb/U of the texture region and the chrominance values r8 to r7 as the chrominance range of Cr/V of the texture region.

The comparing unit 501a receives the chrominance ranges of the texture region and compares the chrominance values of the candidates with the chrominance ranges of the texture region at Step S3002. In the case where the chrominance values of the candidates are not in the chrominance ranges of the texture region, the comparing unit 501a connects to a terminal d of the switch 503 and the chrominance calculating unit 502a is operated again. To be more specific, the comparing unit 501a causes the chrominance calculating unit 502a to calculate the chrominance ranges of a flat region. On the other hand, in the case where the chrominance values of the candidates are in the chrominance ranges of the texture region, the comparing unit 501a determines that the candidates are not noise pixels.

The chrominance calculating unit 502a receives the input image data and calculates the chrominance ranges of the flat region at Step S3003. The calculation of the chrominance ranges of the flat region is the same as the calculation in the first embodiment, and is not described here. As illustrated in FIG. 34, the maximum and the minimum of the chrominance range of Cb/U are labeled as r1 and r2 as well as the maximum and the minimum of the chrominance range of Cr/V are labeled as r3 and r4.

In other words, the chrominance calculating unit 502a calculates the chrominance values r2 to r1 as the chrominance range of Cb/U of the flat region and the chrominance values r4 to r3 as the chrominance range of Cr/V of the flat region.

The comparing unit 501a receives the chrominance ranges of the flat region and compares the chrominance values of the candidates with the chrominance ranges of the flat region at Step S3004. In the case where the chrominance values of the candidates are in the chrominance ranges of the flat region, the comparing unit 501a determines the candidates as noise pixels at Step S3005.

As shown in FIG. 34, the chrominance values of a candidate P5 and a candidate P9 are in the chrominance ranges of the texture region. Therefore, the comparing unit 501a determines that a candidate P5 and a candidate P9 as pixels are not noise pixels. On the other hand, since the chrominance values of a candidate P6 and a candidate P12 are not in the chrominance ranges of the texture region, the comparing unit 501a compares the chrominance values of these candidates with the chrominance ranges of the flat region. Since the chrominance values of the candidate P6 and the candidate P12 are in the chrominance ranges of the flat region, the comparing unit 501a classifies the candidate P12 and the candidate P6 as noise pixels.

As described, in the present embodiment, the chrominance values of candidates are compared with the chrominance ranges of a texture region, and in the case where the candidates are judged as noise pixels, judgment is made again on whether or not the candidates are noise pixels by comparing the chrominance values of the candidates with the chrominance ranges of a flat region. As a result, it is possible to more appropriately detect noise pixels.

(Variation)

The image processing apparatus 100 according to the present variation obtains the above mentioned input image data as a digital signal, for example, recognizes the location, in an image shown by the input image data, of blocks each of which is used as a unit of coding and decoding the image, and reduces ringing artifacts using the blocks. Note that ringing artifacts occur only within a block that includes edges.

Figure 35:
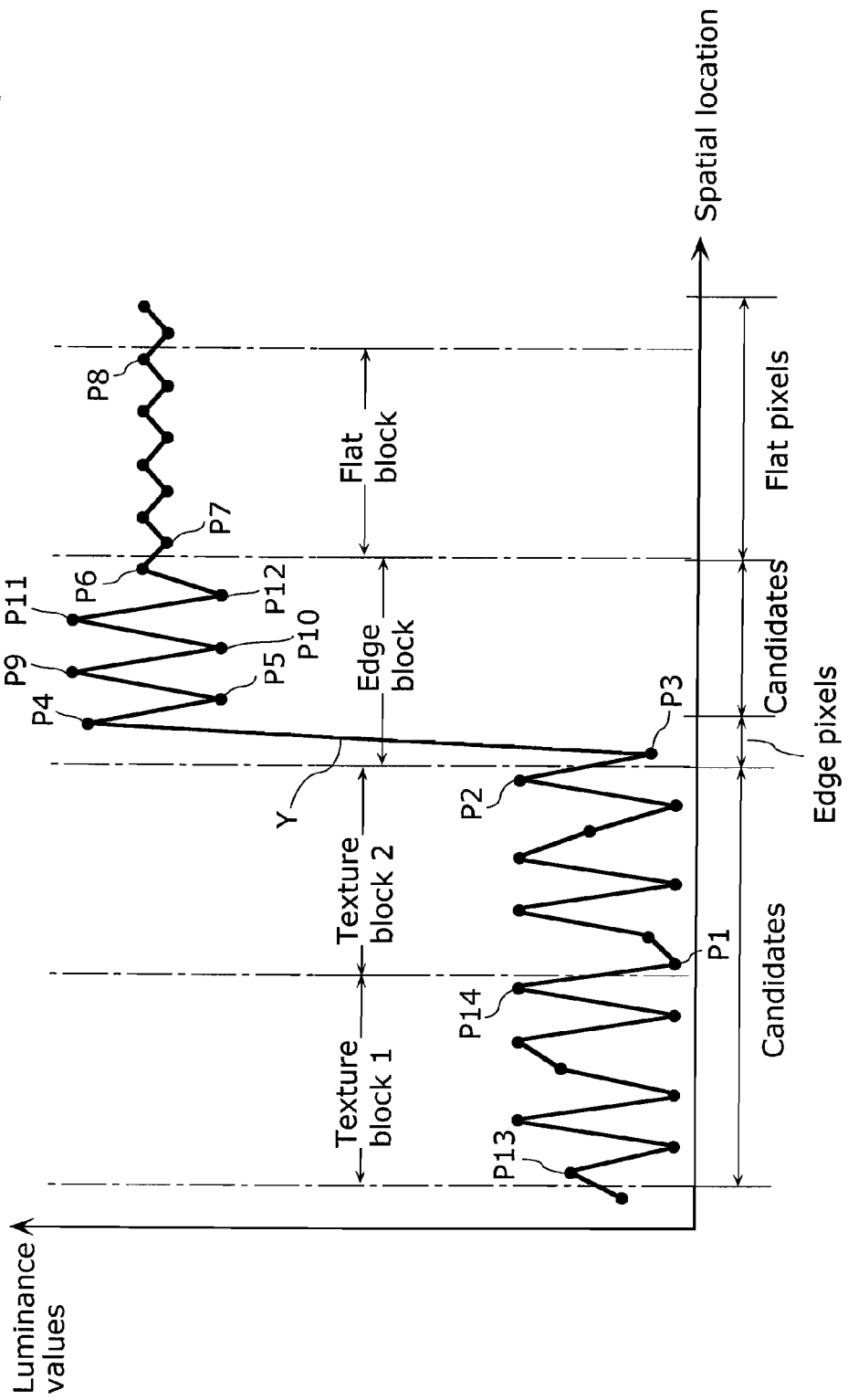
FIG. 35 is a diagram illustrating a relationship between the luminance values of successive pixels and blocks according to a variation of the fourth embodiment.
Figure 36:
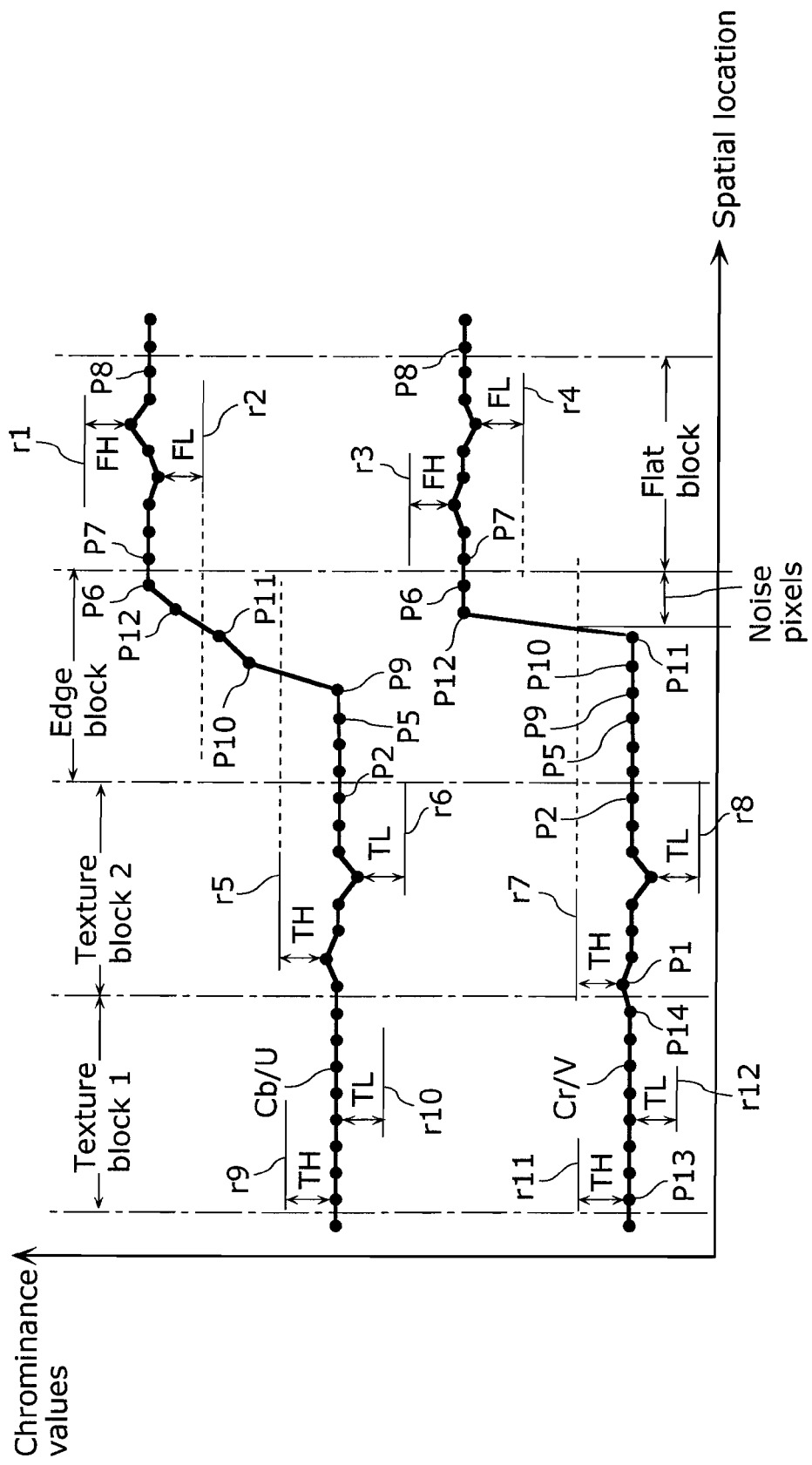
FIG. 36 is a diagram illustrating the distributions of Cb/U and Cr/V according to the above mentioned variation.

With reference to FIG. 35 and FIG. 36, a description is provided on a second exemplar of processing for determining noise pixels in Step S3001 through Step S3005 illustrated in FIG. 32.

According to some international standards of image compression such as MPEG and JPEG, an image is divided into several 2-D blocks with predefined sizes. For example, there are N lines and M samples/line in a block, where N and M can be 4, 8 or 16.

FIG. 35 is a diagram illustrating a relationship between the luminance values of successive pixels and blocks.

As illustrated in FIG. 35, the successive pixels are separated into several blocks by broken lines based on a compressing standard, where each block includes 8 pixels in one spatial direction. The determination of texture blocks, flat blocks, and edge blocks is the same as the determination in the above described first through third embodiments, and thus no redundant description is repeated here. Furthermore, as illustrated in FIG. 35, the chrominance calculating unit 502a determines a block including pixels located between the spatial locations of a pixel P13 and a pixel P14 and a block including pixels located between the spatial locations of a pixel P1 and a pixel P2 as a texture block 1 and a texture block 2, respectively. Furthermore, the chrominance calculating unit 502a determines a block including pixels located between the spatial locations of a pixel P7 and a pixel P8 as a flat block. In addition, the chrominance calculating unit 502a determines a block including edge pixels P3 and P4 and candidates located between the spatial locations of a pixel P5 and a pixel P6 as an edge block.

FIG. 36 is a diagram illustrating the distributions of the chrominance components, Cb/U and Cr/V, corresponding to the pixels located between the spatial locations of the pixel P13 and the pixel P8 as shown in FIG. 35. As described above, for the texture block 1, the maximum and the minimum of the chrominance range of Cb/U are labeled as r9 and r10 as well as the maximum and the minimum of the chrominance range of Cr/V are labeled as r11 and r12, as illustrated in FIG. 36. For the texture block 2, the maximum and the minimum of the chrominance range of Cb/U are labeled as r5 and r6 as well as the maximum and the minimum of the chrominance range of Cr/V are labeled as r7 and r8. For the flat block, the maximum and the minimum of the chrominance ranges of Cb/U are labeled as r1 and r2 as well as the maximum and the minimum of the chrominance ranges of Cr/V are labeled as r3 and r4.

In other words, the chrominance calculating unit 502a calculates the chrominance values r10 to r9 as the chrominance range of Cb/U of the texture block 1 and the chrominance values r12 to r11 as the chrominance range of Cr/V of the texture block 1. Further, the chrominance calculating unit 502 calculates the chrominance values r6 to r5 as the chrominance range of Cb/U of the texture block 2 and the chrominance values r8 to r7 as the chrominance range of Cr/V of the texture block 2. In addition, the chrominance calculating unit 502a calculates the chrominance values r2 to r1 as the chrominance range of Cb/U of the flat block and the chrominance values r4 to r3 as the chrominance range of Cr/V of the flat block, when it is necessary to do so.

At Step S3001 to Step S3005, the comparing unit 501a compares the chrominance values of candidates located in the edge block with the chrominance ranges of the texture blocks 1 and 2, and further compares the chrominance values of the candidates with the chrominance ranges of the flat block when it is necessary to do so, so as to determine whether or not the candidates as noise pixels.

As shown in FIG. 36, the chrominance values (Cb/U) of the candidates located between the spatial locations of the pixel P10 and the pixel P6 are not in the chrominance ranges of the texture blocks 1 and 2. Thus, the comparing unit 501a compares the chrominance values of these candidates with the chrominance ranges of the flat block. Only the chrominance values of the candidate P12 and the candidate P6 are in the chrominance ranges of the flat block. Therefore, the comparing unit 501a classifies the candidate P12 and the candidate P6 as noise pixels.

Figure 37:
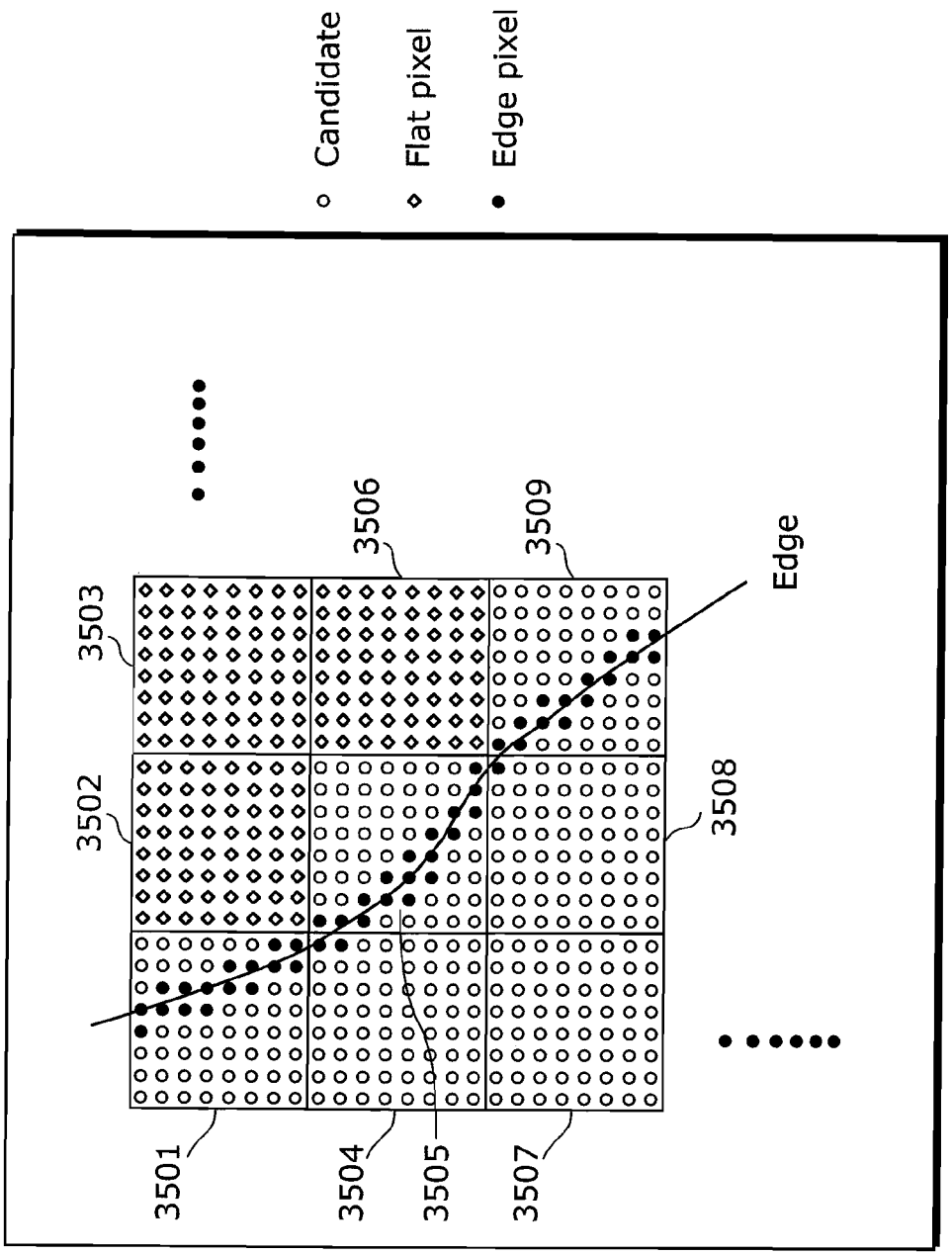
FIG. 37 is a diagram illustrating an image, and blocks and pixels included in the image according to the above mentioned variation.
Figure 38:
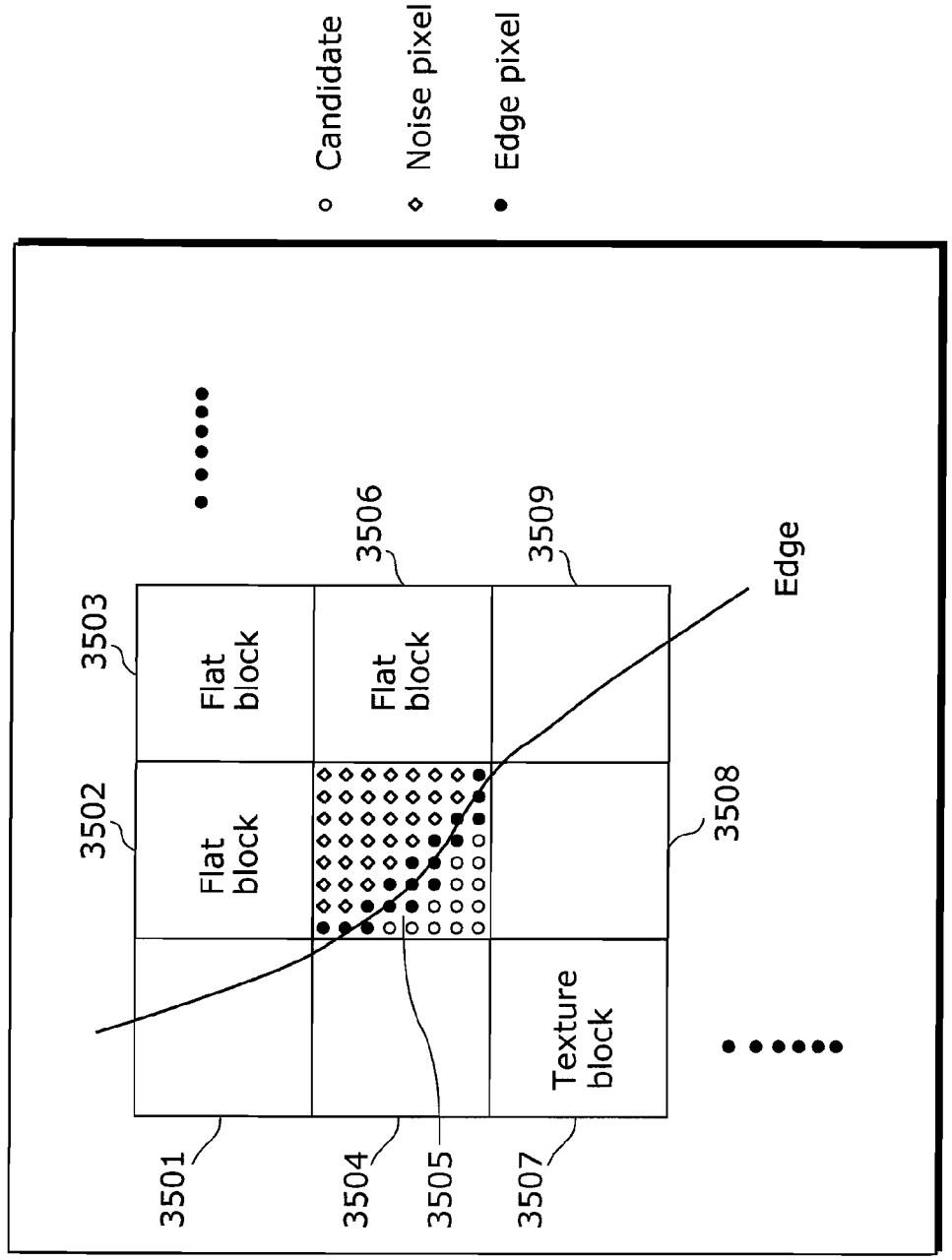
FIG. 38 is a diagram illustrating a result of determination performed by a chrominance calculating unit according to the above mentioned variation.

With a 2-D exemplar illustrated in FIG. 37 and FIG. 38, a description is provided on processing for determining noise pixels from candidates, performed by the determining unit 303a according to the present variation in Step S3001 through Step S3005 as illustrated in FIG. 32.

FIG. 37 is a diagram illustrating an image, and blocks and pixels included in the image.

Images are divided into several blocks according to some international standards of image compression such as MPEG and JPEG. Here, 9 blocks 3501 to 3509 are drawn. Each block includes 8×8 pixels, which are drawn as various kinds of symbols. An edge line crosses over the blocks 3501, 3505 and 3509. As illustrated in FIG. 37, edge pixels are marked with the filled circle "●" along the edge. Candidates are marked with the hollow circle "○". Flat pixels are marked with the rhombus "◇". The chrominance calculating unit 502a determines blocks as texture blocks in the case where only candidates are involved in the blocks, determines blocks as flat blocks in the case where only flat pixels are involved in the blocks, and determines blocks as edge blocks in the case where edge pixels are involved in the blocks.

FIG. 38 is a diagram illustrating a result of the determination performed by the chrominance calculating unit 502a.

As illustrated in FIG. 38, the block 3507 includes only candidates, so it is determined as a texture block. The blocks 3502, 3503 and 3506 include only flat pixels, so they are determined as flat blocks. The block 3501, 3505 and 3509 include edge pixels, so they are determined as edge blocks.

Considering the block 3505, which is determined as an edge block, the comparing unit 501a compares the chrominance values of the candidates inside the block 3505 with the chrominance ranges of the adjacent texture block 3507. In the case where the chrominance values of the candidates inside the block 3505 are not in the chrominance ranges of the texture block 3507, the comparing unit 501a compares the chrominance values of the candidates inside the block 3505 with the chrominance ranges of the adjacent flat blocks 3502, 3503, and 3506. In the case where the chrominance values of the candidates inside the block 3505 are in the chrominance ranges of the flat blocks 3502, 3503 and 3506, the comparing unit 501a determines the candidates as noise pixels. In other words, as illustrated in FIG. 38, the candidates at the top right of the block 3505 are determined as noise pixels and marked with the rhombus "◇".

Note that in the case where the chrominance values of the candidates are in the chrominance ranges of the texture block 3507, or in the case where the chrominance values of the candidates are not in the chrominance ranges of the flat blocks 3502, 3503, and 3506, the comparing unit 501a may compare the distances between the chrominance values of the candidates and the chrominance ranges of each of the above mentioned blocks. For example, in the case where the distances between the chrominance values of the candidates and the chrominance ranges of the flat blocks are less than those between the chrominance values of the candidates and the chrominance ranges of the texture block, the comparing unit 501a classifies the candidates as noise pixels. On the other hand, in the case where the distances between the chrominance values of the candidates and the chrominance ranges of the flat blocks are longer than those between the chrominance values of the candidates and the chrominance ranges of the texture blocks, the comparing unit 501a determines that the candidates are not noise pixels.

As described, according to the present variation, since ringing artifacts occur only in edge blocks, only candidates inside the edge blocks are judged whether or not they are noise pixels. As a result, it is possible to reduce the burden of judging whether or not the candidates are noise pixels, and easily determine noise pixels without the need to set a window, as required in the above embodiment.

The image processing apparatus 100 according to the present invention as described above is incorporated into a TV receiver and a cellular phone, for example.

Figure 39A:
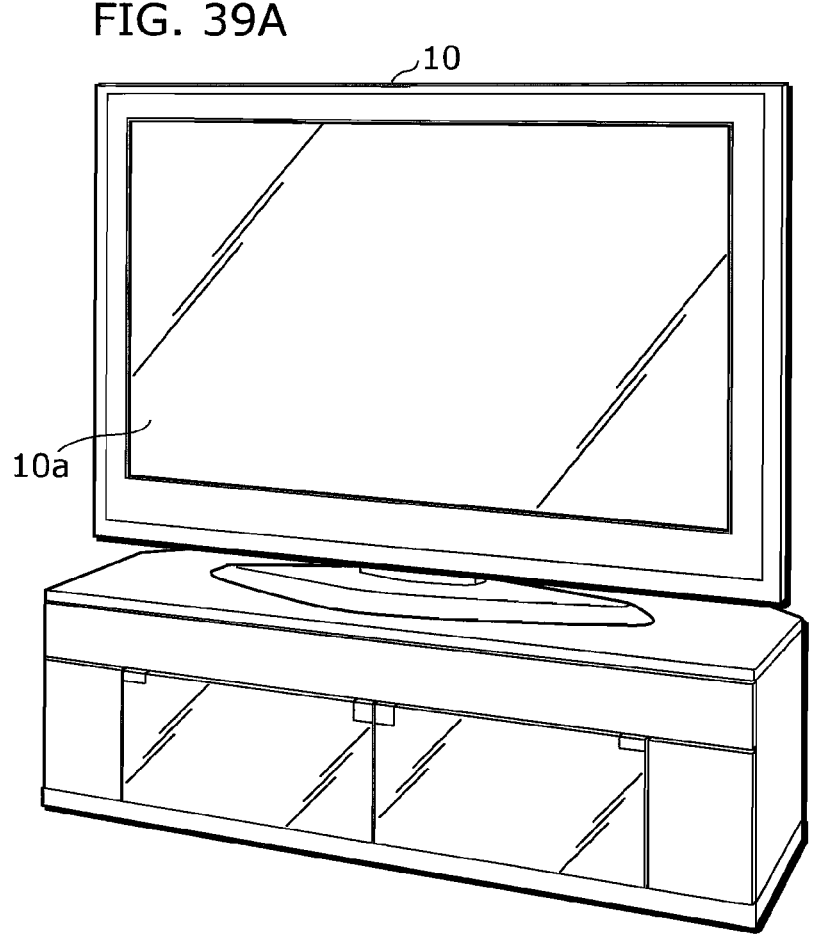
FIG. 39A is a diagram illustrating an exterior view of a TV receiver having an image processing apparatus of the present invention.
Figure 39B:
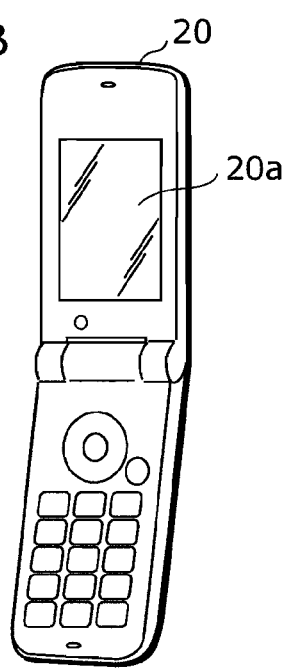
FIG. 39B is a diagram illustrating an exterior view of a cellular phone having an image processing apparatus of the present invention.

FIGS. 39A and 39B are diagrams illustrating an exterior view of the image processing apparatus 100 of the present invention.

For example, a TV receiver 10 illustrated in FIG. 39A includes the image processing apparatus 100 of the present invention, and a display unit 10a which displays images shown by output image data which is outputted from the image processing apparatus 100, that is, images with reduced ringing artifacts. With this, the TV receiver 10 is capable of displaying images such as TV programs with high image quality. Similarly, a cellular phone 20 illustrated in FIG. 39B includes the image processing apparatus 100 of the present invention, and a display unit 20a which displays images shown by output image data which is outputted from the image processing apparatus 100, that is, images with reduced ringing artifacts. With this, the cellular phone 20 is capable of displaying images obtained via a communication circuit, for example, with high image quality.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The image processing device according to the present invention produces the advantage of improving the image quality by appropriately detecting ringing artifacts and reducing only the detected artifacts, and can be used in image displaying devices such as TV receivers and cellular phones.

What is claimed is:

1. An image processing method for reducing a ringing artifact in an input image, said image processing method comprising:
   selecting, from among a plurality of pixels included in the input image, a candidate for a noise pixel included in the ringing artifact, using luminance values of the plurality of pixels;
   judging whether or not the candidate selected in said selecting is the noise pixel based on whether or not a chrominance value of the candidate is included in a chrominance range corresponding to a comparison target region which is a part of the input image; and
   filtering the noise pixel which has been judged in said judging,
   wherein said judging includes using, as a chrominance range corresponding to the comparison target region, chrominance values ranging from an upper limit value through a lower limit value, the upper limit value being a sum of a first offset value and a maximum chrominance value of chrominance values of pixels, among the plurality of pixels, located in the comparison target region, and the lower limit value being a difference calculated by subtracting a second offset value from a minimum chrominance value of the chrominance values of the pixels, among the plurality of pixels, located in the comparison target region.

2. The image processing method according to claim 1, further comprising
   identifying, from among the plurality of pixels, an edge pixel included in an edge, using the luminance values of the plurality of pixels included in the input image,
   wherein said selecting includes selecting a plurality of candidates including the candidate, and
   said judging is performed on a candidate located in a processing target region, the candidate being among the plurality of the candidates included in the input image, and the processing target region being a part of the input image and including the edge pixel.

3. The image processing method according to claim 2,
   wherein said selecting includes comparing, with a first threshold, an absolute value of each gradient of the luminance values of spatially successive pixels which are included in the input image and are among the plurality of pixels, and selecting, as the candidate, a pixel, from among the plurality of pixels, which corresponds to an absolute value which is equal to or smaller than the first threshold, and
   said identifying includes comparing, with the first threshold, the absolute value of each gradient of the luminance values of the spatially successive pixels, and identifying, as the edge pixel, a pixel, from among the plurality of pixels, which corresponds to an absolute value which is equal to or greater than the first threshold.

4. The image processing method according to claim 3, further comprising
   determining the comparison target region from the input image based on the luminance values of the plurality of pixels included in the input image.

5. The image processing method according to claim 4,
   wherein said determining includes comparing, with a second threshold which is smaller than the first threshold, an absolute value of each gradient of the luminance values of the spatially successive pixels which are included in the input image, and determining, as the comparison target region, a flat region in which pixels, among the plurality of pixels, corresponding to an absolute value which is equal to or smaller than the second threshold, are successive for at least a predetermined number, and
   said judging includes judging the candidate as the noise pixel in a case where the chrominance value of the candidate is included in a chrominance range corresponding to the flat region.

6. The image processing method according to claim 5,
   wherein said determining further includes determining, as an other comparison target region, a texture region in which candidates among the plurality of the candidates are successive for at least a predetermined number, and
   said image processing method further comprises
   re-judging, in a case where the candidate is judged, in said judging, as a pixel other than the noise pixel, the candidate as the noise pixel in a case where the chrominance value of the candidate is not included in a chrominance range corresponding to the texture region.

7. The image processing method according to claim 4,
   wherein said determining includes determining, as the comparison target region, a texture region in which candidates among the plurality of the candidates are successive for at least a predetermined number, and said judging includes judging the candidate as the noise pixel in a case where the chrominance value of the candidate is not included in a chrominance range corresponding to the texture region.

8. The image processing method according to claim 7, wherein said determining further includes comparing, with a second threshold which is smaller than the first threshold, an absolute value of each gradient of the luminance values of the spatially successive pixels which are included in the input image, and determining, as an other comparison target region, a flat region in which pixels, among the plurality of pixels, corresponding to an absolute value which is smaller than the second threshold, are successive for at least a predetermined number, and said image processing method further comprises re-judging, in a case where the candidate is judged, in said judging, as the noise pixel, the candidate as the noise pixel in a case where the chrominance value of the candidate is included in a chrominance range corresponding to the flat region.

9. The image processing method according to claim 4, further comprising setting, in the input image, a window which represents the processing target region including the edge pixel, wherein said determining includes determining the comparison target region from the processing target region represented by the window.

10. The image processing method according to claim 4, wherein said judging includes using a block, which includes the edge pixel, as the processing target region, the block being among a plurality of blocks which are included in the input image and each of which is a unit of image decoding processing, and said determining includes determining a block nearby the processing target region as the comparison target region.

11. An image processing apparatus for reducing a ringing artifact in an input image, said image processing apparatus comprising:

a processor;

a selecting unit configured to select, from among a plurality of pixels included in the input image, a candidate for a noise pixel included in the ringing artifact, using luminance values of the plurality of pixels;

a judging unit configured to judge whether or not the candidate selected by said selecting unit is the noise pixel based on whether or not a chrominance value of the candidate is included in a chrominance range corresponding to a comparison target region which is a part of the input image; and a filtering unit configured to filter the noise pixel which has been judged by said judging unit, wherein said judging unit is configured to use, as a chrominance range corresponding to the comparison target region, chrominance values ranging from an upper limit value through a lower limit value, the upper limit value being a sum of a first offset value and a maximum chrominance value of chrominance values of pixels, among the plurality of pixels, located in the comparison target region, and the lower limit value being a difference calculated by subtracting a second offset value from a minimum chrominance value of the chrominance values of the pixels, among the plurality of pixels, located in the comparison target region.

12. The image processing apparatus according to claim 11, further comprising a displaying unit configured to display the input image filtered by said filtering unit, wherein said image processing apparatus is configured as one of a TV receiver and a cellular phone.

13. An integrated circuit for reducing a ringing artifact in an input image, said integrated circuit comprising:

a selecting circuit which selects, from among a plurality of pixels included in the input image, a candidate for a noise pixel included in the ringing artifact, using luminance values of the plurality of pixels;

a judging circuit which judges whether or not the candidate selected by said selecting circuit is the noise pixel based on whether or not a chrominance value of the candidate is included in a chrominance range corresponding to a comparison target region which is a part of the input image; and a filtering circuit which filters the noise pixel which has been judged by said judging circuit, wherein said judging circuit is configured to use, as a chrominance range corresponding to the comparison target region, chrominance values ranging from an upper limit value through a lower limit value, the upper limit value being a sum of a first offset value and a maximum chrominance value of chrominance values of pixels, among the plurality of pixels, located in the comparison target region, and the lower limit value being a difference calculated by subtracting a second offset value from a minimum chrominance value of the chrominance values of the pixels, among the plurality of pixels, located in the comparison target region.

14. A non-transitory computer readable medium having a program stored thereon for reducing a ringing artifact in an input image, said non-transitory computer readable medium having the program stored thereon, when loaded into a computer, allowing the computer to execute:

selecting, from among a plurality of pixels included in the input image, a candidate for a noise pixel included in the ringing artifact, using luminance values of the plurality of pixels;

judging whether or not the candidate selected in the selecting is the noise pixel based on whether or not a chrominance value of the candidate is included in a chrominance range corresponding to a comparison target region which is a part of the input image; and filtering the noise pixel which has been judged in the judging, wherein said judging includes using, as a chrominance range corresponding to the comparison target region, chrominance values ranging from an upper limit value through a lower limit value, the upper limit value being a sum of a first offset value and a maximum chrominance value of chrominance values of pixels, among the plurality of pixels, located in the comparison target region, and the lower limit value being a difference calculated by subtracting a second offset value from a minimum chrominance value of the chrominance values of the pixels, among the plurality of pixels, located in the comparison target region.

* * * * *